(12) United States Patent
Levien et al.

(10) Patent No.: US 10,431,235 B2
(45) Date of Patent: *Oct. 1, 2019

(54) METHODS AND SYSTEMS FOR SPEECH ADAPTATION DATA

(75) Inventors: Royce A. Levien, Lexington, MA (US); Richard T. Lord, Tacoma, WA (US); Robert W. Lord, Seattle, WA (US); Mark A. Malamud, Seattle, WA (US)

(73) Assignee: Elwha LLC, Bellevue, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/609,139

(22) Filed: Sep. 10, 2012

(65) Prior Publication Data

US 2013/0325450 A1    Dec. 5, 2013

Related U.S. Application Data

(63) Continuation-in-part of application No. 13/485,733, filed on May 31, 2012, and a continuation-in-part of application No. 13/485,738, filed on May 31, 2012, and a continuation-in-part of application No. 13/538,855, filed on Jun. 29, 2012, and a continuation-in-part of application No. 13/538,866, filed on Jun. 29, 2012, and a continuation-in-part of application No. 13/564,647, filed on Aug. 1, 2012, (Continued)

(51) Int. Cl.
*G10L 15/07*    (2013.01)
*G10L 15/065*    (2013.01)
*G10L 21/00*    (2013.01)
*G10L 15/30*    (2013.01)

(52) U.S. Cl.
CPC ............ *G10L 21/00* (2013.01); *G10L 15/065* (2013.01); *G10L 15/07* (2013.01); *G10L 15/30* (2013.01)

(58) Field of Classification Search
CPC ...... G10L 15/06; G10L 15/063; G10L 15/065
USPC .................................................. 704/200–504
See application file for complete search history.

(56) References Cited

U.S. PATENT DOCUMENTS 4,972,485 A    11/1990    Dautrich et al.
5,214,615 A *   5/1993    Bauer .......................... 367/128
(Continued)

FOREIGN PATENT DOCUMENTS

CN    10-1075434 A    11/2007
EP    1 205 906 A1    5/2002
EP    2 405 422 A1    1/2012

OTHER PUBLICATIONS

PCT International Search Report; International App. No. PCT/US13/48640; dated Jan. 14, 2014; pp. 1-2.
(Continued)

*Primary Examiner* — Samuel G Neway

(57) ABSTRACT

Computationally implemented methods and systems include detecting speech data related to a speech-facilitated transaction, acquiring adaptation data that is at least partly based on at least one speech interaction of a particular party that is discrete from the detected speech data, wherein at least a portion of the adaptation data has been stored on a particular device associated with the particular party, obtaining a destination of one or more of the adaptation data and the speech data, and transmitting one or more of the speech data and the adaptation data to the acquired destination. In addition to the foregoing, other aspects are described in the claims, drawings, and text.

34 Claims, 54 Drawing Sheets

Related U.S. Application Data and a continuation-in-part of application No. 13/564,649, filed on Aug. 1, 2012, now Pat. No. 8,843,371, and a continuation-in-part of application No. 13/564,650, filed on Aug. 1, 2012, and a continuation-in-part of application No. 13/564,651, filed on Aug. 1, 2012, and a continuation-in-part of application No. 13/609,143, filed on Sep. 10, 2012, which is a continuation-in-part of application No. 13/609,145, filed on Sep. 10, 2012.

(56) References Cited

U.S. PATENT DOCUMENTS

| | | | |
|---|---|---|---|
| 5,794,189 A | | 8/1998 | Gould |
| 5,970,451 A | | 10/1999 | Lewis et al. |
| 6,006,183 A | | 12/1999 | Lai et al. |
| 6,493,506 B1 * | | 12/2002 | Schoner et al. ............. 386/334 |
| 6,823,306 B2 * | | 11/2004 | Reding et al. ............. 704/244 |
| 7,099,825 B1 | | 8/2006 | Cook |
| 7,162,414 B2 | | 1/2007 | Stanford |
| 7,174,298 B2 * | | 2/2007 | Sharma ..................... 704/270.1 |
| 7,191,133 B1 * | | 3/2007 | Pettay ............................ 704/270 |
| 7,194,409 B2 | | 3/2007 | Balentine et al. |
| 7,219,058 B1 | | 5/2007 | Rose et al. |
| 7,243,070 B2 * | | 7/2007 | Hoffmann et al. ........... 704/251 |
| 7,346,151 B2 * | | 3/2008 | Erhart et al. ............... 379/88.14 |
| 7,660,715 B1 * | | 2/2010 | Thambiratnam ............ 704/244 |
| 7,949,529 B2 * | | 5/2011 | Weider et al. ................ 704/270 |
| 8,032,383 B1 * | | 10/2011 | Bhardwaj et al. ........... 704/275 |
| 8,082,147 B2 * | | 12/2011 | Parthasarathy et al. ...... 704/231 |
| 8,374,867 B2 * | | 2/2013 | Ljolje et al. .................. 704/244 |
| 8,843,371 B2 * | | 9/2014 | Levien et al. ................. 704/244 |
| 9,171,541 B2 | | 10/2015 | Kennewick et al. |
| 9,183,806 B2 | | 11/2015 | Felt |
| 9,495,966 B2 | | 11/2016 | Levien et al. |
| 2001/0039494 A1 | | 11/2001 | Burchard et al. |
| 2002/0019734 A1 | | 2/2002 | Bartosik |
| 2002/0065656 A1 | | 5/2002 | Reding et al. |
| 2002/0091511 A1 * | | 7/2002 | Hellwig et al. ............. 704/201 |
| 2002/0138265 A1 * | | 9/2002 | Stevens et al. .............. 704/251 |
| 2002/0138274 A1 * | | 9/2002 | Sharma et al. ............... 704/270 |
| 2002/0147579 A1 | | 10/2002 | Kushner et al. |
| 2002/0188446 A1 | | 12/2002 | Gao et al. |
| 2003/0050783 A1 * | | 3/2003 | Yoshizawa ................. 704/270.1 |
| 2003/0088421 A1 | | 5/2003 | Maes et al. |
| 2003/0093281 A1 | | 5/2003 | Geilhufe et al. |
| 2003/0115289 A1 * | | 6/2003 | Chinn ............... G06F 17/30067 709/219 |
| 2003/0191639 A1 | | 10/2003 | Mazza |
| 2004/0048636 A1 * | | 3/2004 | Doble ............. H04M 1/274566 455/563 |
| 2004/0064316 A1 * | | 4/2004 | Gallino ........................ 704/251 |
| 2004/0088162 A1 * | | 5/2004 | He et al. ....................... 704/235 |
| 2004/0148165 A1 | | 7/2004 | Beyerlein |
| 2004/0158457 A1 * | | 8/2004 | Veprek et al. ............... 704/201 |
| 2004/0162726 A1 | | 8/2004 | Chang |
| 2004/0176953 A1 | | 9/2004 | Coyle et al. |
| 2004/0199388 A1 | | 10/2004 | Armbruster et al. |
| 2004/0203651 A1 | | 10/2004 | Qu et al. |
| 2005/0049868 A1 | | 3/2005 | Busayapongchai |
| 2005/0058435 A1 * | | 3/2005 | Chung et al. .................. 386/95 |
| 2005/0144255 A1 | | 6/2005 | Hennecke |
| 2005/0152565 A1 * | | 7/2005 | Jouppi et al. ................ 381/309 |
| 2006/0121949 A1 | | 6/2006 | Awada et al. |
| 2007/0136069 A1 | | 6/2007 | Veliu et al. |
| 2007/0233487 A1 | | 10/2007 | Cohen et al. |
| 2008/0015848 A1 | | 1/2008 | Arizmendi et al. |
| 2008/0082332 A1 * | | 4/2008 | Mallett et al. ............... 704/250 |
| 2008/0240395 A1 | | 10/2008 | Poi |
| 2009/0043582 A1 * | | 2/2009 | Zhou et al. .................. 704/257 |
| 2009/0063144 A1 | | 3/2009 | Rose et al. |
| 2009/0204392 A1 | | 8/2009 | Ishikawa |
| 2009/0265217 A1 | | 10/2009 | Aurenz |
| 2009/0290689 A1 | | 11/2009 | Watanabe et al. |
| 2010/0070277 A1 | | 3/2010 | Arakawa et al. |
| 2010/0086108 A1 * | | 4/2010 | Jaiswal et al. ............. 379/88.04 |
| 2010/0131273 A1 | | 5/2010 | Aley-Raz et al. |
| 2010/0204988 A1 | | 8/2010 | Xu et al. |
| 2010/0283829 A1 | | 11/2010 | De Beer et al. |
| 2011/0029307 A1 | | 2/2011 | Parthasarathy et al. |
| 2011/0086631 A1 | | 4/2011 | Park et al. |
| 2011/0119059 A1 | | 5/2011 | Ljolje et al. |
| 2011/0288863 A1 * | | 11/2011 | Rasmussen ................... 704/235 |
| 2012/0010887 A1 * | | 1/2012 | Boregowda et al. ......... 704/250 |
| 2012/0014568 A1 | | 1/2012 | Conwell et al. |
| 2013/0132094 A1 | | 5/2013 | Lim |
| 2013/0325441 A1 * | | 12/2013 | Levien et al. .................... 704/9 |
| 2013/0325446 A1 * | | 12/2013 | Levien et al. ................. 704/201 |
| 2013/0325447 A1 * | | 12/2013 | Levien et al. ................. 704/201 |
| 2013/0325448 A1 * | | 12/2013 | Levien et al. ................. 704/201 |
| 2013/0325449 A1 * | | 12/2013 | Levien et al. ................. 704/201 |
| 2013/0325450 A1 * | | 12/2013 | Levien et al. ................. 704/201 |
| 2013/0325451 A1 * | | 12/2013 | Levien et al. ................. 704/201 |
| 2013/0325452 A1 * | | 12/2013 | Levien et al. ................. 704/201 |
| 2013/0325453 A1 * | | 12/2013 | Levien et al. ................. 704/201 |
| 2013/0325454 A1 * | | 12/2013 | Levien et al. ................. 704/201 |
| 2013/0325459 A1 * | | 12/2013 | Levien et al. ................. 704/231 |
| 2013/0325474 A1 * | | 12/2013 | Levien et al. ................. 704/251 |
| 2014/0039881 A1 * | | 2/2014 | Levien et al. ................. 704/201 |
| 2014/0039882 A1 * | | 2/2014 | Levien et al. ................. 704/201 |
| 2015/0088518 A1 | | 3/2015 | Kim et al. |

OTHER PUBLICATIONS

Yuasa et al.; "Operating Networked Appliances Using Gaze Information and Voice Recognition"; Proceedings of the Third IASTED International Conference, Human-Computer Interaction, bearing a date of Mar. 17-19, 2008; pp. 107-1112; Innsbruck Austria.

European Patent Office, Supplementary European Search Report, Pursuant to Rule 62 EPC; App. No. EP 13808577; dated Jan. 19, 2016 (received by our Agent on Jan. 25, 2016); pp. 1-2.

The State Intellectual Property Office of P.R.C., First Office Action, App. No. 2013/80034866.8 (Based on PCT Patent Application No. PCT/US2013/048640); dated Dec. 2, 2016 (received by our Agent on Dec. 12, 2016); pp. 1-5 (machine translation, as provided).

Chinese State Intellectual Property Office, Notification of the Second Office Action, App. No. 201380034866.8 (Based on PCT Patent Application No. PCT/US2013/048640); dated Aug. 22, 2017 (received by our Agent on Aug. 29, 2017); pp. 1-5 (machine translation provided).

European Patent Office, Summons to attend oral proceedings pursuant to Rule 115(1) EPC, App. No. 13808577.4; Mar. 29, 2018 (received by our Agent on Apr. 6, 2018); pp. 1-9.

\* cited by examiner

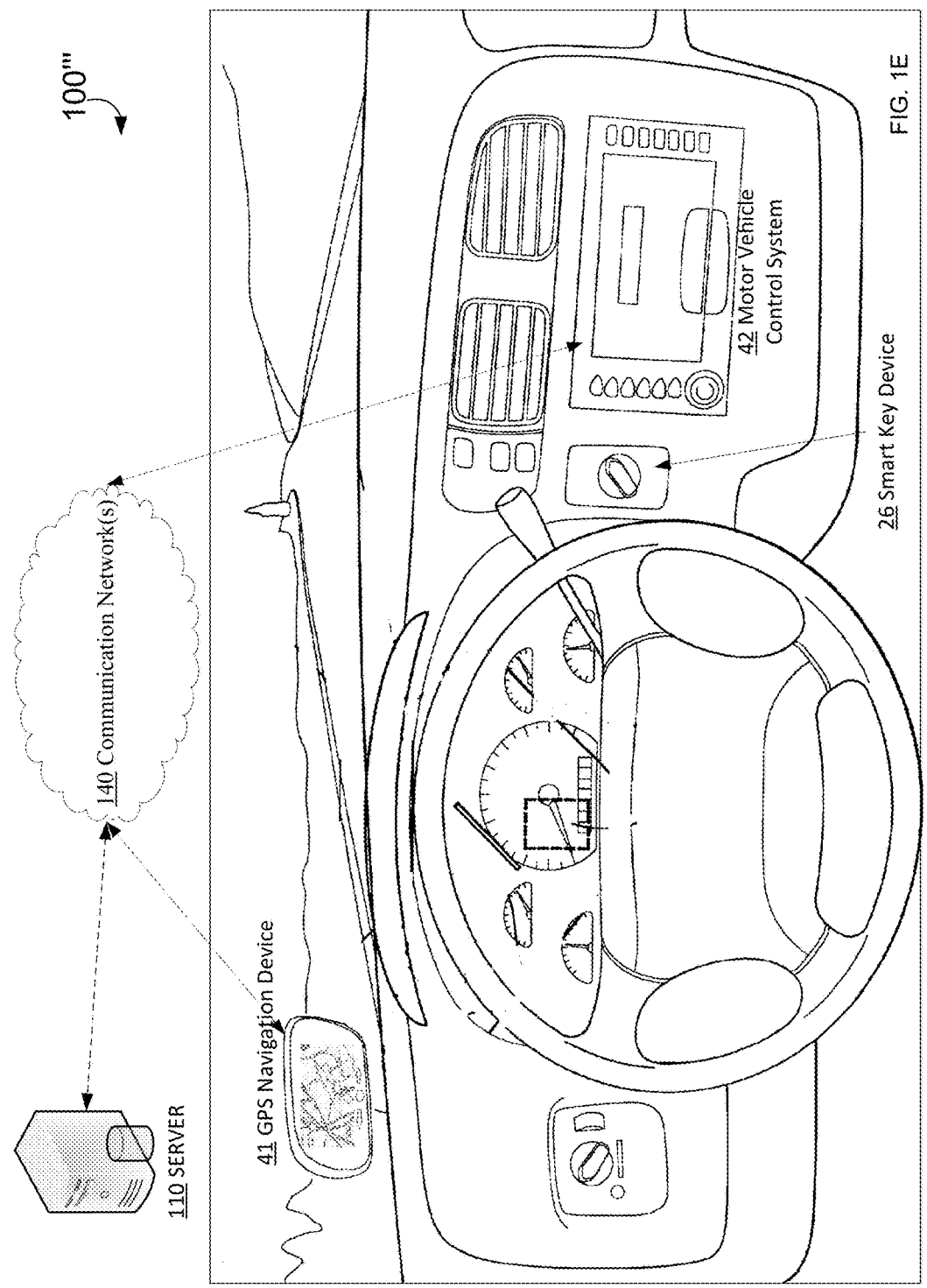

154 Adaptation Data At Least Partly Based On Discrete Speech Interaction Of Particular Party Separate From Detected Speech Data, And Has Been Stored On A Particular Party-associated Particular Device Acquiring Module 302 Adaptation Data Comprising One Or More Words And Corresponding Pronunciations Of The One Or More Words At Least Partly Based On Discrete Speech Interaction Of Particular Party Separate From Detected Speech Data, And Has Been Stored On A Particular Party-associated Particular Device Acquiring Module 304 Adaptation Data Comprising One Or More Words And Corresponding Pronunciations Of The One Or More Words At Least Partly Based On At Least One Previous Training By The Particular Party Separate From Detected Speech Data, And Has Been Stored On A Particular Party-associated Particular Device Acquiring Module 306 Adaptation Data Comprising One Or More Words And Corresponding Pronunciations Of The One Or More Words At Least Partly Based On At Least One Previous Training By The Particular Party Separate From Detected Speech Data Corresponding To An Order Placed By The Particular Party At An Automated Drive-thru Terminal That Accepts Speech Input, And Has Been Stored On A Particular Party-associated Particular Device Acquiring Module 308 Adaptation Data Comprising One Or More Words And Corresponding Pronunciations Of The One Or More Words At Least Partly Based On At Least One Previous Training By The Particular Party In Response To Cellular Telephone Device Prompting Separate From Detected Speech Data Corresponding To An Order Placed By The Particular Party At An Automated Drive-thru Terminal That Accepts Speech Input, And Has Been Stored On A Particular Party-associated Particular Device Acquiring Module 310 Adaptation Data Comprising One Or More Words And Corresponding Pronunciations Of The One Or More Words At Least Partly Based On At Least One Previous Training By The Particular Party In Response To Cellular Telephone Device Prompting Separate From Detected Speech Data Corresponding To An Order Placed By The Particular Party At An Automated Drive-thru Terminal That Accepts Speech Input, And Has Been Stored On A Particular Device Linked To The Particular Party Through A Contract With A Telecommunications Provider Acquiring Module

| Fig. 3A | Fig. 3B | Fig. 3C | Fig. 3D | Fig. 3E | Fig. 3F | Fig. 3G | Fig. 3H | Fig. 3I | Fig. 3J | Fig. 3K |

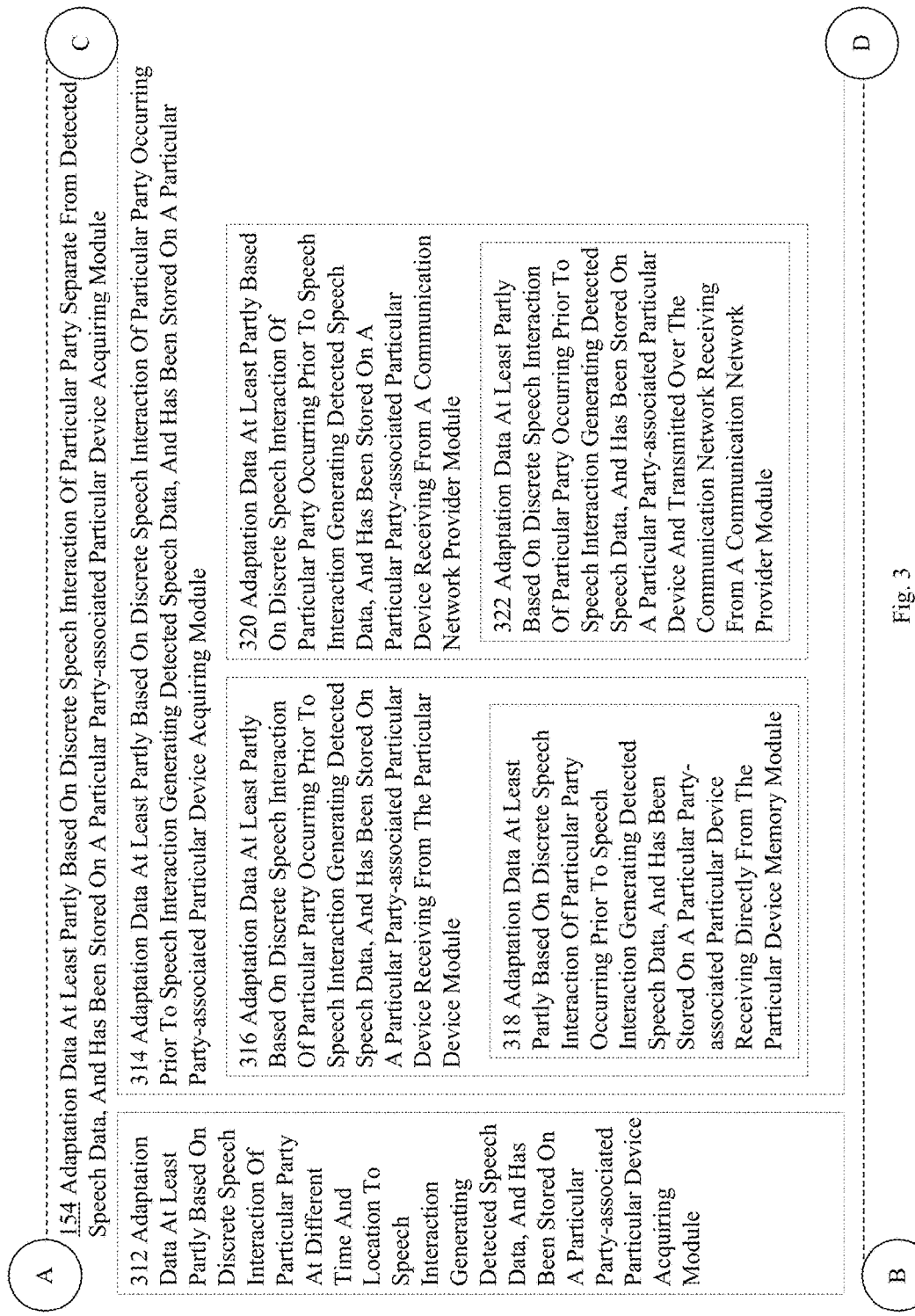

| Fig. 3A | Fig. 3B | Fig. 3C | Fig. 3D | Fig. 3E | Fig. 3F | Fig. 3G | Fig. 3H | Fig. 3I | Fig. 3J | Fig. 3K |

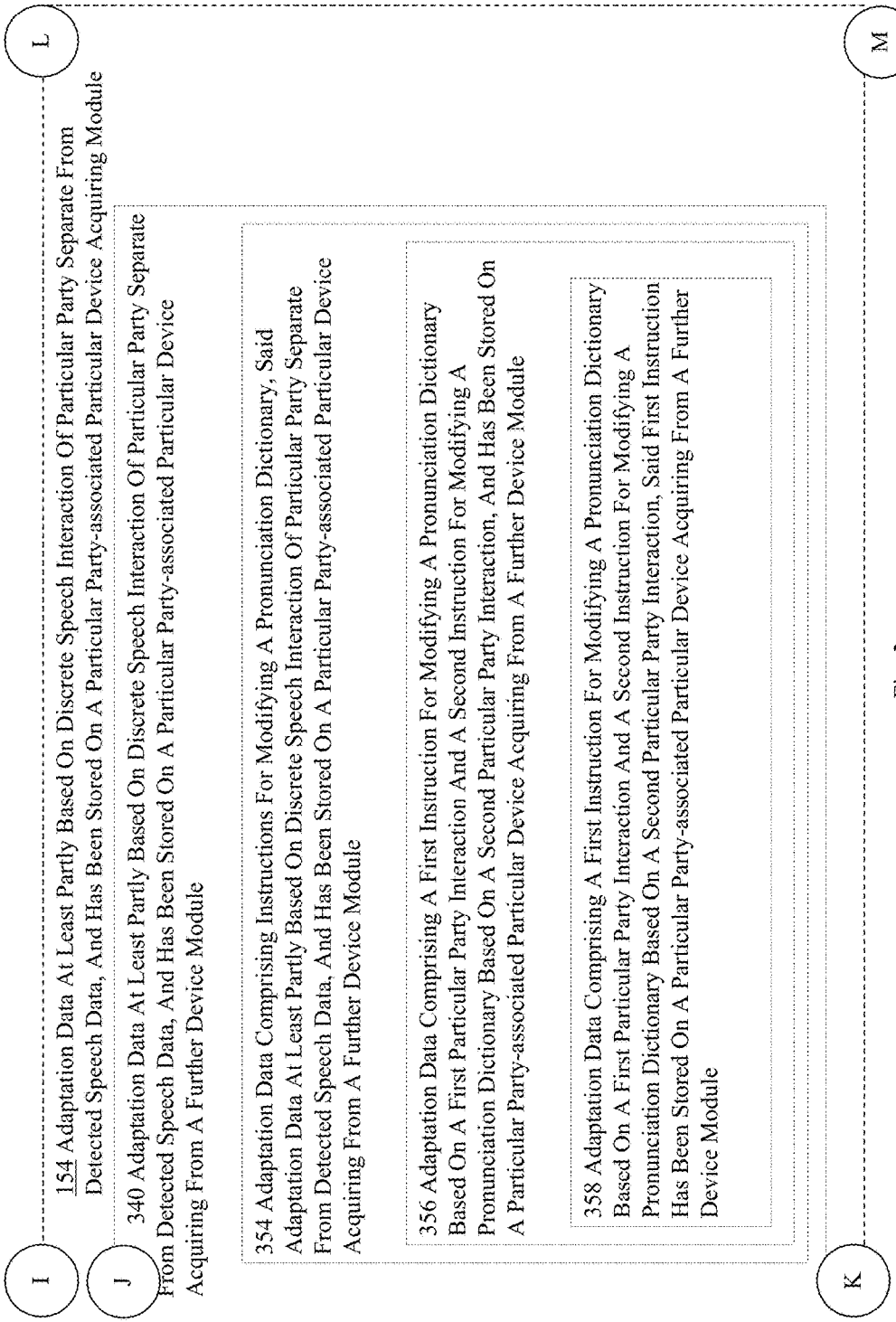

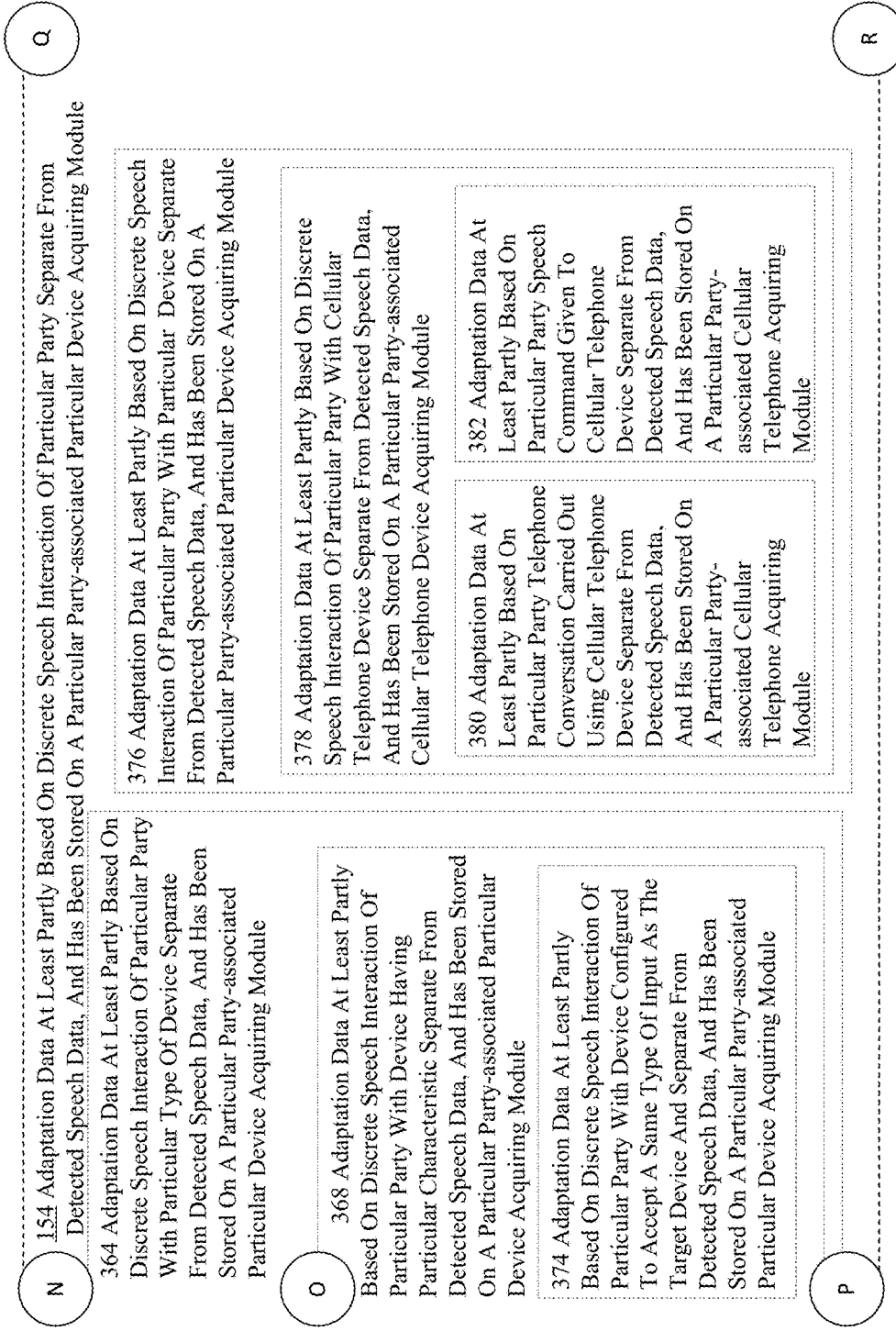

FIG. 3I

154 Adaptation Data At Least Partly Based On Discrete Speech Interaction Of Particular Party Separate From Detected Speech Data, And Has Been Stored On A Particular Party-associated Particular Device Acquiring Module

| 384 Adaptation Data At Least Partly Based On Discrete Speech Interaction Of Particular Party Separate From Detected Speech Data And Using Same Utterance As Speech That Is Part Of Speech Data, And Has Been Stored On A Particular Party-associated Particular Device Acquiring Module | 386 Adaptation Data At Least Partly Based On Discrete Speech Interaction Of Particular Party And Using Same Utterance As Speech That Is Part Of Speech Data At A Different Time Than Speech That Is Part Of The Speech Data Acquiring Module | 388 Adaptation Data Comprising A Phoneme Dictionary Based On One Or More Particular Party Pronunciations, Such That At Least One Entry Has Been Stored On A Particular Party-associated Particular Device Acquiring Module | 390 Adaptation Data Comprising A Sentence Diagramming Path Selection Algorithm Based On One Or More Particular Party Discrete Speech Interactions, And Has Been Stored On A Particular Party-associated Particular Device Acquiring Module | 392 Adaptation Data At Least Partly Based On Discrete Speech Interaction Of Particular Party Separate From Detected Speech Data, And At Least Partly Collected By A Particular Party-associated Particular Device Acquiring Module | 394 Adaptation Data Comprising Instructions For Modifying One Or More Portions Of A Speech Recognition Component Of A Target Device That Are At Least Partly Based On One Or More Particular Party Speech Interactions, And Has Been Stored On A Particular Party-associated Particular Device Acquiring Module |

Fig. 3

| Fig. 3A | Fig. 3B | Fig. 3C | Fig. 3D | Fig. 3E | Fig. 3F | Fig. 3G | Fig. 3H | Fig. 3I | Fig. 3J | Fig. 3K |

154 Adaptation Data At Least Partly Based On Discrete Speech Interaction Of Particular Party Separate From Detected Speech Data, And Has Been Stored On A Particular Party-associated Particular Device Acquiring Module

| 396 Adaptation Data Comprising A Location Of Instructions For Modifying One Or More Portions Of A Speech Recognition Component Of A Target Device That Are At Least Partly Based On One Or More Particular Party Speech Interactions, And Has Been Stored On A Particular Party-associated Particular Device Acquiring Module | 398 Adaptation Data At Least Partly Based On Discrete Speech Interaction Of Particular Party Separate From Detected Speech Data, And Transmitted From A Particular Party-associated Particular Device Acquiring Module | 301 Adaptation Data At Least Partly Based On Discrete Speech Interaction Of Particular Party Separate From Detected Speech Data, And Stored On A Particular Party-associated Particular Device Acquiring Module | 303 Adaptation Data At Least Partly Based On Discrete Speech Interaction Of Particular Party Separate From Detected Speech Data, And Is Temporarily Stored On The Particular-party Associated Particular Device Until Remote Server Deposit Acquiring Module | 305 Adaptation Data At Least Partly Based On Discrete Speech Interaction Of Particular Party Separate From Detected Speech Data, And Was Transmitted From A First Device To A Second Device Using The Particular Party-associated Particular Device As A Channel Configured To Facilitate The Transaction Acquiring Module |

Fig. 3

| Fig. 3A | Fig. 3B | Fig. 3C | Fig. 3D | Fig. 3E | Fig. 3F | Fig. 3G | Fig. 3H | Fig. 3I | Fig. 3J | Fig. 3K |

FIG. 3J

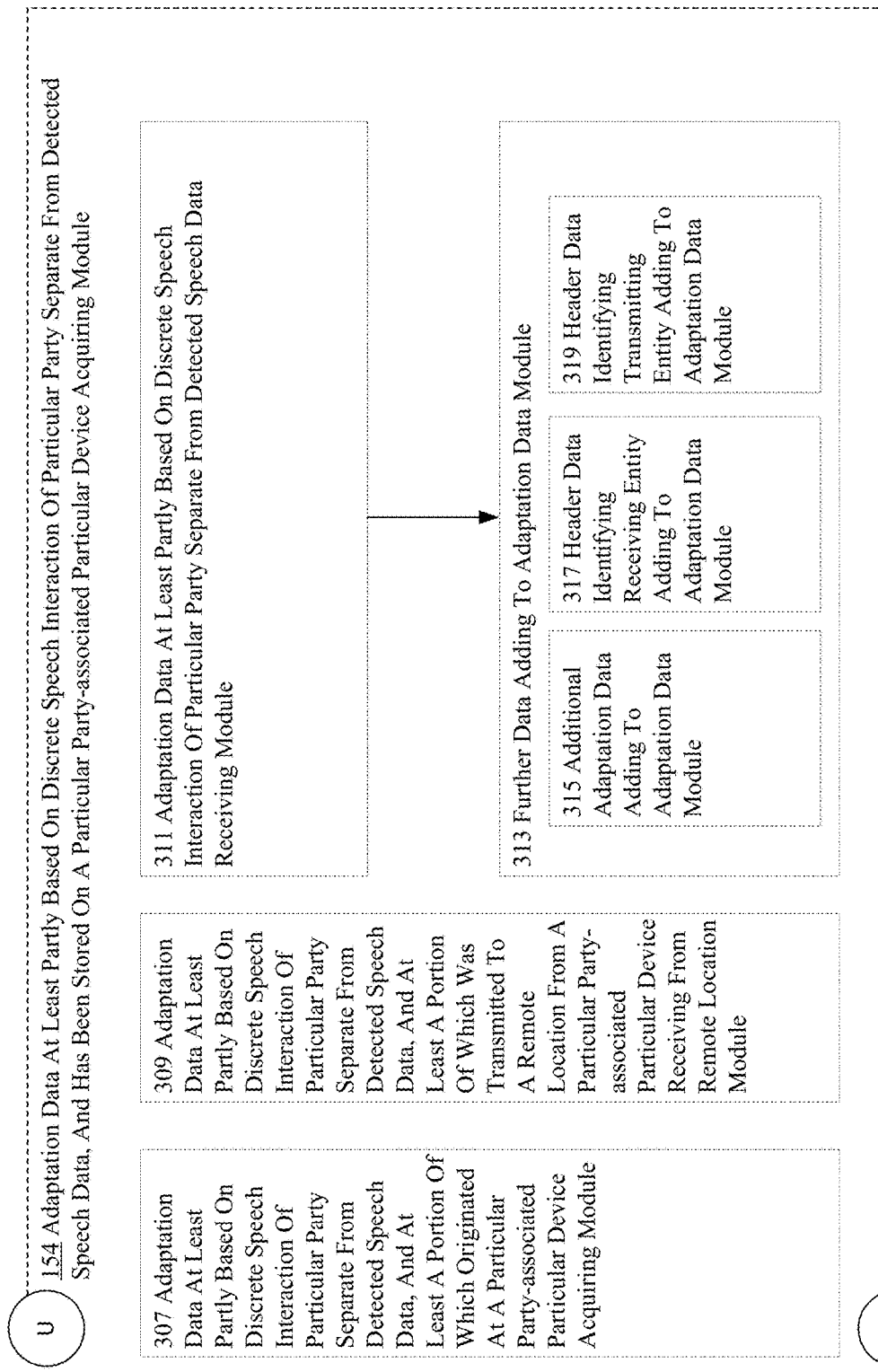

156 Destination Of One Or More Of The Adaptation Data And The Speech Data Obtaining Module 402 Data Regarding Target Device Configured To Process Speech Data Module 404 Data Comprising A Target Device Configured To Process Speech Data Address Receiving Module 406 Data Comprising A Target Device Configured To Process Speech Data Location Receiving Module 408 Target Device Location As Destination Of One Or More Of The Adaptation Data And The Speech Data Determining Module 470 Target Device Network Location As Destination Of One Or More Of The Adaptation Data And The Speech Data Determining Module 472 Device Name Of Destination Of One Or More Of The Adaptation Data And The Speech Data Obtaining Module 474 Type Of Device For Which One Or More Of The Adaptation Data And The Speech Data Is A Destination Obtaining Module 410 Program Component Configured To Perform Processing On One Or More Of The Adaptation Data And The Speech Data Determining Module 412 Program Component As Destination Of One Or More Of The Adaptation Data And The Speech Data Determining Module 414 Selection Between Application Component And Operating System Component As Destination Of One Or More Of The Adaptation Data And The Speech Data Selecting Module

| Fig. 4A | Fig. 4B | Fig. 4C | Fig. 4D |

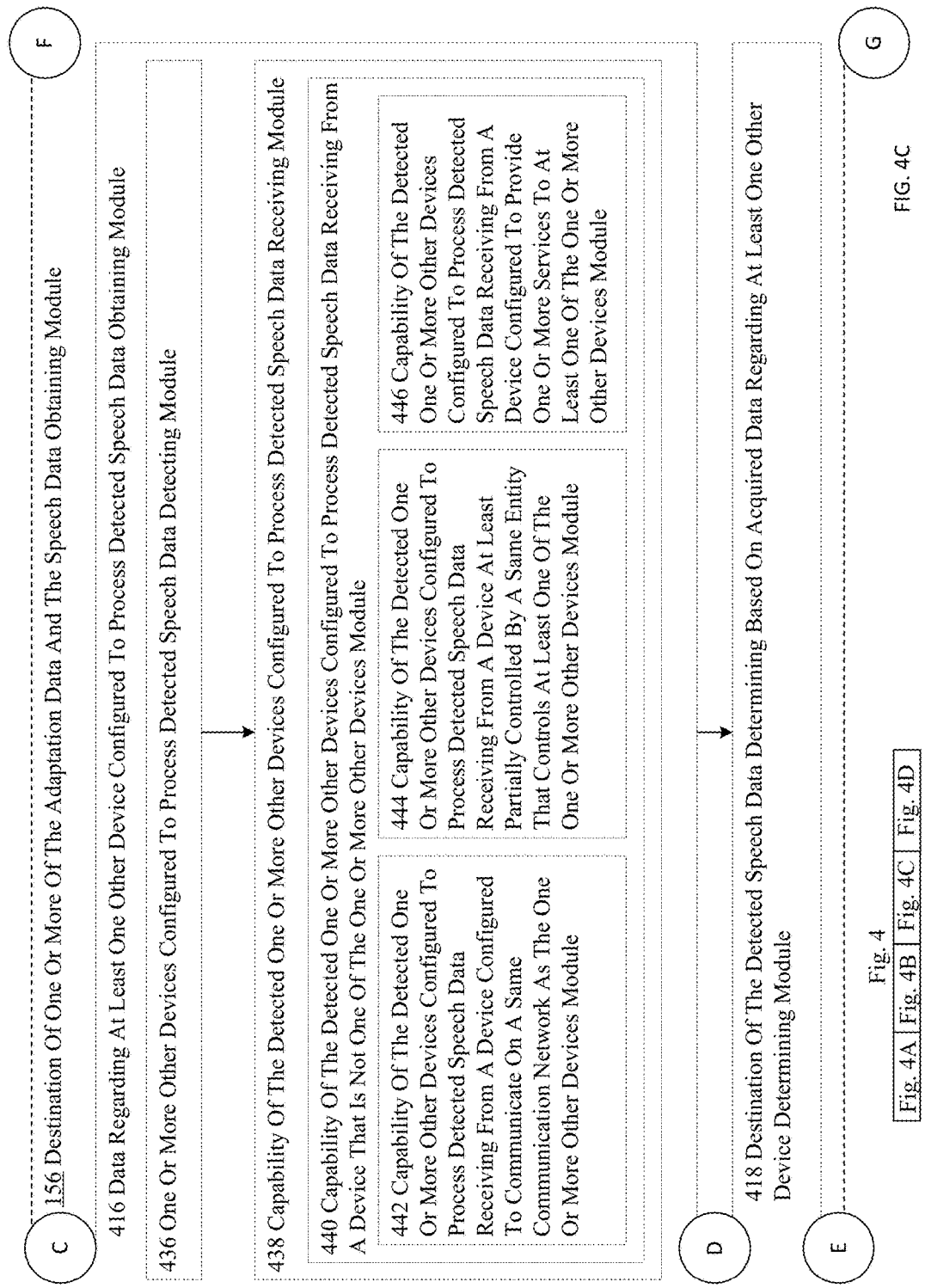

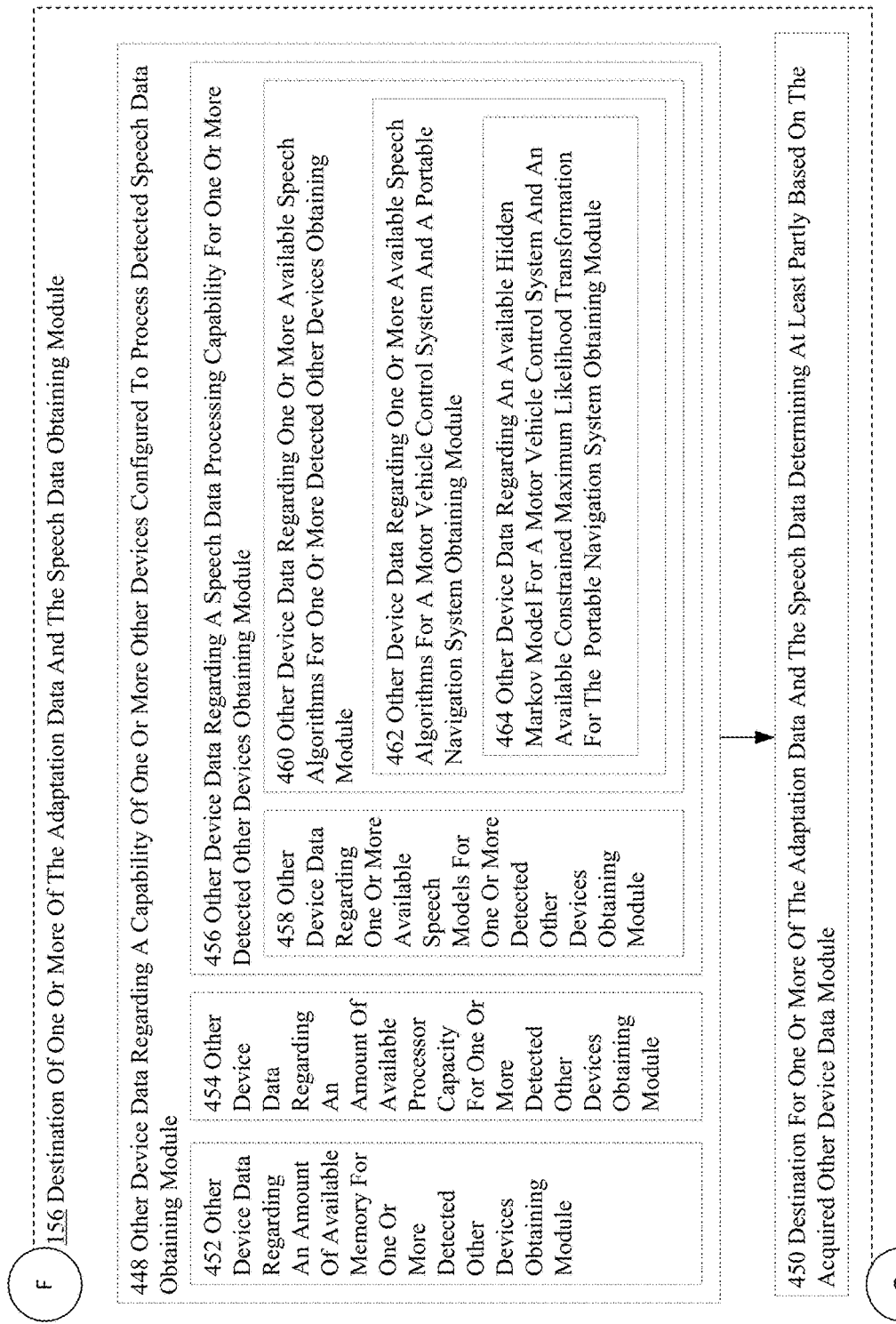

| Fig. 5A | Fig. 5B |

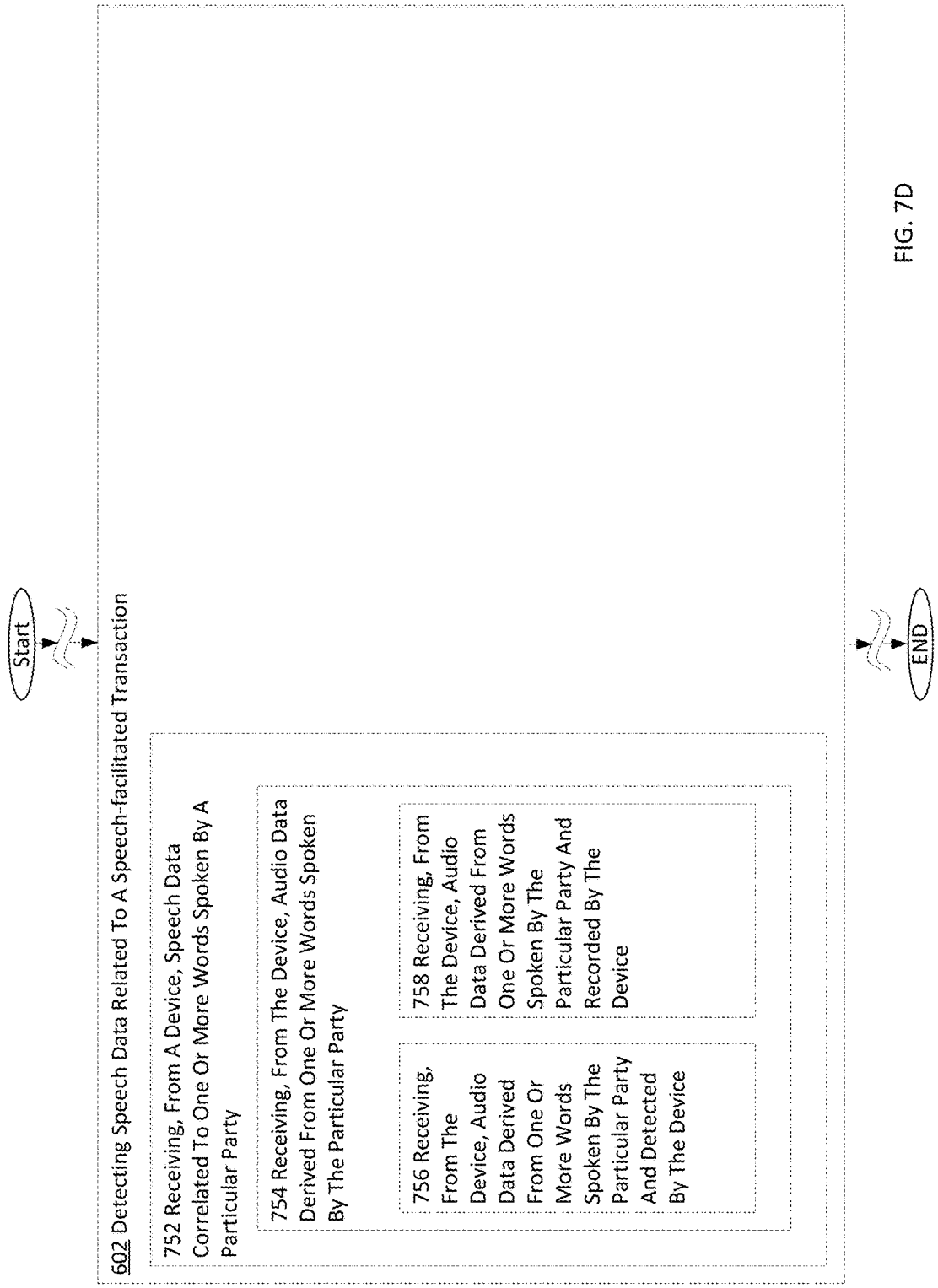

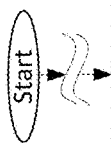
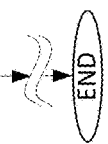

FIG. 8C

604 Acquiring Adaptation Data That Is At Least Partly Based On At Least One Speech Interaction Of A Particular Party That Is Discrete From The Detected Speech Data, Wherein At Least A Portion Of The Adaptation Data Has Been Stored On A Particular Device Associated With The Particular Party 814 Acquiring At Least A Portion Of Adaptation Data That Is At Least Partly Based On At Least One Speech Interaction Of The Particular That Occurred Prior To A Speech Interaction That Generated The Detected Speech Data, Wherein At Least A Portion Of The Adaptation Data Has Been Stored On A Particular Device Associated With The Particular Party 816 Receiving, From The Particular Device, Adaptation Data That Is At Least Partly Based On At Least One Speech Interaction Of The Particular Party That Occurred Prior To A Speech Interaction That Generated The Detected Speech Data, Wherein At Least A Portion Of The Adaptation Data Has Been Stored On A Particular Device Associated With The Particular Party 818 Receiving, From A Memory Of The Particular Device, Adaptation Data That Is At Least Partly Based On At Least One Speech Interaction Of The Particular Party That Occurred Prior To A Speech Interaction That Generated The Detected Speech Data, Wherein The Adaptation Data Has Been Stored On A Particular Device Associated With The Particular Party 812 Acquiring Adaptation Data That Is At Least Partly Based On At Least One Speech Interaction Of The Particular That Occurred Prior To A Speech Interaction That Generated The Detected Speech Data, Wherein At Least A Portion Of The Adaptation Data Has Been Stored On A Particular Device Associated With The Particular Party

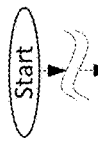

604 Acquiring Adaptation Data That Is At Least Partly Based On At Least One Speech Interaction Of A Particular Party That Is Discrete From The Detected Speech Data, Wherein At Least A Portion Of The Adaptation Data Has Been Stored On A Particular Device Associated With The Particular Party 828 Acquiring Adaptation Data In Response To A Detection Of A Particular Condition, Said Adaptation Data At Least Partly Based On At Least One Speech Interaction Of The Particular Party That Occurred Prior To A Speech Interaction That Generated The Detected Speech Data, Wherein At Least A Portion Of The Adaptation Data Has Been Stored On A Particular Device Associated With The Particular Party 830 Acquiring Adaptation Data In Response To The Particular Party Interacting With A Target Device To Which The Speech Data Is Directed, Said Adaptation Data At Least Partly Based On At Least One Speech Interaction Of The Particular Party That Occurred Prior To A Speech Interaction That Generated The Detected Speech Data, Wherein At Least A Portion Of The Adaptation Data Has Been Stored On A Particular Device Associated With The Particular Party 832 Acquiring Adaptation Data In Response To The Particular Party Inserting A Key Into A Motor Vehicle To Which The Speech Data Is Directed, Said Adaptation Data At Least Partly Based On At Least One Speech Interaction Of The Particular Party That Occurred Prior To A Speech Interaction That Generated The Detected Speech Data, Wherein At Least A Portion Of The Adaptation Data Has Been Stored On A Particular Device Associated With The Particular Party 834 Acquiring Adaptation Data In Response To The Particular Party Executing A Program On A Computing Device To Which The Speech Data Is Directed, Said Adaptation Data At Least Partly Based On At Least One Speech Interaction Of The Particular Party That Occurred Prior To A Speech Interaction That Generated The Detected Speech Data, Wherein At Least A Portion Of The Adaptation Data Has Been Stored On A Particular Device Associated With The Particular Party

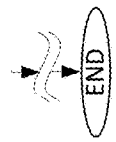

FIG. 8E

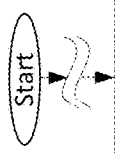

604 Acquiring Adaptation Data That Is At Least Partly Based On At Least One Speech Interaction Of A Particular Party That Is Discrete From The Detected Speech Data, Wherein At Least A Portion Of The Adaptation Data Has Been Stored On A Particular Device Associated With The Particular Party 828 Acquiring Adaptation Data In Response To A Detection Of A Particular Condition, Said Adaptation Data At Least Partly Based On At Least One Speech Interaction Of The Particular Party That Occurred Prior To A Speech Interaction That Generated The Detected Speech Data, Wherein At Least A Portion Of The Adaptation Data Has Been Stored On A Particular Device Associated With The Particular Party 836 Acquiring Adaptation Data In Response To A Detection Of The Particular Party At A Particular Location, Said Adaptation Data At Least Partly Based On At Least One Speech Interaction Of The Particular Party That Occurred Prior To A Speech Interaction That Generated The Detected Speech Data, Wherein At Least A Portion Of The Adaptation Data Has Been Stored On A Particular Device Associated With The Particular Party 838 Acquiring Adaptation Data In Response To A Detection Of The Particular Party Within A Particular Proximity Of A Target Device, Said Adaptation Data At Least Partly Based On At Least One Speech Interaction Of The Particular Party That Occurred Prior To A Speech Interaction That Generated The Detected Speech Data, Wherein At Least A Portion Of The Adaptation Data Has Been Stored On A Particular Device Associated With The Particular Party

FIG. 8F

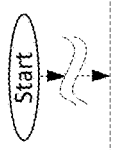
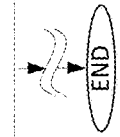

FIG. 8G

604 Acquiring Adaptation Data That Is At Least Partly Based On At Least One Speech Interaction Of A Particular Party That Is Discrete From The Detected Speech Data, Wherein At Least A Portion Of The Adaptation Data Has Been Stored On A Particular Device Associated With The Particular Party 840 Acquiring Adaptation Data, From A Further Device, Said Adaptation Data At Least Partly Based On At Least One Speech Interaction Of A Particular Party That Is Discrete From The Detected Speech Data, Wherein At Least A Portion Of The Adaptation Data Has Been Stored On A Particular Device Associated With The Particular Party 842 Acquiring Adaptation Data From A Further Device, Said Adaptation Data Originating At The Further Device And At Least Partly Based On Least One Speech Interaction Of The Particular Party That Is Discrete From The Detected Speech Data, Wherein At Least A Portion Of The Adaptation Data Has Been Stored On A Particular Device Associated With The Particular Party 844 Acquiring Adaptation Data From A Further Device Related To The Particular Device, Said Adaptation Data Originating At The Further Device And At Least Partly Based On Least One Speech Interaction Of The Particular Party That Is Discrete From The Detected Speech Data, Wherein At Least A Portion Of The Adaptation Data Has Been Stored On A Particular Device Associated With The Particular Party 846 Acquiring Adaptation Data From A Further Device Associated With The Particular Party, Said Adaptation Data Originating At The Further Device And At Least Partly Based On Least One Speech Interaction Of The Particular Party That Is Discrete From The Detected Speech Data, Wherein At Least A Portion Of The Adaptation Data Has Been Stored On A Particular Device Associated With The Particular Party 848 Acquiring Adaptation Data From A Further Device In Communication With The Particular Device, Said Adaptation Data Originating At The Further Device And At Least Partly Based On Least One Speech Interaction Of The Particular Party That Is Discrete From The Detected Speech Data, Wherein At Least A Portion Of The Adaptation Data Has Been Stored On A Particular Device Associated With The Particular Party

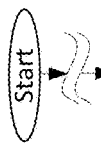

FIG. 8H

604 Acquiring Adaptation Data That Is At Least Partly Based On At Least One Speech Interaction Of A Particular Party That Is Discrete From The Detected Speech Data, Wherein At Least A Portion Of The Adaptation Data Has Been Stored On A Particular Device Associated With The Particular Party

840 Acquiring Adaptation Data, From A Further Device, Said Adaptation Data At Least Partly Based On At Least One Speech Interaction Of A Particular Party That Is Discrete From The Detected Speech Data, Wherein At Least A Portion Of The Adaptation Data Has Been Stored On A Particular Device Associated With The Particular Party

844 Acquiring Adaptation Data From A Further Device Related To The Particular Device, Said Adaptation Data Originating At The Further Device And At Least Partly Based On Least One Speech Interaction Of The Particular Party That Is Discrete From The Detected Speech Data, Wherein At Least A Portion Of The Adaptation Data Has Been Stored On A Particular Device Associated With The Particular Party

850 Acquiring Adaptation Data From A Further Device That Is At Least Partially Controlled By The Particular Device, Said Adaptation Data Originating At The Further Device And At Least Partly Based On Least One Speech Interaction Of The Particular Party That Is Discrete From The Detected Speech Data, Wherein At Least A Portion Of The Adaptation Data Has Been Stored On A Particular Device Associated With The Particular Party

852 Acquiring Adaptation Data From A Further Device, Said Adaptation Data Received By The Further Device From The Particular Device, And Said Adaptation Data At Least Partly Based On Least One Speech Interaction Of The Particular Party That Is Discrete From The Detected Speech Data, Wherein At Least A Portion Of The Adaptation Data Has Been Stored On A Particular Device Associated With The Particular Party

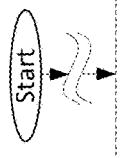
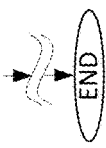

FIG. 8K

604 Acquiring Adaptation Data That Is At Least Partly Based On At Least One Speech Interaction Of A Particular Party That Is Discrete From The Detected Speech Data, Wherein At Least A Portion Of The Adaptation Data Has Been Stored On A Particular Device Associated With The Particular Party 864 Acquiring Adaptation Data That Is At Least Partly Based On At Least One Speech Interaction Of The Particular Party With A Particular Type Of Device, Said At Least One Speech Interaction Discrete From The Detected Speech Data, Wherein At Least A Portion Of The Adaptation Data Has Been Stored On A Particular Device Associated With The Particular Party 868 Acquiring Adaptation Data That Is At Least Partly Based On At Least One Speech Interaction Of The Particular Party With A Device That Has At Least One Characteristic In Common With A Target Device That Is Configured To Receive The Speech Data, Said At Least One Speech Interaction Is Discrete From The Detected Speech Data, Wherein At Least A Portion Of The Adaptation Data Has Been Stored On A Particular Device Associated With The Particular Party 870 Acquiring Adaptation Data That Is At Least Partly Based On At Least One Speech Interaction Of The Particular Party With A Device That Communicates On A Same Type Of Communication Network As The Target Device That Is Configured To Receive The Speech Data, Said At Least One Speech Interaction Is Discrete From The Detected Speech Data, Wherein At Least A Portion Of The Adaptation Data Has Been Stored On A Particular Device Associated With The Particular Party 872 Acquiring Adaptation Data That Is At Least Partly Based On At Least One Speech Interaction Of The Particular Party With A Device That Is Configured To Carry Out A Similar Function As The Target Device That Is Configured To Receive The Speech Data, Said At Least One Speech Interaction Is Discrete From The Detected Speech Data, Wherein At Least A Portion Of The Adaptation Data Has Been Stored On A Particular Device Associated With The Particular Party

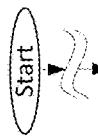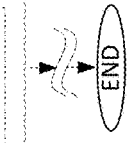

FIG. 8P

604 Acquiring Adaptation Data That Is At Least Partly Based On At Least One Speech Interaction Of A Particular Party That Is Discrete From The Detected Speech Data, Wherein At Least A Portion Of The Adaptation Data Has Been Stored On A Particular Device Associated With The Particular Party 896 Acquiring A Location Of One Or More Instructions For Modifying One Or More Portions Of A Speech Recognition Component Of A Target Device, Said Instructions At Least Partly Based On At Least One Speech Interaction Of A Particular Party That Is Discrete From The Detected Speech Data, Wherein At Least A Portion Of The Adaptation Data Has Been Stored On A Particular Device Associated With The Particular Party 898 Acquiring Adaptation Data That Is At Least Partly Based On At Least One Speech Interaction Of A Particular Party That Is Discrete From The Detected Speech Data, Wherein At Least A Portion Of The Adaptation Data Is Transmitted From The Particular Device Associated With The Particular Party 801 Acquiring Adaptation Data That Is At Least Partly Based On At Least One Speech Interaction Of A Particular Party That Is Discrete From The Detected Speech Data, Wherein At Least A Portion Of The Adaptation Data Is Stored On The Particular Device Associated With The Particular Party 803 Acquiring Adaptation Data That Is At Least Partly Based On At Least One Speech Interaction Of A Particular Party That Is Discrete From The Detected Speech Data, Wherein At Least A Portion Of The Adaptation Data Is Temporarily Stored On The Particular Device Associated With The Particular Party Until It Is Deposited At A Remote Server 805 Acquiring Adaptation Data That Is At Least Partly Based On At Least One Speech Interaction Of A Particular Party That Is Discrete From The Detected Speech Data, Wherein At Least A Portion Of The Adaptation Data Was Transmitted From A First Device To A Second Device Using The Particular Device Associated With The Particular Party As A Channel Configured To Facilitate The Transmission

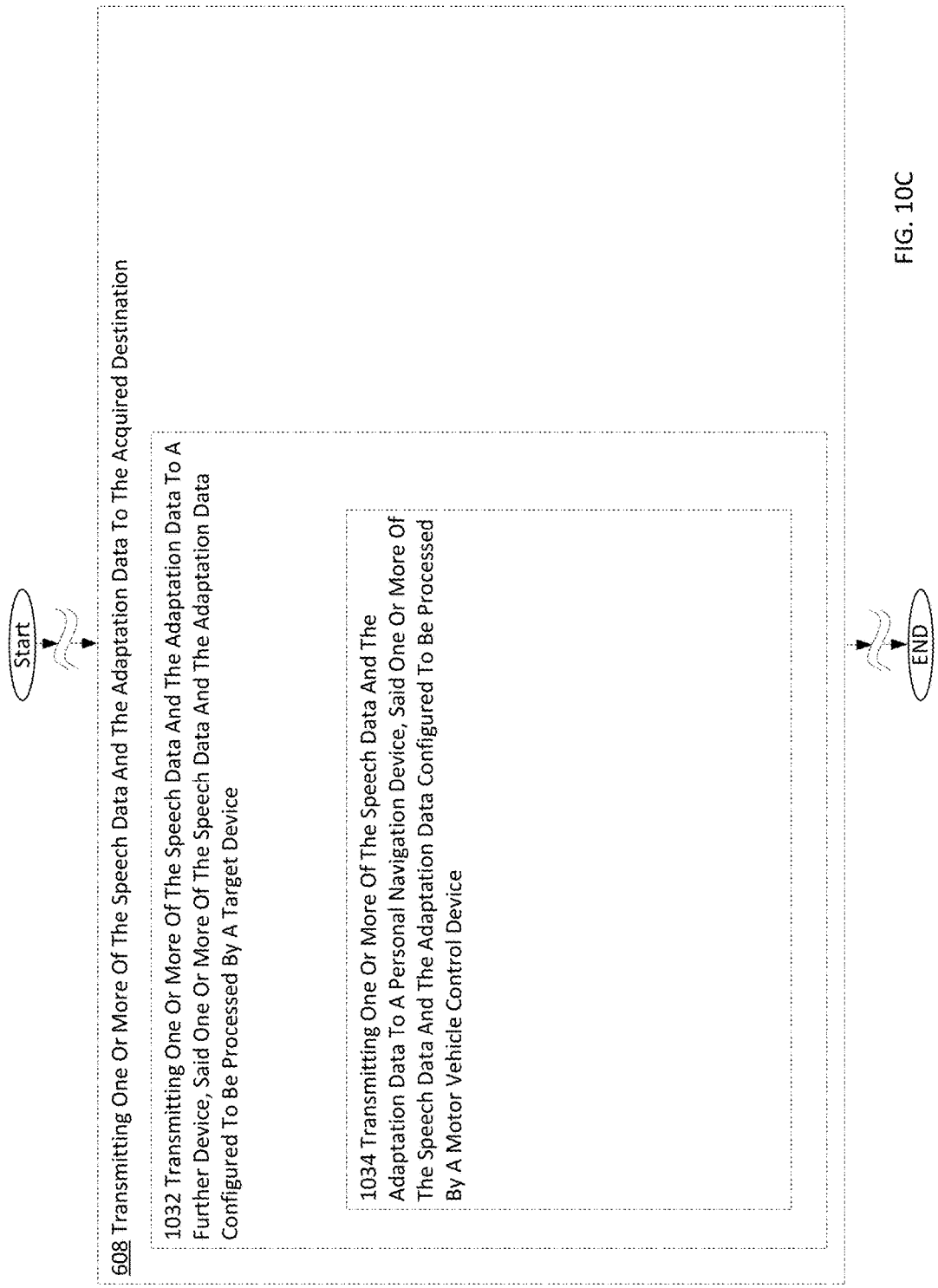

METHODS AND SYSTEMS FOR SPEECH
ADAPTATION DATA

CROSS-REFERENCE TO RELATED
APPLICATIONS

The present application is related to and claims the benefit of the earliest available effective filing date(s) from the following listed application(s) (the "Related Applications") (e.g., claims earliest available priority dates for other than provisional patent applications or claims benefits under 35 USC § 119(e) for provisional patent applications, for any and all parent, grandparent, great-grandparent, etc. applications of the Related Application(s)). All subject matter of the Related Applications and of any and all parent, grandparent, great-grandparent, etc. applications of the Related Applications, including any priority claims, is incorporated herein by reference to the extent such subject matter is not inconsistent herewith.

RELATED APPLICATIONS

For purposes of the USPTO extra-statutory requirements, the present application constitutes a continuation-in-part of U.S. patent application Ser. No. 13/485,733, entitled SPEECH RECOGNITION ADAPTATION SYSTEMS BASED ON ADAPTATION DATA, naming Royce A. Levien, Richard T. Lord, Robert W. Lord, Mark A. Malamud, and John D. Rinaldo, Jr. as inventors, filed 31 May 2012, which is currently co-pending or is an application of which a currently co-pending application is entitled to the benefit of the filing date.

For purposes of the USPTO extra-statutory requirements, the present application constitutes a continuation-in-part of U.S. patent application Ser. No. 13/485,738, entitled SPEECH RECOGNITION ADAPTATION SYSTEMS BASED ON ADAPTATION DATA, naming Royce A. Levien, Richard T. Lord, Robert W. Lord, Mark A. Malamud, and John D. Rinaldo, Jr. as inventors, filed 31 May 2012, which is currently co-pending or is an application of which a currently co-pending application is entitled to the benefit of the filing date.

For purposes of the USPTO extra-statutory requirements, the present application constitutes a continuation-in-part of U.S. patent application Ser. No. 13/538,855, entitled SPEECH RECOGNITION ADAPTATION SYSTEMS BASED ON ADAPTATION DATA, naming Royce A. Levien, Richard T. Lord, Robert W. Lord, Mark A. Malamud, and John D. Rinaldo, Jr. as inventors, filed 29 Jun. 2012, which is currently co-pending or is an application of which a currently co-pending application is entitled to the benefit of the filing date.

For purposes of the USPTO extra-statutory requirements, the present application constitutes a continuation-in-part of U.S. patent application Ser. No. 13/538,866, entitled SPEECH RECOGNITION ADAPTATION SYSTEMS BASED ON ADAPTATION DATA, naming Royce A. Levien, Richard T. Lord, Robert W. Lord, Mark A. Malamud, and John D. Rinaldo, Jr. as inventors, filed 29 Jun. 2012, which is currently co-pending or is an application of which a currently co-pending application is entitled to the benefit of the filing date.

For purposes of the USPTO extra-statutory requirements, the present application constitutes a continuation-in-part of U.S. patent application Ser. No. 13/564,647, entitled SPEECH RECOGNITION ADAPTATION SYSTEMS BASED ON ADAPTATION DATA, naming Royce A. Levien, Richard T. Lord, Robert W. Lord, Mark A. Malamud, and John D. Rinaldo, Jr. as inventors, filed 1 Aug. 2012, which is currently co-pending or is an application of which a currently co-pending application is entitled to the benefit of the filing date.

For purposes of the USPTO extra-statutory requirements, the present application constitutes a continuation-in-part of U.S. patent application Ser. No. 13/564,649, entitled SPEECH RECOGNITION ADAPTATION SYSTEMS BASED ON ADAPTATION DATA, naming Royce A. Levien, Richard T. Lord, Robert W. Lord, Mark A. Malamud, and John D. Rinaldo, Jr. as inventors, filed 1 Aug. 2012, now U.S Pat. No. 8,843,371 which is entitled to the benefit of the filing date.

For purposes of the USPTO extra-statutory requirements, the present application constitutes a continuation-in-part of U.S. patent application Ser. No. 13/564,650, entitled SPEECH RECOGNITION ADAPTATION SYSTEMS BASED ON ADAPTATION DATA, naming Royce A. Levien, Richard T. Lord, Robert W. Lord, Mark A. Malamud, and John D. Rinaldo, Jr. as inventors, filed 1 Aug. 2012, now U.S Pat No. 8,843,371 application is entitled to the benefit of the filing date.

For purposes of the USPTO extra-statutory requirements, the present application constitutes a continuation-in-part of U.S. patent application Ser. No. 13/564,651, entitled SPEECH RECOGNITION ADAPTATION SYSTEMS BASED ON ADAPTATION DATA, naming Royce A. Levien, Richard T. Lord, Robert W. Lord, Mark A. Malamud, and John D. Rinaldo, Jr. as inventors, filed 1 Aug. 2012, which is currently co-pending or is an application of which a currently co-pending application is entitled to the benefit of the filing date.

For purposes of the USPTO extra-statutory requirements, the present application constitutes a continuation-in-part of U.S patent application Ser. No. 13/609,143, entitled METHODS AND SYSTEMS FOR SPEECH ADAPTATION DATA, naming Royce A. Levien, Richard T. Lord, Robert W. Lord, and Mark A. Malamud as inventors, filed 10 Sep. 2012, which is currently co-pending or is an application of which a currently co-pending application is entitled to the benefit of the filing date.

For purposes of the USPTO extra-statutory requirements, the present application constitutes a continuation-in-part of U.S patent application Ser. No. 13/609,145, entitled METHODS AND SYSTEMS FOR SPEECH ADAPTATION DATA, naming Royce A. Levien, Richard T. Lord, Robert W. Lord, and Mark A. Malamud as inventors, filed 10 Sep. 2012, which is currently co-pending or is an application of which a currently co-pending application is entitled to the benefit of the filing date.

The United States Patent Office (USPTO) has published a notice to the effect that the USPTO's computer programs require that patent applicants reference both a serial number and indicate whether an application is a continuation, continuation-in-part, or divisional of a parent application. Stephen G. Kunin, Benefit of Prior-Filed Application, USPTO Official Gazette Mar. 18, 2003. The present Applicant Entity (hereinafter "Applicant") has provided above a specific reference to the application(s) from which priority is being claimed as recited by statute. Applicant understands that the statute is unambiguous in its specific reference language and does not require either a serial number or any characterization, such as "continuation" or "continuation-in-part," for claiming priority to U.S. patent applications. Notwithstanding the foregoing, Applicant understands that the USPTO's computer programs have certain data entry requirements, and hence Applicant has provided designation(s) of a relationship between the present application and its parent application(s) as set forth above, but expressly points out that such designation(s) are not to be construed in any way as any type of commentary and/or admission as to whether or not the present application contains any new matter in addition to the matter of its parent application(s).

BACKGROUND

This application is related to adaptation data related to speech processing.

SUMMARY

In one or more various aspects, a method includes but is not limited to detecting speech data related to a speech-facilitated transaction, acquiring adaptation data that is at least partly based on at least one speech interaction of a particular party that is discrete from the detected speech data, wherein at least a portion of the adaptation data has been stored on a particular device associated with the particular party, obtaining a destination of one or more of the adaptation data and the speech data, and transmitting one or more of the speech data and the adaptation data to the acquired destination. In addition to the foregoing, other method aspects are described in the claims, drawings, and text forming a part of the disclosure set forth herein.

In one or more various aspects, one or more related systems may be implemented in machines, compositions of matter, or manufactures of systems, limited to patentable subject matter under 35 U.S.C. 101. The one or more related systems may include, but are not limited to, circuitry and/or programming for effecting the herein-referenced method aspects. The circuitry and/or programming may be virtually any combination of hardware, software, and/or firmware configured to effect the herein-referenced method aspects depending upon the design choices of the system designer, and limited to patentable subject matter under 35 USC 101.

In one or more various aspects, a system includes, but is not limited to, means for detecting speech data related to a speech-facilitated transaction, means for acquiring adaptation data that is at least partly based on at least one speech interaction of a particular party that is discrete from the detected speech data, wherein at least a portion of the adaptation data has been stored on a particular device associated with the particular party, means for obtaining a destination of one or more of the adaptation data and the speech data, and means for transmitting one or more of the speech data and the adaptation data to the acquired destination. In addition to the foregoing, other system aspects are described in the claims, drawings, and text forming a part of the disclosure set forth herein.

In one or more various aspects, a system includes, but is not limited to, circuitry for detecting speech data related to a speech-facilitated transaction, circuitry for acquiring adaptation data that is at least partly based on at least one speech interaction of a particular party that is discrete from the detected speech data, wherein at least a portion of the adaptation data has been stored on a particular device associated with the particular party, circuitry for obtaining a destination of one or more of the adaptation data and the speech data, and circuitry for transmitting one or more of the speech data and the adaptation data to the acquired destination. In addition to the foregoing, other system aspects are described in the claims, drawings, and text forming a part of the disclosure set forth herein.

In one or more various aspects, a computer program product, comprising a signal bearing medium, bearing one or more instructions including, but not limited to, one or more instructions for detecting speech data related to a speech-facilitated transaction, one or more instructions for acquiring adaptation data that is at least partly based on at least one speech interaction of a particular party that is discrete from the detected speech data, wherein at least a portion of the adaptation data has been stored on a particular device associated with the particular party, one or more instructions for obtaining a destination of one or more of the adaptation data and the speech data, and one or more instructions for transmitting one or more of the speech data and the adaptation data to the acquired destination. In addition to the foregoing, other computer program product aspects are described in the claims, drawings, and text forming a part of the disclosure set forth herein.

In one or more various aspects, a device is defined by a computational language, such that the device comprises one or more interchained physical machines ordered for detecting speech data related to a speech-facilitated transaction, one or more interchained physical machines ordered for acquiring adaptation data that is at least partly based on at least one speech interaction of a particular party that is discrete from the detected speech data, wherein at least a portion of the adaptation data has been stored on a particular device associated with the particular party, one or more interchained physical machines ordered for obtaining a destination of one or more of the adaptation data and the speech data, one or more interchained physical machines ordered for transmitting one or more of the speech data and the adaptation data to the acquired destination.

In addition to the foregoing, various other method and/or system and/or program product aspects are set forth and described in the teachings such as text (e.g., claims and/or detailed description) and/or drawings of the present disclosure.

The foregoing is a summary and thus may contain simplifications, generalizations, inclusions, and/or omissions of detail; consequently, those skilled in the art will appreciate that the summary is illustrative only and is NOT intended to be in any way limiting. Other aspects, features, and advantages of the devices and/or processes and/or other subject matter described herein will become apparent by reference to the detailed description, the corresponding drawings, and/or in the teachings set forth herein.

BRIEF DESCRIPTION OF THE FIGURES

For a more complete understanding of embodiments, reference now is made to the following descriptions taken in connection with the accompanying drawings. The use of the same symbols in different drawings typically indicates similar or identical items, unless context dictates otherwise. The illustrative embodiments described in the detailed description, drawings, and claims are not meant to be limiting. Other embodiments may be utilized, and other changes may be made, without departing from the spirit or scope of the subject matter presented here.

FIG. 1E shows a high-level diagram of an exemplary environment 100''', which is an example of an exemplary embodiment 100 having a personal device 120, according to an embodiment.

FIG. 2, including

FIGS. 3A-3K, shows adaptation data at least partly based on discrete speech interaction of particular party separate from detected speech data, and has been stored on a particular party-associated particular device acquiring module 154 of the personal device 120 of environment 100 of FIG. 1B.

FIG. 4, including FIGS. 4A-4D, shows a particular perspective of destination of one or more of the adaptation data and the speech data acquiring module 156 of the personal device 120 of environment 100 of FIG. 1B.

FIG. 7D is a high-level logic flowchart of a process depicting alternate implementations of a detecting speech data operation 602 of FIG. 6, according to one or more embodiments.

FIG. 8C is a high-level logic flowchart of a process depicting alternate implementations of an acquiring adaptation data operation 604 of FIG. 6, according to one or more embodiments.

FIG. 8E is a high-level logic flowchart of a process depicting alternate implementations of an acquiring adaptation data operation 604 of FIG. 6, according to one or more embodiments.

FIG. 8F is a high-level logic flowchart of a process depicting alternate implementations of an acquiring adaptation data operation 604 of FIG. 6, according to one or more embodiments.

FIG. 8G is a high-level logic flowchart of a process depicting alternate implementations of an acquiring adaptation data operation 604 of FIG. 6, according to one or more embodiments.

FIG. 8H is a high-level logic flowchart of a process depicting alternate implementations of an acquiring adaptation data operation 604 of FIG. 6, according to one or more embodiments.

FIG. 8K is a high-level logic flowchart of a process depicting alternate implementations of an acquiring adaptation data operation 604 of FIG. 6, according to one or more embodiments.

FIG. 8P is a high-level logic flowchart of a process depicting alternate implementations of an acquiring adaptation data operation 604 of FIG. 6, according to one or more embodiments.

FIG. 10C is a high-level logic flowchart of a process depicting alternate implementations of a transmitting operation 608 of FIG. 6, according to one or more embodiments.

DETAILED DESCRIPTION

Figure 1A:
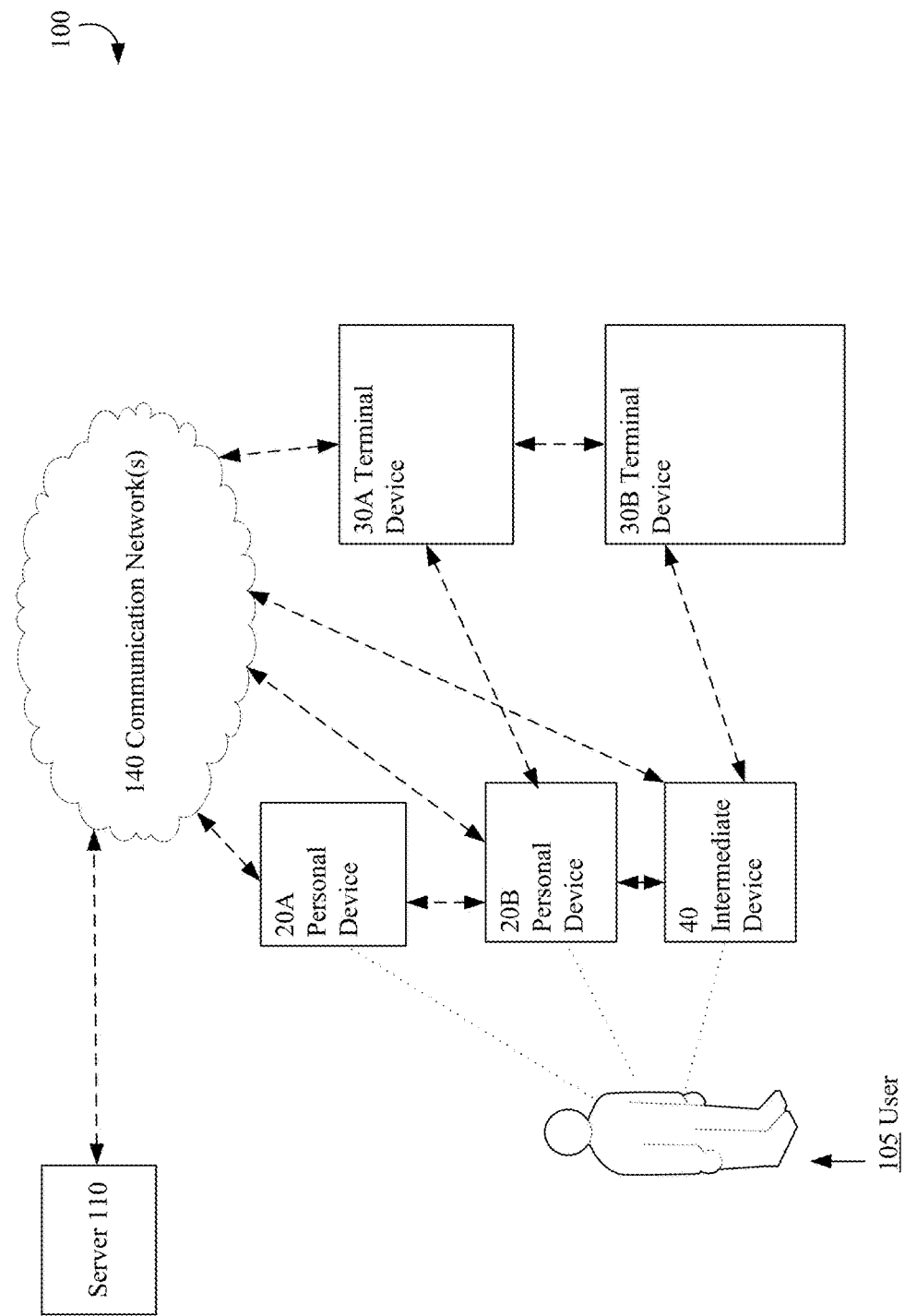
FIG. 1A shows a high-level block diagram of an exemplary environment 100, according to an embodiment.

In the following detailed description, reference is made to the accompanying drawings, which form a part hereof. In the drawings, similar symbols typically identify similar or identical components or items, unless context dictates otherwise. The illustrative embodiments described in the detailed description, drawings, and claims are not meant to be limiting. Other embodiments may be utilized, and other changes may be made, without departing from the spirit or scope of the subject matter presented here.

In accordance with various embodiments, computationally implemented methods, systems, circuitry, articles of manufacture, and computer program products are designed to, among other things, provide an interface for detecting speech data related to a speech-facilitated transaction, acquiring adaptation data that is at least partly based on at least one speech interaction of a particular party that is discrete from the detected speech data, wherein at least a portion of the adaptation data has been stored on a particular device associated with the particular party, obtaining a destination of one or more of the adaptation data and the speech data, and transmitting one or more of the speech data and the adaptation data to the acquired destination.

The present application uses formal outline headings for clarity of presentation. However, it is to be understood that the outline headings are for presentation purposes, and that different types of subject matter may be discussed throughout the application (e.g., device(s)/structure(s) may be described under process(es)/operations heading(s) and/or process(es)/operations may be discussed under structure(s)/process(es) headings; and/or descriptions of single topics may span two or more topic headings). Hence, the use of the formal outline headings is not intended to be in any way limiting.

Throughout this application, examples and lists are given, with parentheses, the abbreviation "e.g.," or both. Unless explicitly otherwise stated, these examples and lists are merely exemplary and are non-exhaustive. In most cases, it would be prohibitive to list every example and every combination. Thus, smaller, illustrative lists and examples are used, with focus on imparting understanding of the claim terms rather than limiting the scope of such terms.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken limiting.

Although user 105 is shown/described herein as a single illustrated figure, those skilled in the art will appreciate that user 105 may be representative of a human user, a robotic user (e.g., computational entity), and/or substantially any combination thereof (e.g., a user may be assisted by one or more robotic agents) unless context dictates otherwise. Those skilled in the art will appreciate that, in general, the same may be said of "sender" and/or other entity-oriented terms as such terms are used herein unless context dictates otherwise.

Those having skill in the art will recognize that the state of the art has progressed to the point where there is little distinction left between hardware, software, and/or firmware implementations of aspects of systems; the use of hardware, software, and/or firmware is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware in one or more machines, compositions of matter, and articles of manufacture, limited to patentable subject matter under 35 USC 101. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

In some implementations described herein, logic and similar implementations may include software or other control structures. Electronic circuitry, for example, may have one or more paths of electrical current constructed and arranged to implement various functions as described herein. In some implementations, one or more media may be configured to bear a device-detectable implementation when such media hold or transmit device detectable instructions operable to perform as described herein. In some variants, for example, implementations may include an update or modification of existing software or firmware, or of gate arrays or programmable hardware, such as by performing a reception of or a transmission of one or more instructions in relation to one or more operations described herein. Alternatively or additionally, in some variants, an implementation may include special-purpose hardware, software, firmware components, and/or general-purpose components executing or otherwise invoking special-purpose components. Specifications or other implementations may be transmitted by one or more instances of tangible transmission media as described herein, optionally by packet transmission or otherwise by passing through distributed media at various times.

Alternatively or additionally, implementations may include executing a special-purpose instruction sequence or invoking circuitry for enabling, triggering, coordinating, requesting, or otherwise causing one or more occurrences of virtually any functional operations described herein. In some variants, operational or other logical descriptions herein may be expressed as source code and compiled or otherwise invoked as an executable instruction sequence. In some contexts, for example, implementations may be provided, in whole or in part, by source code, such as C++, or other code sequences. In other implementations, source or other code implementation, using commercially available and/or techniques in the art, may be compiled//implemented/translated/converted into a high-level descriptor language (e.g., initially implementing described technologies in C or C++ programming language and thereafter converting the programming language implementation into a logic-synthesizable language implementation, a hardware description language implementation, a hardware design simulation implementation, and/or other such similar mode(s) of expression). For example, some or all of a logical expression (e.g., computer programming language implementation) may be manifested as a Verilog-type hardware description (e.g., via Hardware Description Language (HDL) and/or Very High Speed Integrated Circuit Hardware Descriptor Language (VHDL)) or other circuitry model which may then be used to create a physical implementation having hardware (e.g., an Application Specific Integrated Circuit). Those skilled in the art will recognize how to obtain, configure, and optimize suitable transmission or computational elements, material supplies, actuators, or other structures in light of these teachings.

The claims, description, and drawings of this application may describe one or more of the instant technologies in operational/functional language, for example as a set of operations to be performed by a computer. Such operational/functional description in most instances would be understood by one skilled the art as specifically-configured hardware (e.g., because a general purpose computer in effect becomes a special purpose computer once it is programmed to perform particular functions pursuant to instructions from program software).

Importantly, although the operational/functional descriptions described herein are understandable by the human mind, they are not abstract ideas of the operations/functions divorced from computational implementation of those operations/functions. Rather, the operations/functions represent a specification for the massively complex computational machines or other means. As discussed in detail below, the operational/functional language must be read in its proper technological context, i.e., as concrete specifications for physical implementations.

The logical operations/functions described herein are a distillation of machine specifications or other physical mechanisms specified by the operations/functions such that the otherwise inscrutable machine specifications may be comprehensible to the human mind. The distillation also allows one of skill in the art to adapt the operational/functional description of the technology across many different specific vendors' hardware configurations or platforms, without being limited to specific vendors' hardware configurations or platforms.

Some of the present technical description (e.g., detailed description, drawings, claims, etc.) may be set forth in terms of logical operations/functions. As described in more detail in the following paragraphs, these logical operations/functions are not representations of abstract ideas, but rather representative of static or sequenced specifications of various hardware elements. Differently stated, unless context dictates otherwise, the logical operations/functions will be understood by those of skill in the art to be representative of static or sequenced specifications of various hardware elements. This is true because tools available to one of skill in the art to implement technical disclosures set forth in operational/functional formats—tools in the form of a high-level programming language (e.g., C, java, visual basic), etc.), or tools in the form of Very high speed Hardware Description Language ("VHDL," which is a language that uses text to describe logic circuits)—are generators of static or sequenced specifications of various hardware configurations. This fact is sometimes obscured by the broad term "software," but, as shown by the following explanation, those skilled in the art understand that what is termed "software" is shorthand for a massively complex interchaining/specification of ordered-matter elements. The term "ordered-matter elements" may refer to physical components of computation, such as assemblies of electronic logic gates, molecular computing logic constituents, quantum computing mechanisms, etc.

For example, a high-level programming language is a programming language with strong abstraction, e.g., multiple levels of abstraction, from the details of the sequential organizations, states, inputs, outputs, etc., of the machines that a high-level programming language actually specifies. See, e.g., Wikipedia, High-level programming language, http://en.wikipedia.org/wiki/High-level_programming_language (as of Jun. 5, 2012, 21:00 GMT). In order to facilitate human comprehension, in many instances, high-level programming languages resemble or even share symbols with natural languages. See, e.g., Wikipedia, Natural language, http://en.wikipedia.org/wiki/Natural_language (as of Jun. 5, 2012, 21:00 GMT).

It has been argued that because high-level programming languages use strong abstraction (e.g., that they may resemble or share symbols with natural languages), they are therefore a "purely mental construct." (e.g., that "software"—a computer program or computer programming—is somehow an ineffable mental construct, because at a high level of abstraction, it can be conceived and understood in the human mind). This argument has been used to characterize technical description in the form of functions/operations as somehow "abstract ideas." In fact, in technological arts (e.g., the information and communication technologies) this is not true.

The fact that high-level programming languages use strong abstraction to facilitate human understanding should not be taken as an indication that what is expressed is an abstract idea. In fact, those skilled in the art understand that just the opposite is true. If a high-level programming language is the tool used to implement a technical disclosure in the form of functions/operations, those skilled in the art will recognize that, far from being abstract, imprecise, "fuzzy," or "mental" in any significant semantic sense, such a tool is instead a near incomprehensibly precise sequential specification of specific computational machines—the parts of which are built up by activating/selecting such parts from typically more general computational machines over time (e.g., clocked time). This fact is sometimes obscured by the superficial similarities between high-level programming languages and natural languages. These superficial similarities also may cause a glossing over of the fact that high-level programming language implementations ultimately perform valuable work by creating/controlling many different computational machines.

The many different computational machines that a high-level programming language specifies are almost unimaginably complex. At base, the hardware used in the computational machines typically consists of some type of ordered matter (e.g., traditional electronic devices (e.g., transistors), deoxyribonucleic acid (DNA), quantum devices, mechanical switches, optics, fluidics, pneumatics, optical devices (e.g., optical interference devices), molecules, etc.) that are arranged to form logic gates. Logic gates are typically physical devices that may be electrically, mechanically, chemically, or otherwise driven to change physical state in order to create a physical reality of Boolean logic.

Logic gates may be arranged to form logic circuits, which are typically physical devices that may be electrically, mechanically, chemically, or otherwise driven to create a physical reality of certain logical functions. Types of logic circuits include such devices as multiplexers, registers, arithmetic logic units (ALUs), computer memory, etc., each type of which may be combined to form yet other types of physical devices, such as a central processing unit (CPU)—the best known of which is the microprocessor. A modern microprocessor will often contain more than one hundred million logic gates in its many logic circuits (and often more than a billion transistors). See, e.g., Wikipedia, Logic gates, http://en.wikipedia.org/wiki/Logic_gates (as of Jun. 5, 2012, 21:03 GMT).

The logic circuits forming the microprocessor are arranged to provide a microarchitecture that will carry out the instructions defined by that microprocessor's defined Instruction Set Architecture. The Instruction Set Architecture is the part of the microprocessor architecture related to programming, including the native data types, instructions, registers, addressing modes, memory architecture, interrupt and exception handling, and external Input/Output. See, e.g., Wikipedia, Computer architecture, http://en.wikipedia.org/wiki/Computer_architecture (as of Jun. 5, 2012, 21:03 GMT).

The Instruction Set Architecture includes a specification of the machine language that can be used by programmers to use/control the microprocessor. Since the machine language instructions are such that they may be executed directly by the microprocessor, typically they consist of strings of binary digits, or bits. For example, a typical machine language instruction might be many bits long (e.g., 32, 64, or 128 bit strings are currently common). A typical machine language instruction might take the form "11110000101011110000111100111111" (a 32 bit instruction).

It is significant here that, although the machine language instructions are written as sequences of binary digits, in actuality those binary digits specify physical reality. For example, if certain semiconductors are used to make the operations of Boolean logic a physical reality, the apparently mathematical bits "1" and "0" in a machine language instruction actually constitute shorthand that specifies the application of specific voltages to specific wires. For example, in some semiconductor technologies, the binary number "1" (e.g., logical "1") in a machine language instruction specifies around +5 volts applied to a specific "wire" (e.g., metallic traces on a printed circuit board) and the binary number "0" (e.g., logical "0") in a machine language instruction specifies around −5 volts applied to a specific "wire." In addition to specifying voltages of the machines' configuration, such machine language instructions also select out and activate specific groupings of logic gates from the millions of logic gates of the more general machine. Thus, far from abstract mathematical expressions, machine language instruction programs, even though written as a string of zeros and ones, specify many, many constructed physical machines or physical machine states.

Machine language is typically incomprehensible by most humans (e.g., the above example was just ONE instruction, and some personal computers execute more than two billion instructions every second). See, e.g., Wikipedia, Instructions per second, http://en.wikipedia.org/wiki/Instructions_per_second (as of Jun. 5, 2012, 21:04 GMT). Thus, programs written in machine language—which may be tens of millions of machine language instructions long—are incomprehensible. In view of this, early assembly languages were developed that used mnemonic codes to refer to machine language instructions, rather than using the machine language instructions' numeric values directly (e.g., for performing a multiplication operation, programmers coded the abbreviation "mult," which represents the binary number "011000" in MIPS machine code). While assembly languages were initially a great aid to humans controlling the microprocessors to perform work, in time the complexity of the work that needed to be done by the humans outstripped the ability of humans to control the microprocessors using merely assembly languages.

At this point, it was noted that the same tasks needed to be done over and over, and the machine language necessary to do those repetitive tasks was the same. In view of this, compilers were created. A compiler is a device that takes a statement that is more comprehensible to a human than either machine or assembly language, such as "add 2+2 and output the result," and translates that human understandable statement into a complicated, tedious, and immense machine language code (e.g., millions of 32, 64, or 128 bit length strings). Compilers thus translate high-level programming language into machine language.

This compiled machine language, as described above, is then used as the technical specification which sequentially constructs and causes the interoperation of many different computational machines such that humanly useful, tangible, and concrete work is done. For example, as indicated above, such machine language—the compiled version of the higher-level language—functions as a technical specification which selects out hardware logic gates, specifies voltage levels, voltage transition timings, etc., such that the humanly useful work is accomplished by the hardware.

Thus, a functional/operational technical description, when viewed by one of skill in the art, is far from an abstract idea. Rather, such a functional/operational technical description, when understood through the tools available in the art such as those just described, is instead understood to be a humanly understandable representation of a hardware specification, the complexity and specificity of which far exceeds the comprehension of most any one human. With this in mind, those skilled in the art will understand that any such operational/functional technical descriptions—in view of the disclosures herein and the knowledge of those skilled in the art—may be understood as operations made into physical reality by (a) one or more interchained physical machines, (b) interchained logic gates configured to create one or more physical machine(s) representative of sequential/combinatorial logic(s), (c) interchained ordered matter making up logic gates (e.g., interchained electronic devices (e.g., transistors), DNA, quantum devices, mechanical switches, optics, fluidics, pneumatics, molecules, etc.) that create physical reality representative of logic(s), or (d) virtually any combination of the foregoing. Indeed, any physical object which has a stable, measurable, and changeable state may be used to construct a machine based on the above technical description. Charles Babbage, for example, constructed the first computer out of wood and powered by cranking a handle.

Thus, far from being understood as an abstract idea, those skilled in the art will recognize a functional/operational technical description as a humanly-understandable representation of one or more almost unimaginably complex and time sequenced hardware instantiations. The fact that functional/operational technical descriptions might lend themselves readily to high-level computing languages (or high-level block diagrams for that matter) that share some words, structures, phrases, etc. with natural language simply cannot be taken as an indication that such functional/operational technical descriptions are abstract ideas, or mere expressions of abstract ideas. In fact, as outlined herein, in the technological arts this is simply not true. When viewed through the tools available to those of skill in the art, such functional/operational technical descriptions are seen as specifying hardware configurations of almost unimaginable complexity.

As outlined above, the reason for the use of functional/operational technical descriptions is at least twofold. First, the use of functional/operational technical descriptions allows near-infinitely complex machines and machine operations arising from interchained hardware elements to be described in a manner that the human mind can process (e.g., by mimicking natural language and logical narrative flow). Second, the use of functional/operational technical descriptions assists the person of skill in the art in understanding the described subject matter by providing a description that is more or less independent of any specific vendor's piece(s) of hardware.

The use of functional/operational technical descriptions assists the person of skill in the art in understanding the described subject matter since, as is evident from the above discussion, one could easily, although not quickly, transcribe the technical descriptions set forth in this document as trillions of ones and zeroes, billions of single lines of assembly-level machine code, millions of logic gates, thousands of gate arrays, or any number of intermediate levels of abstractions. However, if any such low-level technical descriptions were to replace the present technical description, a person of skill in the art could encounter undue difficulty in implementing the disclosure, because such a low-level technical description would likely add complexity without a corresponding benefit (e.g., by describing the subject matter utilizing the conventions of one or more vendor-specific pieces of hardware). Thus, the use of functional/operational technical descriptions assists those of skill in the art by separating the technical descriptions from the conventions of any vendor-specific piece of hardware.

In view of the foregoing, the logical operations/functions set forth in the present technical description are representative of static or sequenced specifications of various ordered-matter elements, in order that such specifications may be comprehensible to the human mind and adaptable to create many various hardware configurations. The logical operations/functions disclosed herein should be treated as such, and should not be disparagingly characterized as abstract ideas merely because the specifications they represent are presented in a manner that one of skill in the art can readily understand and apply in a manner independent of a specific vendor's hardware implementation.

Those skilled in the art will recognize that it is common within the art to implement devices and/or processes and/or systems, and thereafter use engineering and/or other practices to integrate such implemented devices and/or processes and/or systems into more comprehensive devices and/or processes and/or systems. That is, at least a portion of the devices and/or processes and/or systems described herein can be integrated into other devices and/or processes and/or systems via a reasonable amount of experimentation. Those having skill in the art will recognize that examples of such other devices and/or processes and/or systems might include—as appropriate to context and application—all or part of devices and/or processes and/or systems of (a) an air conveyance (e.g., an airplane, rocket, helicopter, etc.), (b) a ground conveyance (e.g., a car, truck, locomotive, tank, armored personnel carrier, etc.), (c) a building (e.g., a home, warehouse, office, etc.), (d) an appliance (e.g., a refrigerator, a washing machine, a dryer, etc.), (e) a communications system (e.g., a networked system, a telephone system, a Voice over IP system, etc.), (f) a business entity (e.g., an Internet Service Provider (ISP) entity such as Comcast Cable, Qwest, Southwestern Bell, etc.), or (g) a wired/wireless services entity (e.g., Sprint, Cingular, Nextel, etc.), etc.

In certain cases, use of a system or method may occur in a territory even if components are located outside the territory. For example, in a distributed computing context, use of a distributed computing system may occur in a territory even though parts of the system may be located outside of the territory (e.g., relay, server, processor, signal-bearing medium, transmitting computer, receiving computer, etc. located outside the territory).

A sale of a system or method may likewise occur in a territory even if components of the system or method are located and/or used outside the territory. Further, implementation of at least part of a system for performing a method in one territory does not preclude use of the system in another territory.

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken limiting.

The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components, and/or wirelessly interactable, and/or wirelessly interacting components, and/or logically interacting, and/or logically interactable components.

In some instances, one or more components may be referred to herein as "configured to," "configured by," "configurable to," "operable/operative to," "adapted/adaptable," "able to," "conformable/conformed to," etc. Those skilled in the art will recognize that such terms (e.g. "configured to") generally encompass active-state components and/or inactive-state components and/or standby-state components, unless context requires otherwise.

In a general sense, those skilled in the art will recognize that the various embodiments described herein can be implemented, individually and/or collectively, by various types of electro-mechanical systems having a wide range of electrical components such as hardware, software, firmware, and/or virtually any combination thereof, limited to patentable subject matter under 35 U.S.C. 101; and a wide range of components that may impart mechanical force or motion such as rigid bodies, spring or torsional bodies, hydraulics, electro-magnetically actuated devices, and/or virtually any combination thereof. Consequently, as used herein "electro-mechanical system" includes, but is not limited to, electrical circuitry operably coupled with a transducer (e.g., an actuator, a motor, a piezoelectric crystal, a Micro Electro Mechanical System (MEMS), etc.), electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), electrical circuitry forming a communications device (e.g., a modem, communications switch, optical-electrical equipment, etc.), and/or any non-electrical analog thereto, such as optical or other analogs (e.g., graphene based circuitry). Those skilled in the art will also appreciate that examples of electro-mechanical systems include but are not limited to a variety of consumer electronics systems, medical devices, as well as other systems such as motorized transport systems, factory automation systems, security systems, and/or communication/computing systems. Those skilled in the art will recognize that electro-mechanical as used herein is not necessarily limited to a system that has both electrical and mechanical actuation except as context may dictate otherwise.

In a general sense, those skilled in the art will recognize that the various aspects described herein which can be implemented, individually and/or collectively, by a wide range of hardware, software, firmware, and/or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), and/or electrical circuitry forming a communications device (e.g., a modem, communications switch, optical-electrical equipment, etc.). Those having skill in the art will recognize that the subject matter described herein may be implemented in an analog or digital fashion or some combination thereof.

Those skilled in the art will recognize that at least a portion of the devices and/or processes described herein can be integrated into a data processing system. Those having skill in the art will recognize that a data processing system generally includes one or more of a system unit housing, a video display device, memory such as volatile or non-volatile memory, processors such as microprocessors or digital signal processors, computational entities such as operating systems, drivers, graphical user interfaces, and applications programs, one or more interaction devices (e.g., a touch pad, a touch screen, an antenna, etc.), and/or control systems including feedback loops and control motors (e.g., feedback for sensing position and/or velocity; control motors for moving and/or adjusting components and/or quantities). A data processing system may be implemented utilizing suitable commercially available components, such as those typically found in data computing/communication and/or network computing/communication systems.

For the purposes of this application, "cloud" computing may be understood as described in the cloud computing literature. For example, cloud computing may be methods and/or systems for the delivery of computational capacity and/or storage capacity as a service. The "cloud" may refer to one or more hardware and/or software components that deliver or assist in the delivery of computational and/or storage capacity, including, but not limited to, one or more of a client, an application, a platform, an infrastructure, and/or a server The cloud may refer to any of the hardware and/or software associated with a client, an application, a platform, an infrastructure, and/or a server. For example, cloud and cloud computing may refer to one or more of a computer, a processor, a storage medium, a router, a switch, a modem, a virtual machine (e.g., a virtual server), a data center, an operating system, a middleware, a firmware, a hardware back-end, a software back-end, and/or a software application. A cloud may refer to a private cloud, a public cloud, a hybrid cloud, and/or a community cloud. A cloud may be a shared pool of configurable computing resources, which may be public, private, semi-private, distributable, scalable, flexible, temporary, virtual, and/or physical. A cloud or cloud service may be delivered over one or more types of network, e.g., a mobile communication network, and the Internet.

As used in this application, a cloud or a cloud service may include one or more of infrastructure-as-a-service ("IaaS"), platform-as-a-service ("PaaS"), software-as-a-service ("SaaS"), and/or desktop-as-a-service ("DaaS"). As a non-exclusive example, IaaS may include, e.g., one or more virtual server instantiations that may start, stop, access, and/or configure virtual servers and/or storage centers (e.g., providing one or more processors, storage space, and/or network resources on-demand, e.g., EMC and Rackspace). PaaS may include, e.g., one or more software and/or development tools hosted on an infrastructure (e.g., a computing platform and/or a solution stack from which the client can create software interfaces and applications, e.g., Microsoft Azure). SaaS may include, e.g., software hosted by a service provider and accessible over a network (e.g., the software for the application and/or the data associated with that software application may be kept on the network, e.g., Google Apps, SalesForce). DaaS may include, e.g., providing desktop, applications, data, and/or services for the user over a network (e.g., providing a multi-application framework, the applications in the framework, the data associated with the applications, and/or services related to the applications and/or the data over the network, e.g., Citrix). The foregoing is intended to be exemplary of the types of systems and/or methods referred to in this application as "cloud" or "cloud computing" and should not be considered complete or exhaustive.

The proliferation of automation in many transactions is apparent. For example, Automated Teller Machines ("ATMs") dispense money and receive deposits. Airline ticket counter machines check passengers in, dispense tickets, and allow passengers to change or upgrade flights. Train and subway ticket counter machines allow passengers to purchase a ticket to a particular destination without invoking a human interaction at all. Many groceries and pharmacies have self-service checkout machines which allow a consumer to pay for goods purchased by interacting only with a machine. Large companies now staff telephone answering systems with machines that interact with customers, and invoke a human in the transaction only if there is a problem with the machine-facilitated transaction.

Nevertheless, as such automation increases, convenience and accessibility may decrease. Self-checkout machines at grocery stores may be difficult to operate. ATMs and ticket counter machines may be mostly inaccessible to disabled persons or persons requiring special access. Where before, the interaction with a human would allow disabled persons to complete transactions with relative ease, if a disabled person is unable to push the buttons on an ATM, there is little the machine can do to facilitate the transaction to completion. While some of these public terminals allow speech operations, they are configured to the most generic forms of speech, which may be less useful in recognizing particular speakers, thereby leading to frustration for users attempting to speak to the machine. This problem may be especially challenging for the disabled, who already may face significant challenges in completing transactions with automated machines.

In addition, smartphones and tablet devices also now are configured to receive speech commands. Speech and voice controlled automobile systems now appear regularly in motor vehicles, even in economical, mass-produced vehicles. Home entertainment devices, e.g., disc players, televisions, radios, stereos, and the like, may respond to speech commands. Additionally, home security systems may respond to speech commands. In an office setting, a worker's computer may respond to speech from that worker, allowing faster, more efficient work flows. Such systems and machines may be trained to operate with particular users, either through explicit training or through repeated interactions. Nevertheless, when that system is upgraded or replaced, e.g., a new television is purchased, that training may be lost with the device. Thus, in some embodiments described herein, adaptation data for speech recognition systems may be separated from the device which recognizes the speech, and may be more closely associated with a user, e.g., through a device carried by the user, or through a network location associated with the user.

Further, in some environments, there may be more than one device that transmits and receives data within a range of interacting with a user. For example, merely sitting on a couch watching television may involve five or more devices, e.g., a television, a cable box, an audio/visual receiver, a remote control, and a smartphone device. Some of these devices may transmit or receive speech data. Some of these devices may transmit, receive, or store adaptation data, as will be described in more detail herein. Thus, in some embodiments, which will be described in more detail herein, there may be methods, systems, and devices for determining which devices in a system should perform actions that allow a user to efficiently interact with an intended device through that user's speech.

Referring now to FIG. 1, e.g., FIG. 1A, FIG. 1A illustrates an example environment 100 in which the methods, systems, circuitry, articles of manufacture, and computer program products and architecture, in accordance with various embodiments, may be implemented by one or more of personal device 20A, personal device 20B, intermediate device 40, target device 30A, and target device 30B. In some embodiments, e.g., as shown in FIG. 1B, personal device 120, which in some embodiments, may be an example of one of personal device 20A, personal device 20B, and intermediate device 40. The personal device 120, in various embodiments, may be endowed with logic that is designed for detecting speech data related to a speech-facilitated transaction, logic that is designed for acquiring adaptation data that is at least partly based on at least one speech interaction of a particular party that is discrete from the detected speech data, wherein at least a portion of the adaptation data has been stored on a particular device associated with the particular party, logic that is designed for obtaining a destination of one or more of the adaptation data and the speech data, and transmitting one or more of the speech data and the adaptation data to the acquired destination.

Referring again to the exemplary embodiment in FIG. 1A, a user 105 may engage in a speech facilitated transaction with one or more of a terminal device 30A and a terminal device 30B. In some embodiments, the speech-facilitated transaction may be directed to one of terminal device 30A or terminal device 30B. In some embodiments, the user may not specifically direct her speech toward terminal device 30A or terminal device 30B, but rather to both of them, with indifference toward which device carries out the speech-facilitated transaction. In some embodiments, one of the terminal device 30A and terminal device 30B negotiate between themselves to determine which device will carry out the speech-facilitated transaction. In some embodiments, one or more of the personal device 20A, the personal device 20B, and the intermediate device 40 may determine which of the terminal device 30A and terminal device 30B carries out the speech-facilitated transaction. In some embodiments, one or more of personal device 20A, personal device 20B, and intermediate device 40 may detect one or more of terminal device 30A and terminal device 30B, establish a connection, or negotiate with one or more of terminal devices 30A and 30B.

The dashed-line arrows shown in environment 100 of FIG. 1A are not labeled, but are intended to show the flow of data from one device to the other. Some data connections are omitted for simplicity of drawing, e.g., although there is no arrow, personal device 20A may communicate directly with terminal device 30A and terminal device 30B. The flow of data may include one or more adaptation data, speech data in any format, including raw speech from the user, adaptation result data, intended target data, target data, and the like. The dotted line arrows show an association between the user 105 and one or more of personal device 20A, personal device 20B, and intermediate device 40.

Although it is not shown in FIG. 1A, any or all of personal devices 20A, 20B, and 40 may communicate with any or all of terminal device 30A and terminal device 30B, either directly, or indirectly. In some embodiments, these devices communicate with each other via a server 110, which may be local or remote to any of the devices 20A, 20B, 30A, 30B, and 40. In some embodiments, these devices communicate with each other via one or more communication networks 140, which may be local or remote to any of the devices 20A, 20B, 30A, 30B, and 40. Although server 110 and communication network 40 are pictured in each of the embodiments in FIGS. 1A and 1C-1E, server 110 and communication network 140 are not required, and are shown merely for purposes of illustration.

Referring again to FIG. 1A, FIG. 1A shows personal device 20A, personal device 20B, intermediate device 40, terminal device 30A, terminal device 30B, and server 110. The number of devices is shown merely for illustrative purposes. In some embodiments, however, there may be a different number of personal devices, intermediate devices, terminal devices, servers, and communication networks. In some embodiments, one or more of the personal devices, intermediate devices, terminal devices, servers, and communication networks may be omitted entirely.

Referring again to FIG. 1A, personal device 20A and 20B are shown as associated with user 105. This association may be attenuated, e.g., they may merely be in the same physical proximity. In other embodiments, the association may be one of ownership, mutual contract, information storing, previous usage, or other factors. The examples described further herein will provide a non-exhaustive list of examples of relationships between user 105 and a personal device 20. In some embodiments, personal device 20 may be any size and have any specification. Personal device 20 may be a custom device of any shape or size, configured to transmit, receive, and store data. Personal device 20 may include, but is not limited to, a smartphone device, a tablet device, a personal computer device, a laptop device, a keychain device, a key, a personal digital assistant device, a modified memory stick, a universal remote control, or any other piece of electronics. In addition, personal device 20 may be a modified object that is worn, e.g., eyeglasses, a wallet, a credit card, a watch, a chain, or an article of clothing. Anything that is configured to store, transmit, and receive data may be a personal device 20, and personal device 20 is not limited in size to devices that are capable of being carried by a user. Additionally, personal device 20 may not be in direct proximity to the user, e.g., personal device 20 may be a computer sitting on a desk in a user's home or office.

Although terminal devices 30A and 30B are described as "terminal device," this is merely for simplicity of illustration. terminal device 30 could be any device that is configured to receive speech. For example, terminal device 30 may be a terminal, a computer, a navigation system, a phone, a piece of home electronics (e.g., a DVD player, Blu-Ray player, media player, game system, television, receiver, alarm clock, and the like). Terminal device 30 may, in some embodiments, be a home security system, a safe lock, a door lock, a kitchen appliance configured to receive speech, and the like. In some embodiments, terminal device 30 may be a motorized vehicle, e.g., a car, boat, airplane, motorcycle, golf cart, wheelchair, and the like. In some embodiments, terminal device 30 may be a piece of portable electronics, e.g., a laptop computer, a netbook computer, a tablet device, a smartphone, a cellular phone, a radio, a portable navigation system, or any other piece of electronics capable of receiving speech. Terminal device 30 may be a part of an enterprise solution, e.g., a common workstation in an office, a copier, a scanner, a personal workstation in a cubicle, an office directory, an interactive screen, and a telephone. These examples and lists are not meant to be exhaustive, but merely to illustrate a few examples of the terminal device. Some of these examples are shown in more detail with respect to FIGS. 1C, 1D, and 1E.

In some embodiments, terminal 30 receives adaptation data from the personal device 20, in a process that will be described in more detail herein. In some embodiments, the adaptation data is transmitted over one or more communication network(s) 40. In various embodiments, the communication network 40 may include one or more of a local area network (LAN), a wide area network (WAN), a metropolitan area network (MAN), a wireless local area network (WLAN), a personal area network (PAN), a Worldwide Interoperability for Microwave Access (WiMAX), public switched telephone network (PTSN), a general packet radio service (GPRS) network, a cellular network, and so forth. The communication networks 40 may be wired, wireless, or a combination of wired and wireless networks. It is noted that "communication network" here refers to one or more communication networks, which may or may not interact with each other.

In some embodiments, the adaptation data does not come directly from the personal device 20. In some embodiments, personal device 20 merely facilitates communication of the adaptation data, e.g., by providing one or more of an address, credentials, instructions, authorization, and recommendations. For example, in some embodiments, personal device 20 provides a location at server 10 at which adaptation data may be received. In some embodiments, personal device 20 retrieves adaptation data from server 10 upon a request from the terminal device 30, and then relays or facilitates in the relaying of the adaptation data to terminal device 30.

In some embodiments, personal device 20 broadcasts the adaptation data regardless of whether a terminal device 30 is listening, e.g., at predetermined, regular, or otherwise-defined intervals. In other embodiments, personal device 20 listens for a request from a terminal device 30, and transmits or broadcasts adaptation data in response to that request. In some embodiments, user 5 determines when personal device 20 broadcasts adaptation data. In still other embodiments, a third party (not shown) triggers the transmission of adaptation data to the terminal device 30, in which the transmission is facilitated by the personal device 20.

Figure 1B:
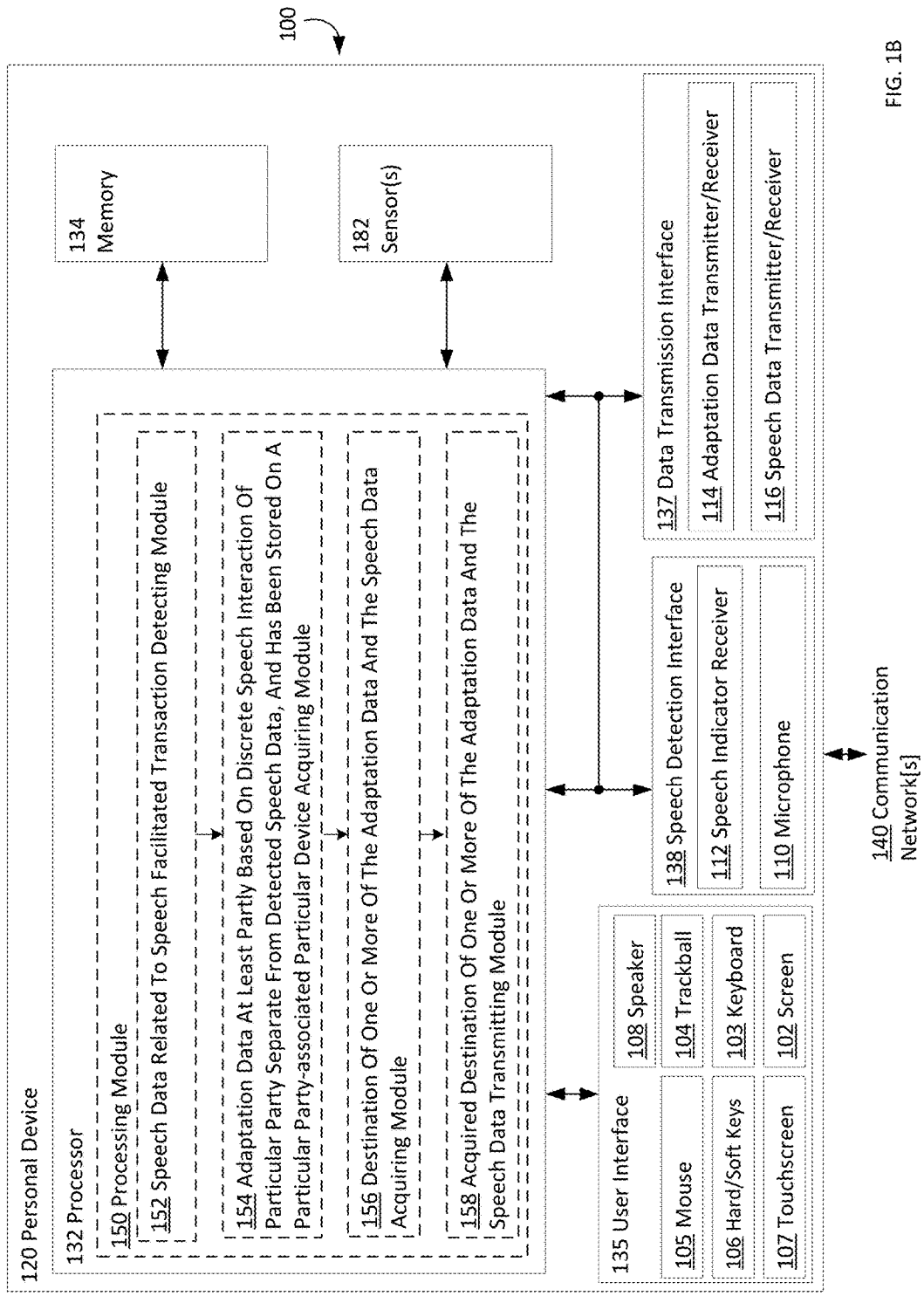
FIG. 1B shows a high-level block diagram of a personal device 120 operating in an exemplary embodiment 100, according to an embodiment.

FIG. 1B shows a more detailed description of a personal device 120 in an exemplary environment 100. Personal device 120 may be an example of personal device 20A or 20B of FIG. 1A, intermediate device 40 of FIG. 1A, first personal device 21A of FIG. 1C, second personal device 21B of FIG. 1D, one of the modules of device 31 of FIG. 1C, personal device 22A of FIG. 1D, personal device 22B of FIG. 1D, any of devices 51, 52, 53, and 54 of FIG. 1D, smart key device 26 of FIG. 1E, GPS navigation device 41 of FIG. 1E, and the like. The foregoing is not intended to be exhaustive of the possible devices that correspond to personal device 120 of FIG. 1B, but are merely exemplary of the types of devices that may have a structure as outlined in FIG. 1B.

Referring again to FIG. 1B, in various embodiments, the personal device 120 may comprise, among other elements, a processor 132, a memory 134, a user interface 135, a speech detection interface 138, and a data transmission interface 137. Each of these elements may be absent in various embodiments of personal device 120, e.g., some personal devices 120 may not have a speech detection interface 138, or a memory 134, or a user interface 135.

Processor 132 may include one or more microprocessors, Central Processing Units ("CPU"), a Graphics Processing Units ("GPU"), Physics Processing Units, Digital Signal Processors, Network Processors, Floating Point Processors, and the like. In some embodiments, processor 132 may be a server. In some embodiments, processor 132 may be a distributed-core processor. Although processor 132 is as a single processor that is part of a single personal device 120, processor 132 may be multiple processors distributed over one or many computing devices 30, which may or may not be configured to operate together. Processor 132 is illustrated as being configured to execute computer readable instructions in order to execute one or more operations described above, and as illustrated in FIGS. 6, 7A-7D, 8A-8Q, 9A-9D, and 10A-10C. In some embodiments, processor 132 is designed to be configured to operate as processing module 150, which may include one or more of speech data related to speech facilitated transaction detecting module 152, adaptation data at least partly based on discrete speech interaction of particular party separate from detected speech data, and has been stored on a particular party-associated particular device acquiring module 154, destination of one or more of the adaptation data and the speech data acquiring module 156, and acquired destination of one or more of the adaptation data and the speech data transmitting module 158.

Referring again to FIG. 1B, as set forth above, personal device 120 may include a memory 134. In some embodiments, memory 134 may comprise of one or more of one or more mass storage devices, read-only memory (ROM), programmable read-only memory (PROM), erasable programmable read-only memory (EPROM), cache memory such as random access memory (RAM), flash memory, synchronous random access memory (SRAM), dynamic random access memory (DRAM), and/or other types of memory devices. In some embodiments, memory 134 may be located at a single network site. In some embodiments, memory 134 may be located at multiple network sites, including sites that are distant from each other.

Referring again to FIG. 1B, as set forth above, personal device 120 may include a user interface 135. The user interface may be implemented in hardware or software, or both, and may include various input and output devices to allow an operator of personal device 120 to interact with personal device 120. For example, user interface 135 may include, but is not limited to, an audio display, e.g., a speaker 108, a video display, e.g., a screen 102, a microphone, a camera, a keyboard, e.g., keyboard 103, a trackball, e.g., trackball 104, a mouse, e.g., mouse 105, one or more soft keys, e.g., hard/soft keys 106, a touch input, e.g., touchscreen 107, e.g., which may also be a video display screen, a joystick, a game controller, a touchpad, a handset, or any other device that allows interaction between a device and a user.

Referring again to FIG. 1B, as set forth above, personal device 120 may include a speech detection interface 138. Speech detection interface 138 may be configured to receive and/or process speech as input, or to observe and/or record speech of a speech-facilitated transaction Although not present in some embodiments, in some embodiments, a speech detection interface 138 may include a speech indicator receiver 112, which may be a sensor of any type, or a communication port that receives a signal, or a sensor that detects a button press, or any other module that can detect a change of state of any kind in the environment 100, whether internal or external to the device. The speech detection interface 138 may, in some embodiments, include a microphone 110, which may or may not communicate with speech indicator receiver 112. In some embodiments, microphone 110 may detect speech, either selectively or always-on, and may be controlled by one or more of speech indicator receiver 112 and processor 132.

Referring again to FIG. 1B, as set forth above, personal device 120 may include a data transmission interface 137. Data transmission interface 137 may, in some embodiments, handle the transmission and reception of data by the device. For example, in some embodiments, data transmission interface 137 may include an adaptation data transmitter/receiver 114, which handles the reception and transmission of adaptation data over any type of network or internal form of communication, e.g., internal bus, and the like. Data transmission interface 137 may, in some embodiments, include speech data transmitter/receiver 116, which may handle the reception and transmission of speech data, including raw speech, over any form of moving data.

Referring again to FIG. 1B, as set forth above, personal device 120 may have one or more sensors 182. These sensors include, but are not limited to, a Global Positioning System (GPS) sensor, a still camera, a video camera, an altimeter, an air quality sensor, a barometer, an accelerometer, a charge-coupled device, a radio, a thermometer, a pedometer, a heart monitor, a moisture sensor, a humidity sensor, a microphone, a seismometer, and a magnetic field sensor. Sensors 182 may interface with sensor interface 180. Although FIG. 1B illustrates sensors 182 as part of personal device 120, in some embodiments, sensors 182 may be separated from personal device 120, and communicate via one or more communication networks, e.g., communication networks 140.

Figure 1C:
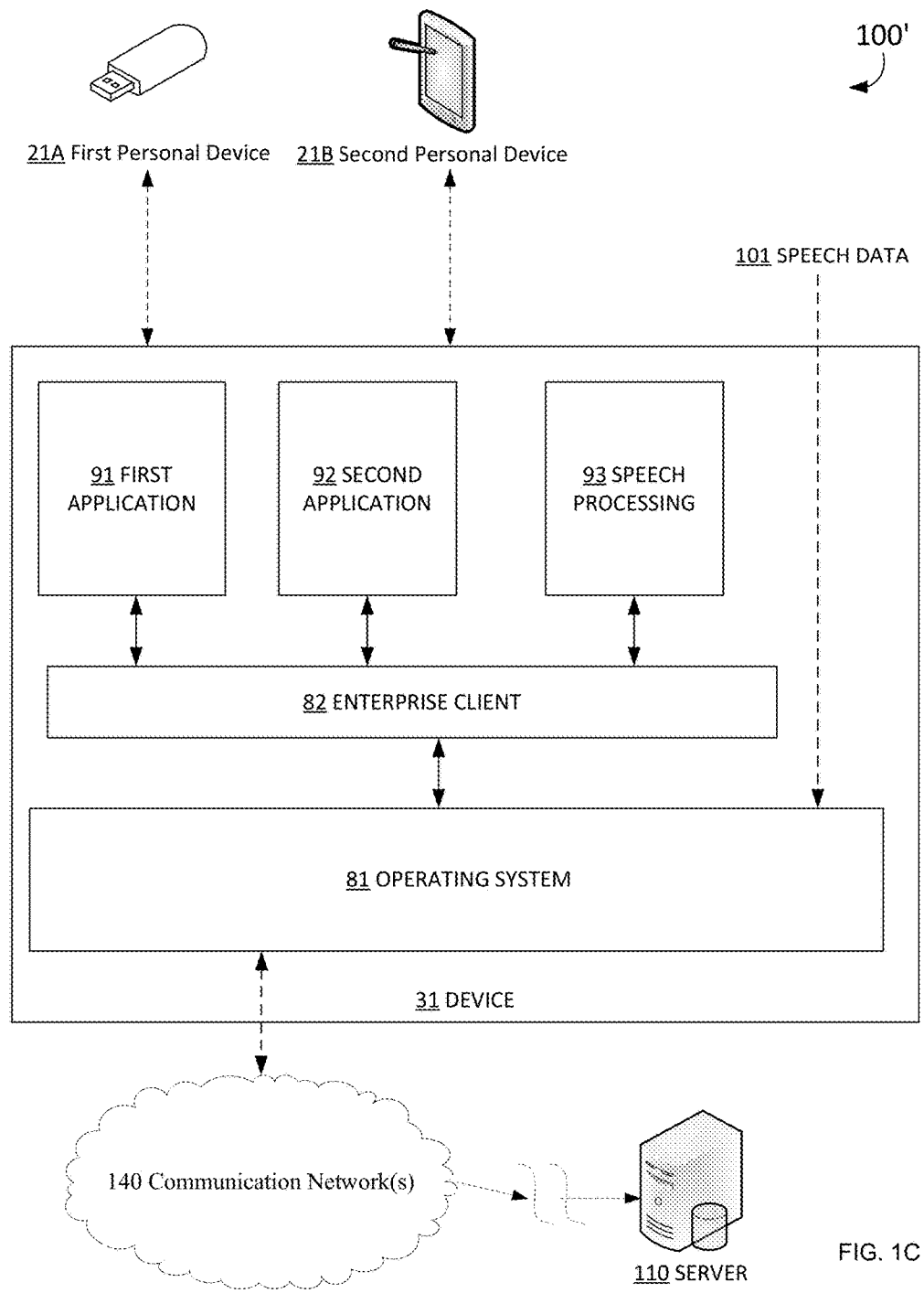
FIG. 1C shows a high-level diagram of an exemplary environment 100', which is an example of an exemplary embodiment 100 having a personal device 120, according to an embodiment.

Referring now to FIG. 1C, FIG. 1C shows an example embodiment of an exemplary environment 100', which is a non-limiting example of an environment 100. As shown in FIG. 1C, environment 100' may include a user (not shown), which user may have one or more of a first personal device 21A and a second personal device 21B. First personal device 21A may be, for example, a USB drive, and second personal device 21B may be, for example, a cellular telephone device, although both personal device 21A and personal device 21B may be any form of personal device 120 as previously described. One or more of first personal device 21A and second personal device 21B may interact with device 31, which may be any type of computing device, e.g., laptop computer, desktop computer, server, netbook, tablet device, smartphone, and the like. Device 31 may have an operating system software 81 loaded thereon. Operating system software 81 may include, but is not limited to, Microsoft Windows, Google Android, Apple iOS, Apple Mountain Lion, UNIX, Linux, Chrome OS, Symbian, and the like.

In addition, in some embodiments, device 31 may include an enterprise client software 82 onboard. For example, some systems, e.g., in an office environment, may have a client software, e.g., Citrix, or the like, loaded on their systems to integrate the user experience for their workers. In some embodiments, this module may play a role in determining the role of the interpretation of speech data (e.g., speech data 101) and the application of adaptation data. In some embodiments, device 31 also may include one or more of first application software 91 and second application software 92. First and second application software 91 and 92 may be any type of application, e.g., game, spreadsheet, word processor, web browser, chat client, picture viewer, picture manipulator, webcam application, and the like. In some embodiments, these modules may play a role in determining the role of the interpretation of speech data and the application of adaptation data. For example, the complexity of the application may play a role in determining how much of the speech processing occurs at the application level. In some embodiments, device 31 may communicate with one or more communication networks 140 and one or more servers 110.

Figure 1D:
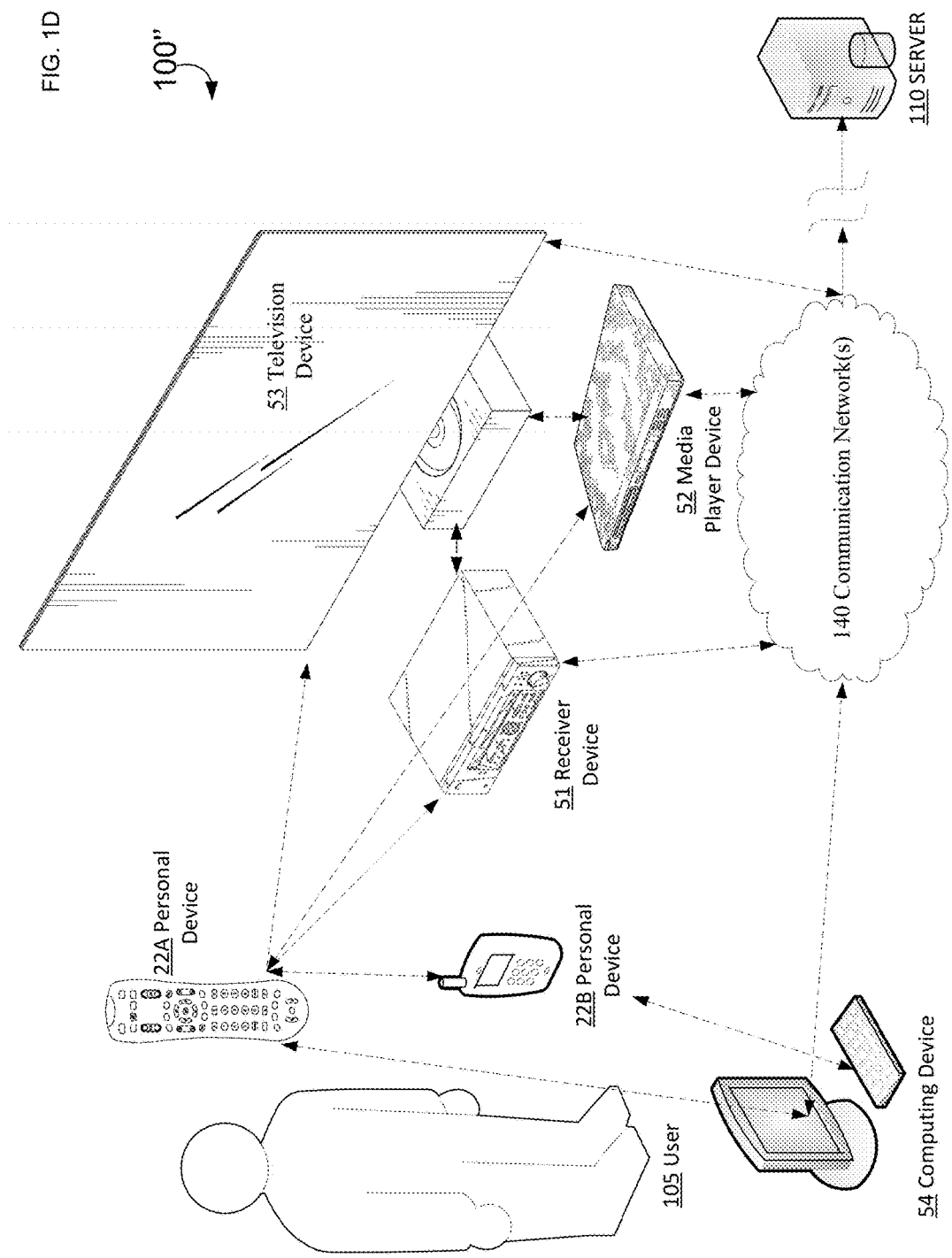
FIG. 1D shows a high-level diagram of an exemplary environment 100", which is an example of an exemplary embodiment 100 having a personal device 120, according to an embodiment.

Referring now to FIG. 1D, FIG. 1D shows an example embodiment of an exemplary environment 100", which is a non-limiting example of an environment 100. As shown in FIG. 1D, environment 100" may include a user 105, which user may have one or more of a personal device 22A and a personal device 22B. Personal device 22A may be, for example, a universal remote control, and personal device 22B may be, for example, a cellular telephone device, although both personal device 22A and personal device 22B may be any form of personal device 120 as previously described. In some embodiments, one or both of personal device 22A, personal device 22B, and computing device 54 may transmit, store, and/or receive adaptation data. In some embodiments, one of personal device 22A, personal device 22B, and computing device 54 may determine to which of the devices shown in FIG. 1D the user 105 is directing her speech. In other embodiments, one or more of receiver device 51, media player device 52, and television device 53 may transmit one or more of speech data and adaptation data back and forth, and one or more of receiver device 51, media player device 52, and television device 53 may determine which device should apply the adaptation data, and which device should process the speech data, out of devices 22A, 22B, 51, 52, 53, and 54.

Referring now to FIG. 1E, FIG. 1E shows an example embodiment of an exemplary environment 100''', which is a non-limiting example of an environment 100. As shown in FIG. 1E, environment 100''' may include a user (not shown) driving an automobile (interior only shown), wherein the automobile is equipped with a motor vehicle control system 42, which may control the non-driving features of the automobile, e.g., music, climate, temperature, fuel management, seat position, media playing, lights, and the like. The automobile also may have a smart key device 26, which, in some embodiments, may store, receive, and/or transmit adaptation data, either wirelessly or through the system of the automobile. In some embodiments, environment 100''' may also include a GPS navigation device 41, which may be an example of intermediate device 40, which also may be a personal device 120. In some embodiments, GPS navigation device 41 may serve as a terminal device, receiving speech data and adaptation data in order to process a user's request. In other embodiments, GPS navigation device 41 may serve as a personal device 120, storing adaptation data derived from navigation commands of the user, and transmitting the adaptation data to a target device, e.g., motor vehicle control system 42, when needed. Intermediate devices 40, e.g., as shown in FIG. 1A, and GPS navigation device 41, which may be an example of intermediate device 40, may be a personal device 120 for a first transaction and a terminal device in a second transaction. In some embodiments, GPS navigation device 41 may change its role based on an analysis of data received by GPS navigation device 41.

Referring again to FIG. 1E, in some embodiments, GPS navigation device 41, motor vehicle control system 42, smart key device 26, and the user's personal device (not shown) may communicate with one or more communication networks 140 and one or more servers 110. As in all shown exemplary embodiments, however, these elements are optional and some embodiments may exclude them.

Referring now to FIG. 2, FIG. 2 illustrates an exemplary implementation of the speech data related to speech facilitated transaction detecting module 152. As illustrated in FIG. 2, the speech data related to speech facilitated transaction detecting module 152 may include one or more sub-logic modules in various alternative implementations and embodiments. For example, as shown in FIG. 2, e.g., FIG. 2A, in some embodiments, module 152 may include one or more of speech-facilitated transaction occurrence detecting module 201, speech-facilitated transaction about to occur detecting module 202 (e.g., which, in some embodiments, may include device microphone receiving speech of a speech-facilitated transaction detecting module 204), indicator of device microphone receiving speech of a speech facilitated transaction signal detecting module 206, adaptation data receiving module 214, and reception of adaptation data-based speech data transferring determination module 216 (e.g., which, in some embodiments, may include reception of adaptation data comprising indicator based speech data transferring determination module 218). In some embodiments, module 206 may include one or more of indicator of particular device microphone receiving speech of a speech facilitated transaction signal detecting module 208, indicator of other device microphone receiving speech of a speech facilitated transaction signal detecting module 210, indicator of other device microphone receiving speech of a speech facilitated transaction signal detecting module 212.

Figure 2A:
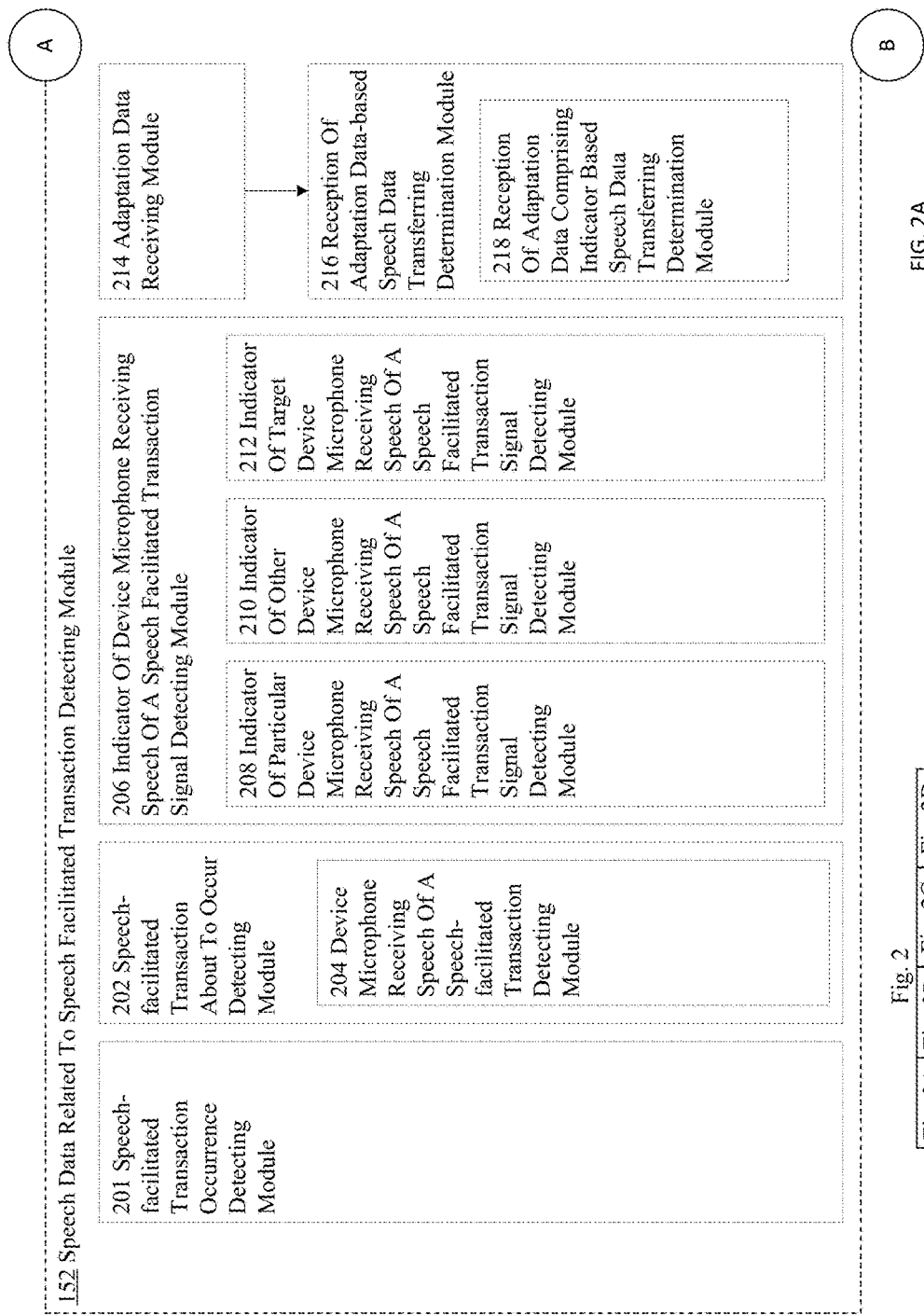
FIGS. 2A-2D, shows a particular perspective of the speech data related to speech facilitated transaction detecting module 152 of the personal device 120 of environment 100 of FIG. 1B.
Figure 2B:
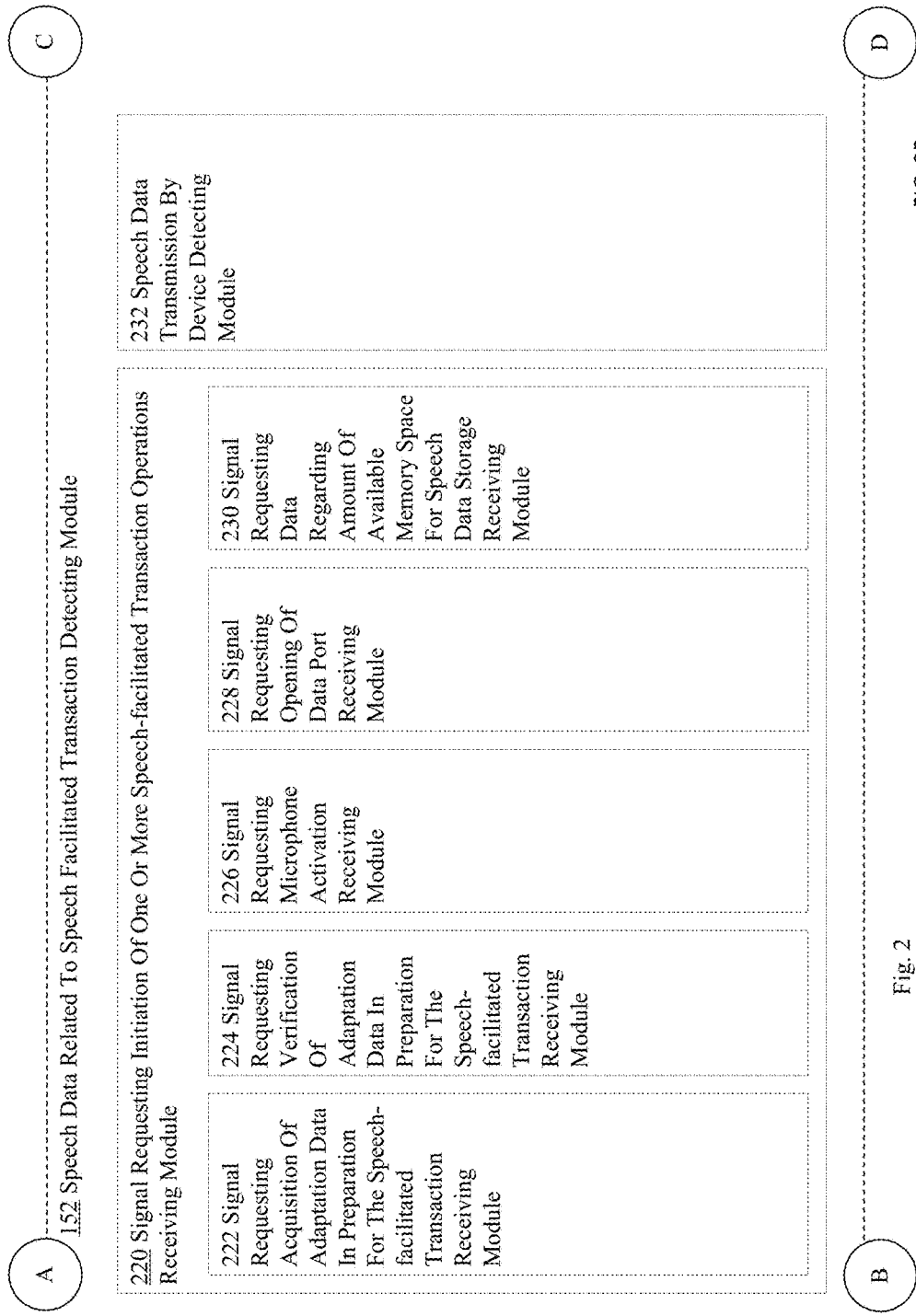

Referring again to FIG. 2, e.g., FIG. 2B, in some embodiments, module 152 may include one or more of signal requesting initiation of one or more speech-facilitated transaction operations receiving module 220 and speech data transmission by device detecting module 232. In some embodiments, module 152 may include one or more of signal requesting acquisition of adaptation data in preparation for the speech-facilitated transaction receiving module 222, signal requesting verification of adaptation data in preparation for the speech-facilitated transaction receiving module 224, signal requesting microphone activation receiving module 226, signal requesting opening of data port receiving module 228, and signal requesting data regarding amount of available memory space for speech data storage receiving module 230.

Figure 2C:
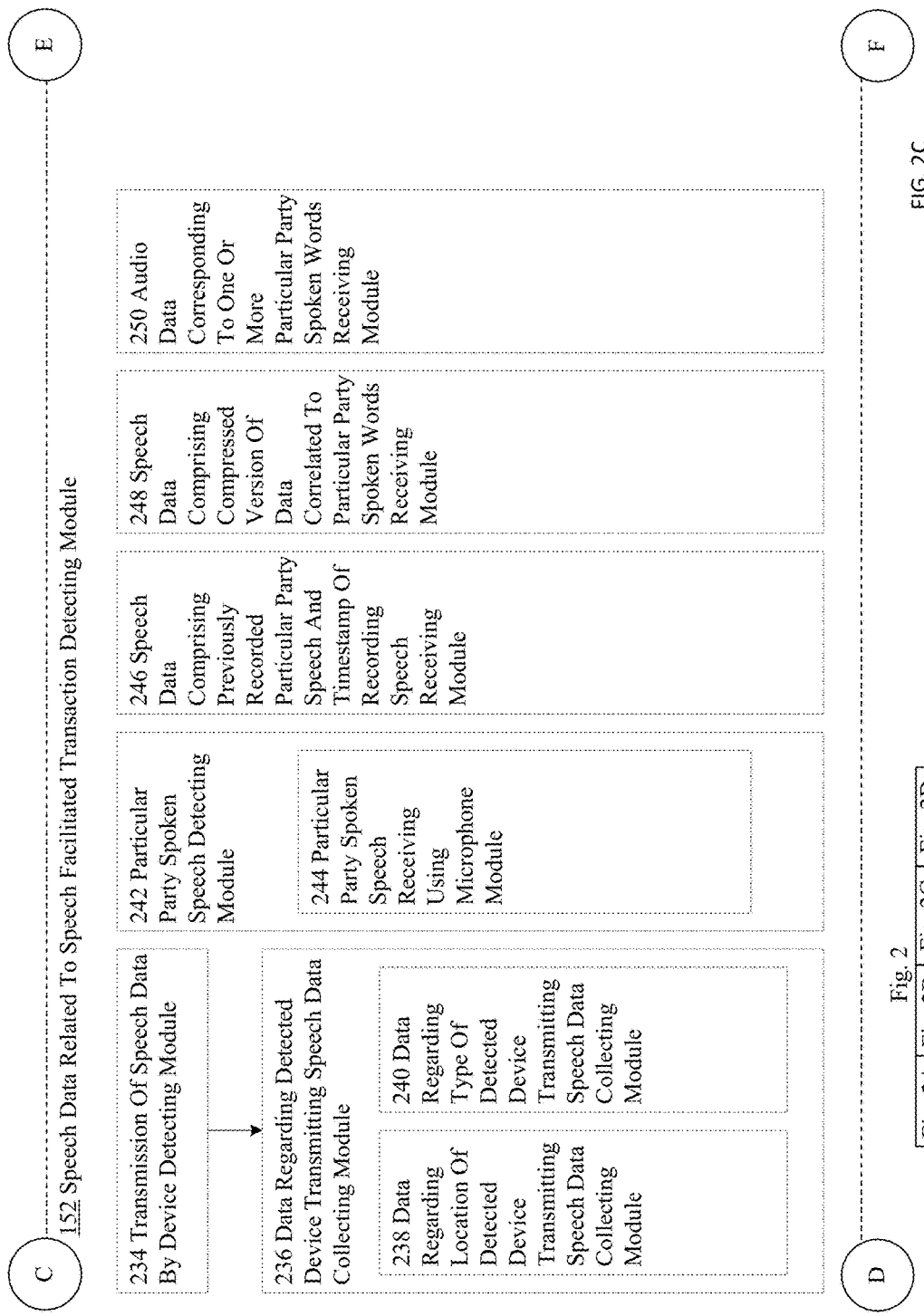

Referring again to FIG. 2, e.g., FIG. 2C, in some embodiments, module 152 may include one or more of transmission of speech data by device detecting module 234, data regarding detected device transmitting speech data collecting module 236 (e.g., which, in some embodiments, may include one or more of data regarding location of detected device transmitting speech data collecting module 238 and data regarding type of detected device transmitting speech data collecting module 240), particular party spoken speech detecting module 242 (e.g., which, in some embodiments, may include particular party spoken speech receiving using microphone module 244), speech data comprising previously recorded particular party speech and timestamp of recording speech receiving module 246, speech data comprising compressed version of data correlated to particular party spoken words receiving module 248, and audio data corresponding to one or more particular party spoken words receiving module 250.

Figure 2D:
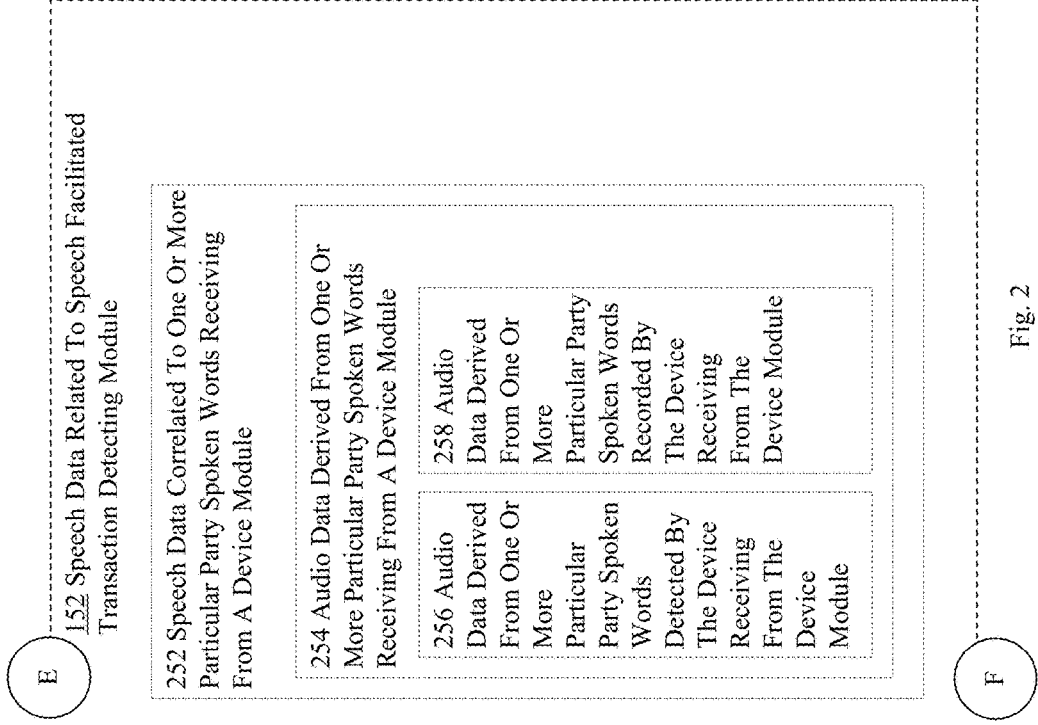

Referring again to FIG. 2, e.g., FIG. 2D, in some embodiments, module 152 may include speech data correlated to one or more particular party spoken words receiving from a device module 252. In some embodiments, module 252 may include audio data derived from one or more particular party spoken words receiving from a device module 254. In some embodiments, module 254 may include one or more of audio data derived from one or more particular party spoken words detected by the device receiving from the device module 256 and audio data derived from one or more particular party spoken words recorded by the device receiving from the device module 258.

Figures 3, 3D:
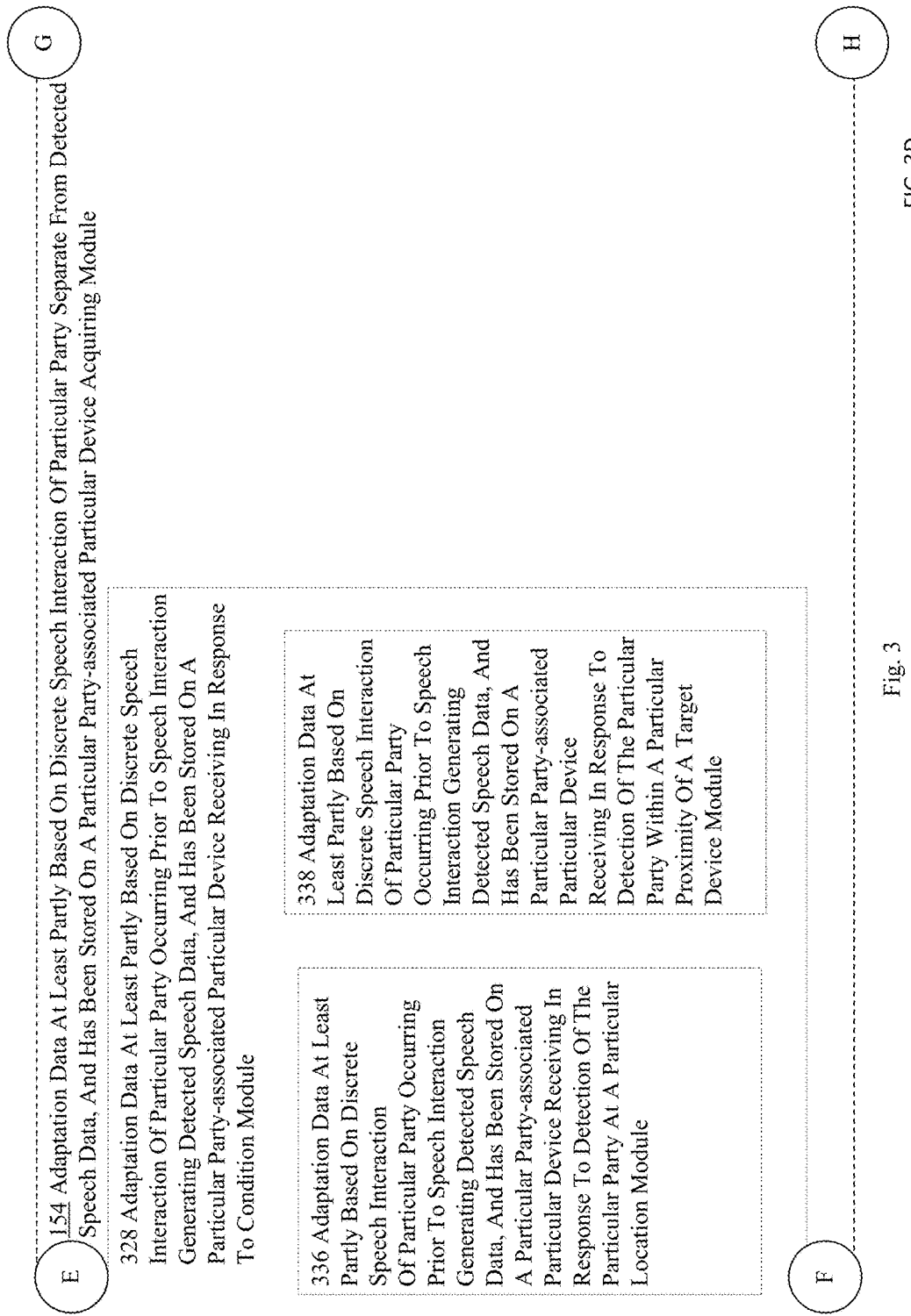
Figure 3:
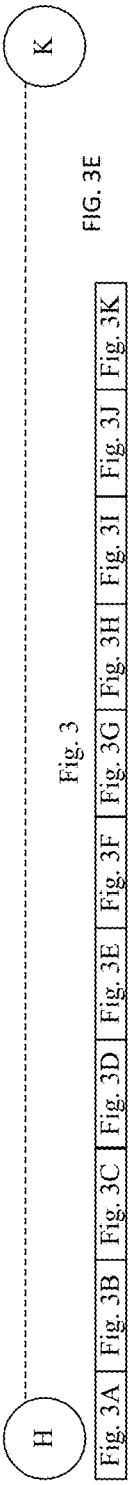
FIG. 3, including

Referring now to FIG. 3, FIG. 3 illustrates an exemplary implementation of adaptation data at least partly based on discrete speech interaction of particular party separate from detected speech data, and has been stored on a particular party-associated particular device acquiring module 154. As illustrated in FIG. 3, the adaptation data at least partly based on discrete speech interaction of particular party separate from detected speech data, and has been stored on a particular party-associated particular device acquiring module 154 may include one or more sub-logic modules in various alternative implementations and embodiments. For example, as shown in FIG. 3 (e.g., FIG. 3A), in some embodiments, module 154 may include adaptation data comprising one or more words and corresponding pronunciations of the one or more words at least partly based on discrete speech interaction of particular party separate from detected speech data, and has been stored on a particular party-associated particular device acquiring module 302. In some embodiments, module 302 may include adaptation data comprising one or more words and corresponding pronunciations of the one or more words at least partly based on at least one previous training by the particular party separate from detected speech data, and has been stored on a particular party-associated particular device acquiring module 304. In some embodiments, module 304 may include adaptation data comprising one or more words and corresponding pronunciations of the one or more words at least partly based on at least one previous training by the particular party separate from detected speech data corresponding to an order placed by the particular party at an automated drive-thru terminal that accepts speech input, and has been stored on a particular party-associated particular device acquiring module 306. In some embodiments, module 306 may include adaptation data comprising one or more words and corresponding pronunciations of the one or more words at least partly based on at least one previous training by the particular party in response to cellular telephone device prompting separate from detected speech data corresponding to an order placed by the particular party at an automated drive-thru terminal that accepts speech input, and has been stored on a particular party-associated particular device acquiring module 308. In some embodiments, module 308 may include adaptation data comprising one or more words and corresponding pronunciations of the one or more words at least partly based on at least one previous training by the particular party in response to cellular telephone device prompting separate from detected speech data corresponding to an order placed by the particular party at an automated drive-thru terminal that accepts speech input, and has been stored on a particular device linked to the particular party through a contract with a telecommunications provider acquiring module 310.

Referring again to FIG. 3, e.g., FIG. 3B, in some embodiments, module 154 may include one or more of adaptation data at least partly based on discrete speech interaction of particular party at different time and location to speech interaction generating detected speech data, and has been stored on a particular party-associated particular device acquiring module 312 and adaptation data at least partly based on discrete speech interaction of particular party occurring prior to speech interaction generating detected speech data, and has been stored on a particular party-associated particular device acquiring module 314. In some embodiments, module 314 may include one or more of adaptation data at least partly based on discrete speech interaction of particular party occurring prior to speech interaction generating detected speech data, and has been stored on a particular party-associated particular device receiving from the particular device module 316 (e.g., which, in some embodiments, may include adaptation data at least partly based on discrete speech interaction of particular party occurring prior to speech interaction generating detected speech data, and has been stored on a particular party-associated particular device receiving directly from the particular device memory module 318) and adaptation data at least partly based on discrete speech interaction of particular party occurring prior to speech interaction generating detected speech data, and has been stored on a particular party-associated particular device receiving from a communication network provider module 320 (e.g., which, in some embodiments, may include adaptation data at least partly based on discrete speech interaction of particular party occurring prior to speech interaction generating detected speech data, and has been stored on a particular party-associated particular device and transmitted over the communication network receiving from a communication network provider module 322.

Referring again to FIG. 3, e.g., FIG. 3C, in some embodiments, module 154 may include module 314, as previously described. In some embodiments, module 314 may include one or more of adaptation data at least partly based on discrete speech interaction of particular party occurring prior to speech interaction generating detected speech data, and has been stored on a particular party-associated particular device receiving from a device connected to a same network as a target device to which the detected speech data is directed module 324 and adaptation data at least partly based on discrete speech interaction of particular party occurring prior to speech interaction generating detected speech data, and has been stored on a particular party-associated particular device receiving in response to reception of speech data module 326. In some embodiments, module 154 may include adaptation data at least partly based on discrete speech interaction of particular party occurring prior to speech interaction generating detected speech data, and has been stored on a particular party-associated particular device acquiring in response to condition module 328. In some embodiments, module 328 may include adaptation data at least partly based on discrete speech interaction of particular party occurring prior to speech interaction generating detected speech data, and has been stored on a particular party-associated particular device acquiring in response to the particular party interacting with a target device module 330. In some embodiments, module 330 may include one or more of adaptation data at least partly based on discrete speech interaction of particular party occurring prior to speech interaction generating detected speech data, and has been stored on a particular party-associated particular device acquiring in response to the particular party inserting a key into a motor vehicle interacting with a target device module 332 and adaptation data at least partly based on discrete speech interaction of particular party occurring prior to speech interaction generating detected speech data, and has been stored on a particular party-associated particular device acquiring in response to the particular party executing a program on a computing device module 334.

Referring again to FIG. 3, e.g., FIG. 3D, in some embodiments, module 154 may include module 328, as previously described. In some embodiments, module 328 may include one or more of adaptation data at least partly based on discrete speech interaction of particular party occurring prior to speech interaction generating detected speech data, and has been stored on a particular party-associated particular device receiving in response to detection of the particular party at a particular location module 336 and adaptation data at least partly based on discrete speech interaction of particular party occurring prior to speech interaction generating detected speech data, and has been stored on a particular party-associated particular device receiving in response to detection of the particular party within a particular proximity of a target device module 338.

Referring again to FIG. 3, e.g., FIG. 3E, in some embodiments, module 154 may include adaptation data at least partly based on discrete speech interaction of particular party separate from detected speech data, and has been stored on a particular party-associated particular device acquiring from a further device module 340. In some embodiments, module 340 may include one or more of adaptation data originating at further device and at least partly based on discrete speech interaction of particular party separate from detected speech data, and has been stored on a particular party-associated particular device acquiring from a further device module 342, adaptation data at least partly based on discrete speech interaction of particular party separate from detected speech data, and has been stored on a particular party-associated particular device acquiring from a further device related to the particular device module 344, and adaptation data at least partly based on discrete speech interaction of particular party separate from detected speech data, and has been stored on a particular party-associated particular device acquiring from a further device that received the adaptation data from the particular device module 352. In some embodiments, module 344 may include one or more of adaptation data at least partly based on discrete speech interaction of particular party separate from detected speech data, and has been stored on a particular party-associated particular device acquiring from a further device associated with the particular party module 346, adaptation data at least partly based on discrete speech interaction of particular party separate from detected speech data, and has been stored on a particular party-associated particular device acquiring from a further device in communication with the particular device module 348, and adaptation data at least partly based on discrete speech interaction of particular party separate from detected speech data, and has been stored on a particular party-associated particular device acquiring from a further device at least partially controlled by the particular device module 350.

Referring again to FIG. 3, e.g., FIG. 3F, in some embodiments, module 154 may include module 340, as previously described. In some embodiments, module 340 may include adaptation data comprising instructions for modifying a pronunciation dictionary, said adaptation data at least partly based on discrete speech interaction of particular party separate from detected speech data, and has been stored on a particular party-associated particular device acquiring from a further device module 354. In some embodiments, module 354 may include adaptation data comprising a first instruction for modifying a pronunciation dictionary based on a first particular party interaction and a second instruction for modifying a pronunciation dictionary based on a second particular party interaction, and has been stored on a particular party-associated particular device acquiring from a further device module 356. In some embodiments, module 356 may include adaptation data comprising a first instruction for modifying a pronunciation dictionary based on a first particular party interaction and a second instruction for modifying a pronunciation dictionary based on a second particular party interaction, said first instruction has been stored on a particular party-associated particular device acquiring from a further device module 358.

Figures 3, 3G:

Referring again to FIG. 3, e.g., FIG. 3G, in some embodiments, module 154 may include one or more of adaptation data at least partly based on discrete speech interaction of particular party separate from detected speech data, and has been stored on a particular party-associated particular device generating module 360, adaptation data at least partly based on discrete speech interaction of particular party separate from detected speech data, and has been stored on a particular party-associated particular device retrieving module 362, and adaptation data at least partly based on discrete speech interaction of particular party with particular type of device separate from detected speech data, and has been stored on a particular party-associated particular device acquiring module 364. In some embodiments, module 364 may include one or more of adaptation data at least partly based on discrete speech interaction of particular party with device of same type as target device configured to receive speech data, said discrete interaction separate from detected speech data, and has been stored on a particular party-associated particular device acquiring module 366 and adaptation data at least partly based on discrete speech interaction of particular party with device having particular characteristic separate from detected speech data, and has been stored on a particular party-associated particular device acquiring module 368. In some embodiments, module 368 may include one or more of adaptation data at least partly based on discrete speech interaction of particular party with device communicating on a same communication network as target device and separate from detected speech data, and has been stored on a particular party-associated particular device acquiring module 370 and adaptation data at least partly based on discrete speech interaction of particular party with device configured to carry out a same function as the target device and separate from detected speech data, and has been stored on a particular party-associated particular device acquiring module 372.

Referring again to FIG. 3, e.g., FIG. 3H, in some embodiments, module 154 may include module 364, and module 364 may include module 368, as previously described. In some embodiments, module 368 may include adaptation data at least partly based on discrete speech interaction of particular party with device configured to accept a same type of input as the target device and separate from detected speech data, and has been stored on a particular party-associated particular device acquiring module. In some embodiments, module 154 may include adaptation data at least partly based on discrete speech interaction of particular party with particular device separate from detected speech data, and has been stored on a particular party-associated particular device acquiring module 376. In some embodiments, module 376 may include adaptation data at least partly based on discrete speech interaction of particular party with cellular telephone device separate from detected speech data, and has been stored on a particular party-associated cellular telephone device acquiring module 378. In some embodiments, module 378 may include one or more of adaptation data at least partly based on particular party telephone conversation carried out using cellular telephone device separate from detected speech data, and has been stored on a particular party-associated cellular telephone acquiring module 380 and adaptation data at least partly based on particular party speech command given to cellular telephone device separate from detected speech data, and has been stored on a particular party-associated cellular telephone acquiring module 382.

Referring again to FIG. 3, e.g., FIG. 3I, in some embodiments, module 154 may include one or more of adaptation data at least partly based on discrete speech interaction of particular party separate from detected speech data and using same utterance as speech that is part of speech data, and has been stored on a particular party-associated particular device acquiring module 384, adaptation data at least partly based on discrete speech interaction of particular party and using same utterance as speech that is part of speech data at a different time than speech that is part of the speech data acquiring module 386, adaptation data comprising a phoneme dictionary based on one or more particular party pronunciations, such that at least one entry has been stored on a particular party-associated particular device acquiring module 388, adaptation data comprising a sentence diagramming path selection algorithm based on one or more particular party discrete speech interactions, and has been stored on a particular party-associated particular device acquiring module 390, adaptation data at least partly based on discrete speech interaction of particular party separate from detected speech data, and at least partly collected by a particular party-associated particular device acquiring module 392, and adaptation data comprising instructions for modifying one or more portions of a speech recognition component of a target device that are at least partly based on one or more particular party speech interactions, and has been stored on a particular party-associated particular device acquiring module 394.

Referring again to FIG. 3, e.g., FIG. 3J, in some embodiments, module 154 may include one or more of adaptation data comprising a location of instructions for modifying one or more portions of a speech recognition component of a target device that are at least partly based on one or more particular party speech interactions, and has been stored on a particular party-associated particular device acquiring module 396, adaptation data at least partly based on discrete speech interaction of particular party separate from detected speech data, and transmitted from a particular party-associated particular device acquiring module 398, adaptation data at least partly based on discrete speech interaction of particular party separate from detected speech data, and stored on a particular party-associated particular device acquiring module 301, adaptation data at least partly based on discrete speech interaction of particular party separate from detected speech data, and is temporarily stored on the particular-party associated particular device until remote server deposit acquiring module 303, and adaptation data at least partly based on discrete speech interaction of particular party separate from detected speech data, and was transmitted from a first device to a second device using the particular party-associated particular device as a channel configured to facilitate the transaction acquiring module 305.

Referring again to FIG. 3, e.g., FIG. 3K, in some embodiments, module 154 may include one or more of adaptation data at least partly based on discrete speech interaction of particular party separate from detected speech data, and at least a portion of which originated at a particular party-associated particular device acquiring module 307, adaptation data at least partly based on discrete speech interaction of particular party separate from detected speech data, and at least a portion of which was transmitted to a remote location from a particular party-associated particular device receiving from remote location module 309, adaptation data at least partly based on discrete speech interaction of particular party separate from detected speech data receiving module 311, and further data adding to adaptation data module 313. In some embodiments, module 313 may include one or more of additional adaptation data adding to adaptation data module 315, header data identifying receiving entity adding to adaptation data module 317, and header data identifying transmitting entity adding to adaptation data module 319.

Referring now to FIG. 4, FIG. 4 illustrates an exemplary implementation of the destination of one or more of the adaptation data and the speech data obtaining module 156. As illustrated in FIG. 4, the destination of one or more of the adaptation data and the speech data obtaining module 156 may include one or more sub-logic modules in various alternative implementations and embodiments. For example, as shown in FIG. 4, e.g., FIG. 4A, in some embodiments, module 156 may include one or more of data regarding target device configured to process speech data module 402 (e.g., which, in some embodiments, may include one or more of data comprising a target device configured to process speech data address receiving module 404 and data comprising a target device configured to process speech data location receiving module 406), target device location as destination of one or more of the adaptation data and the speech data determining module 408 (e.g., which, in some embodiments, may include target device network location as destination of one or more of the adaptation data and the speech data determining module 470), device name of destination of one or more of the adaptation data and the speech data obtaining module 472, type of device for which one or more of the adaptation data and the speech data is a destination obtaining module 474, program component configured to perform processing on one or more of the adaptation data and the speech data determining module 410, and program component as destination of one or more of the adaptation data and the speech data determining module 412. In some embodiments, module 412 may include selection between application component and operating system component as destination of one or more of the adaptation data and the speech data selecting module 414.

Figure 4B:
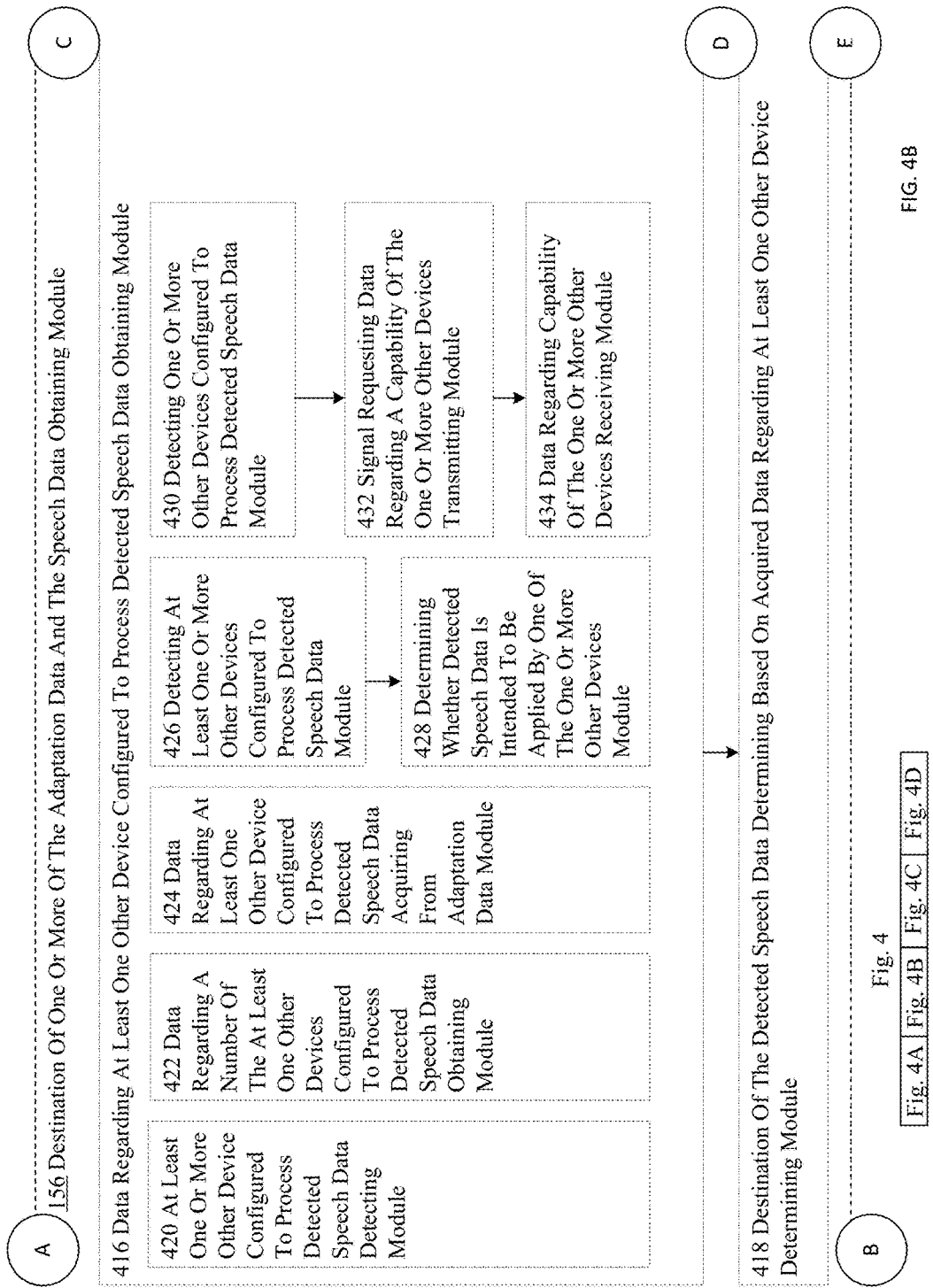

Referring again to FIG. 4, e.g., FIG. 4B, in some embodiments, module 156 may include one or more of data regarding at least one other device configured to process detected speech data obtaining module 416 and destination of the detected speech data determining based on acquired data regarding at least one other device determining module 418. In some embodiments, module 416 may include one or more of at least one or more other device configured to process detected speech data detecting module 420, data regarding a number of the at least one other devices configured to process detected speech data obtaining module 422, data regarding at least one other device configured to process detected speech data acquiring from adaptation data module 424, detecting at least one or more other devices configured to process detected speech data module 426, determining whether detected speech data is intended to be applied by one of the one or more other devices module 428, detecting one or more other devices configured to process detected speech data module 430, signal requesting data regarding a capability of the one or more other devices transmitting module 432, and data regarding capability of the one or more other devices receiving module 434.

Referring again to FIG. 4, e.g., FIG. 4C, in some embodiments, module 156 may include module 416 and 418, as previously described. In some embodiments, module 416 may include one or more of one or more other devices configured to process detected speech data detecting module 436 and capability of the detected one or more other devices configured to process detected speech data receiving module 438. In some embodiments, module 438 may include capability of the detected one or more other devices configured to process detected speech data receiving from a device that is not one of the one or more other devices module 440. In some embodiments, module 440 may include one or more of capability of the detected one or more other devices configured to process detected speech data receiving from a device configured to communicate on a same communication network as the one or more other devices module 442, capability of the detected one or more other devices configured to process detected speech data receiving from a device at least partially controlled by a same entity that controls at least one of the one or more other devices module 444, and capability of the detected one or more other devices configured to process detected speech data receiving from a device configured to provide one or more services to at least one of the one or more other devices module 446.

Referring again to FIG. 4, e.g., FIG. 4D, in some embodiments, module 156 may include one or more of other device data regarding a capability of one or more other devices configured to process detected speech data obtaining module 448 and destination for one or more of the adaptation data and the speech data determining at least partly based on the acquired other device data module 450. In some embodiments, module 448 may include one or more of other device data regarding an amount of available memory for one or more detected other devices obtaining module 452, other device data regarding an amount of available processor capacity for one or more detected other devices obtaining module 454, and other device data regarding a speech data processing capability for one or more detected other devices obtaining module 456. In some embodiments, module 456 may include one or more of other device data regarding one or more available speech models for one or more detected other devices obtaining module 458 and other device data regarding one or more available speech algorithms for one or more detected other devices obtaining module 460. In some embodiments, module 460 may include other device data regarding one or more available speech algorithms for a motor vehicle control system and a portable navigation system obtaining module 462 and other device data regarding an available hidden Markov model for a motor vehicle control system and an available constrained maximum likelihood transformation for the portable navigation system obtaining module 464.

Figures 5, 5A:
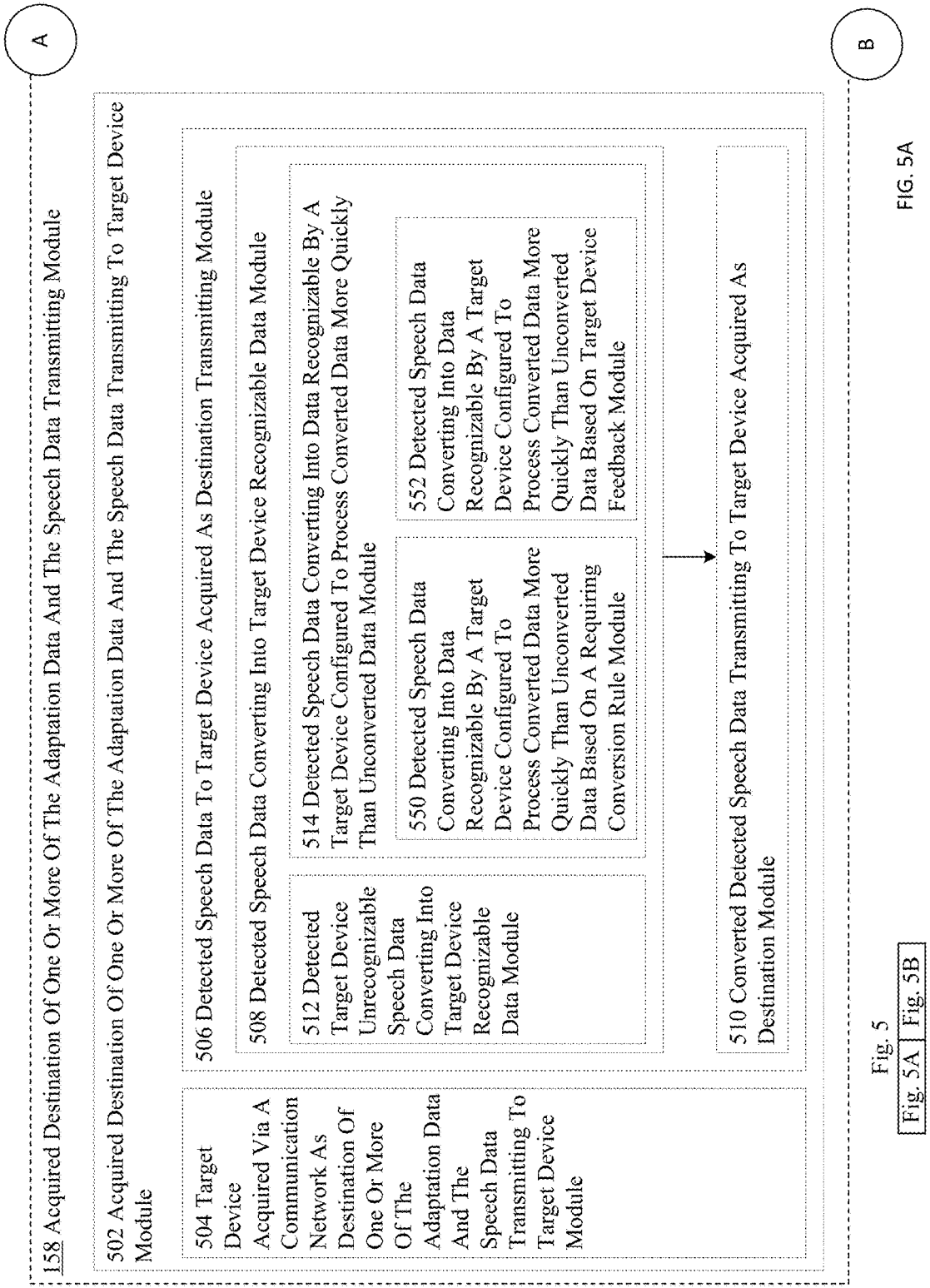
FIG. 5, including
FIGS. 5A-5B, shows a particular perspective of the acquired destination of one or more of the adaptation data and the speech data transmitting module of the personal device 120 of environment 100 of FIG. 1B.

Referring now to FIG. 5, FIG. 5 illustrates an exemplary implementation of the acquired destination of one or more of the adaptation data and the speech data transmitting module 158. As illustrated in FIG. 5, the acquired destination of one or more of the adaptation data and the speech data transmitting module 158 may include one or more sub-logic modules in various alternative implementations and embodiments. For example, as shown in FIG. 5 (e.g., FIG. 5A), in some embodiments, module 158 may include acquired destination of one or more of the adaptation data and the speech data transmitting to target device module 502. In some embodiments, module 502 may include one or more of target device acquired via a communication network as destination of one or more of the adaptation data and the speech data transmitting to target device module 504 and detected speech data to target device acquired as destination transmitting module 506. In some embodiments, module 506 may include one or more of detected speech data converting into target device recognizable data module 508 and converted detected speech data transmitting to target device acquired as destination module 510. In some embodiments, module 508 may include one or more of detected target device unrecognizable speech data converting into target device recognizable data module 512 and detected speech data converting into data recognizable by a target device configured to process converted data more quickly than unconverted data module 514. In some embodiments, module 514 may include one or more of detected speech data converting into data recognizable by a target device configured to process converted data more quickly than unconverted data based on a requiring conversion rule module 550 and detected speech data converting into data recognizable by a target device configured to process converted data more quickly than unconverted data based on target device feedback module 552.

Figure 5B:
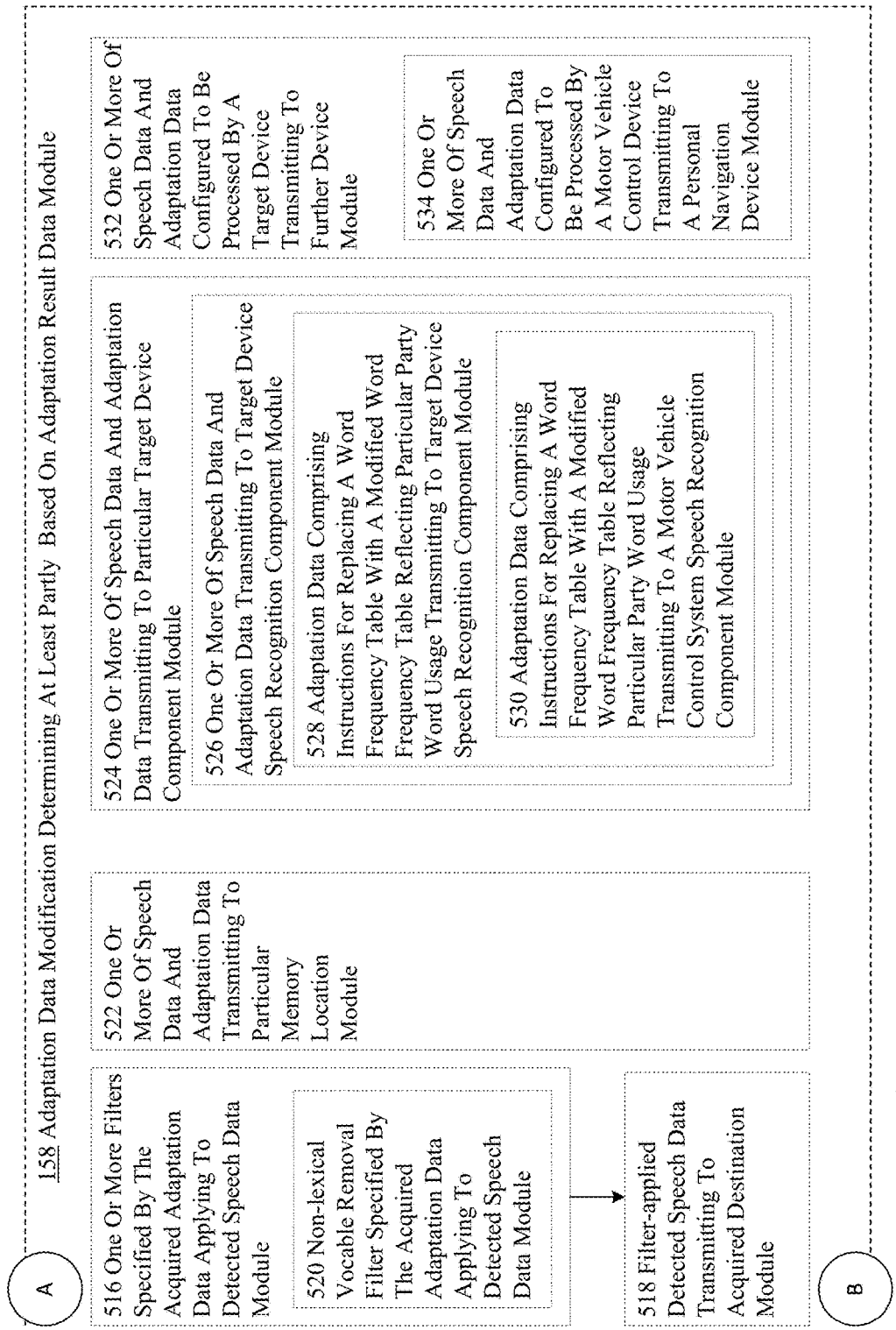
Figure 6:
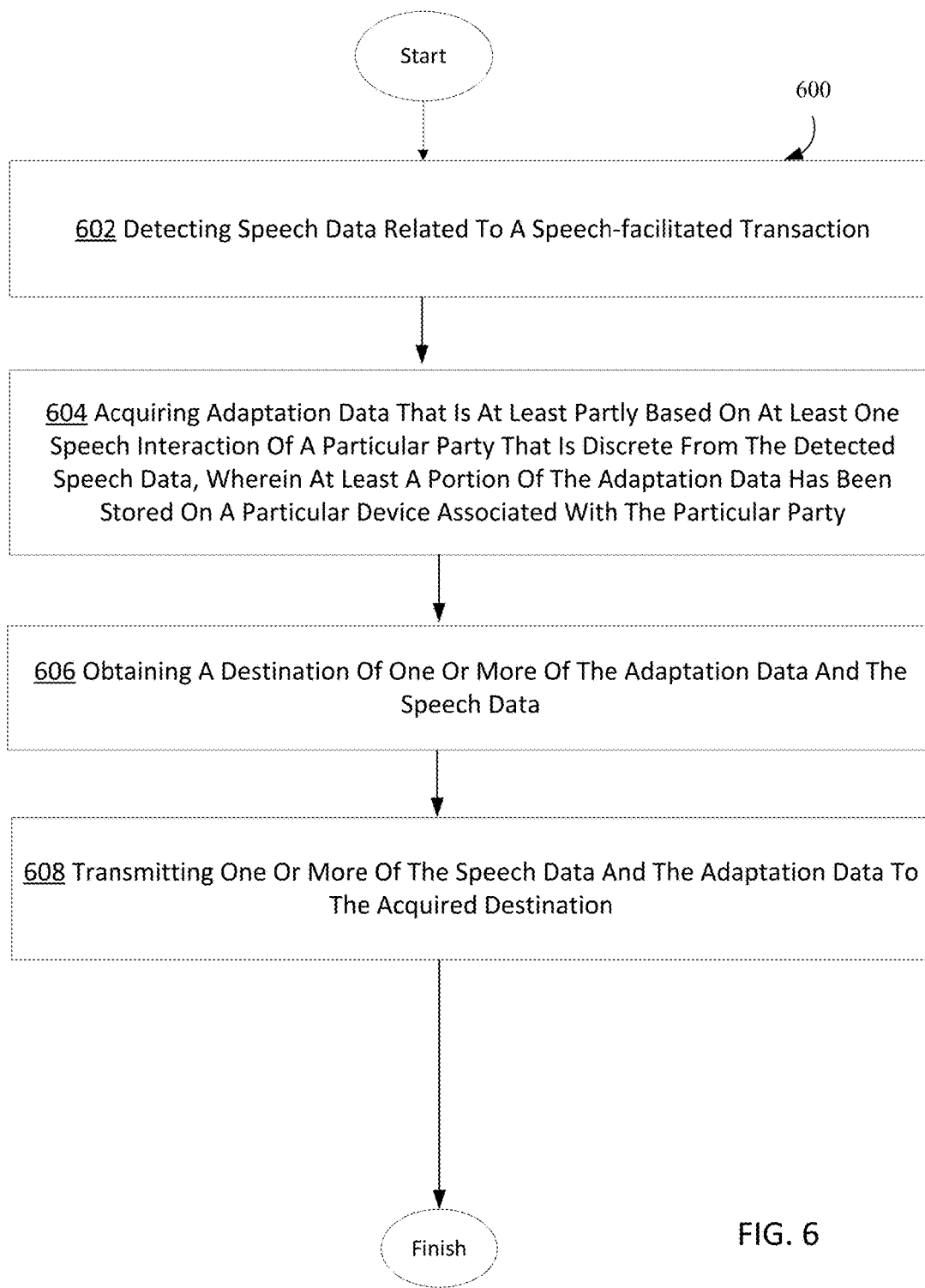
FIG. 6 is a high-level logic flow chart of a process, e.g., operational flow 600, according to an embodiment.

Referring again to FIG. 5, e.g., FIG. 5B, in some embodiments, module 158 may include one or more of one or more filters specified by the acquired adaptation data applying to detected speech data module 516 (e.g., which, in some embodiments, may include non-lexical vocable removal filter specified by the acquired adaptation data applying to detected speech data module 520), filter-applied detected speech data transmitting to acquired destination module 518, one or more of speech data and adaptation data transmitting to particular memory location module 524, and one or more of speech data and adaptation data configured to be processed by a target device transmitting to further device module 532 (e.g., which, in some embodiments, may include one or more of speech data and adaptation data configured to be processed by a motor vehicle control device transmitting to a personal navigation device module 534). In some embodiments, module 524 may include one or more of speech data and adaptation data transmitting to target device speech recognition component module 526. In some embodiments, module 526 may include adaptation data comprising instructions for replacing a word frequency table with a modified word frequency table reflecting particular party word usage transmitting to target device speech recognition component module 528. In some embodiments, module 528 may include adaptation data comprising instructions for replacing a word frequency table with a modified word frequency table reflecting particular party word usage transmitting to a motor vehicle control system speech recognition component module 530.

Following are a series of flowcharts depicting implementations. For ease of understanding, the flowcharts are organized such that the initial flowcharts present implementations via an example implementation and thereafter the following flowcharts present alternate implementations and/or expansions of the initial flowchart(s) as either sub-component operations or additional component operations building on one or more earlier-presented flowcharts. Those having skill in the art will appreciate that the style of presentation utilized herein (e.g., beginning with a presentation of a flowchart(s) presenting an example implementation and thereafter providing additions to and/or further details in subsequent flowcharts) generally allows for a rapid and easy understanding of the various process implementations. In addition, those skilled in the art will further appreciate that the style of presentation used herein also lends itself well to modular and/or object-oriented program design paradigms.

Further, in FIGS. 6-10 and in the figures to follow thereafter, various operations may be depicted in a box-within-a-box manner. Such depictions may indicate that an operation in an internal box may comprise an optional example embodiment of the operational step illustrated in one or more external boxes. However, it should be understood that internal box operations may be viewed as independent operations separate from any associated external boxes and may be performed in any sequence with respect to all other illustrated operations, or may be performed concurrently. Still further, these operations illustrated in FIG. 6 as well as the other operations to be described herein may be performed by at least one of a machine, an article of manufacture, or a composition of matter.

Referring again to FIG. 6, FIG. 6 shows operation 600, which may include operation 602 depicting detecting speech data related to a speech-facilitated transaction. For example, FIG. 1, e.g., FIG. 1B, shows speech data related to speech facilitated transaction detecting module 152 detecting (e.g., either by receiving data, or by a sensor providing notification, e.g., a microphone of a cellular telephone device) speech data (e.g., audio data received from the mouth of a speaker, or data representing speech from the mouth of a speaker) related to a speech-facilitated transaction (e.g., placing an order for hot wings and fries at an automated drive-thru window that accepts speech input).

Referring again to FIG. 6, operation 600 may include operation 604 depicting acquiring adaptation data that is at least partly based on at least one speech interaction of a particular party that is discrete from the detected speech data, wherein at least a portion of the adaptation data has been stored on a particular device associated with the particular party. For example, FIG. 1, e.g., FIG. 1B, shows adaptation data at least partly based on discrete speech interaction of particular party separate from detected speech data, and has been stored on a particular party-associated particular device acquiring module 154 acquiring adaptation data (e.g., a set of proper noun pronunciations, e.g., food items, e.g., "Chunky's Best Wings," or "Big Mac") that is at least partly based on at least one speech interaction (e.g., a previous fast food order at a similar automated drive-thru window at a Big Boy restaurant) of a particular party (e.g., the user, sitting in her car, ordering a meal) that is discrete from the detected speech data (e.g., the speech data of the user placing the order for hot wings and fries at the automated drive-thru window), wherein at least a portion of the adaptation data (e.g., a set of proper noun pronunciations, e.g., food items, e.g., "Chunky's Best Wings," or "Big Mac") has been stored (e.g., at one point was stored, if only temporarily) on a particular device (e.g., a user's cellular phone, on removable memory) associated with the particular party (e.g., in this instance it may merely be carried by the user and in range of the automated drive thru window, or it may broadcast a signal indicating that the device is associated with the party that is speaking when it detects that the user is speaking).

Referring again to FIG. 6, operation 600 may include operation 606 depicting obtaining a destination of one or more of the adaptation data and the speech data. For example, FIG. 1, e.g., FIG. 1B, shows destination of one or more of the adaptation data and the speech data acquiring module 156 obtaining a destination (e.g., the automated drive-thru window) of one or more of the adaptation data and the speech data (e.g., the automated drive thru window may be broadcasting a request for adaptation data to help in processing the user's speech. The cellular telephone device receives that request, thus obtaining an address of the automated drive-thru window which is the destination of the adaptation data (as well as the speech data, but in this example, the cellular device is not transmitting the speech data, but the automated drive thru window is receiving the user's speech directly).

Referring again to FIG. 6, operation 600 may include operation 608 depicting transmitting one or more of the speech data and the adaptation data to the acquired destination. For example, FIG. 1, e.g., FIG. 1B, shows acquired destination of one or more of the adaptation data and the speech data transmitting module 158 transmitting one or more of the speech data and the adaptation data (e.g., in this example, the adaptation data, e.g., a set of proper noun pronunciations, e.g., food items, e.g., "Chunky's Best Wings," or "Big Mac") to the acquired destination (e.g., the automated drive thru window).

Figure 7A:
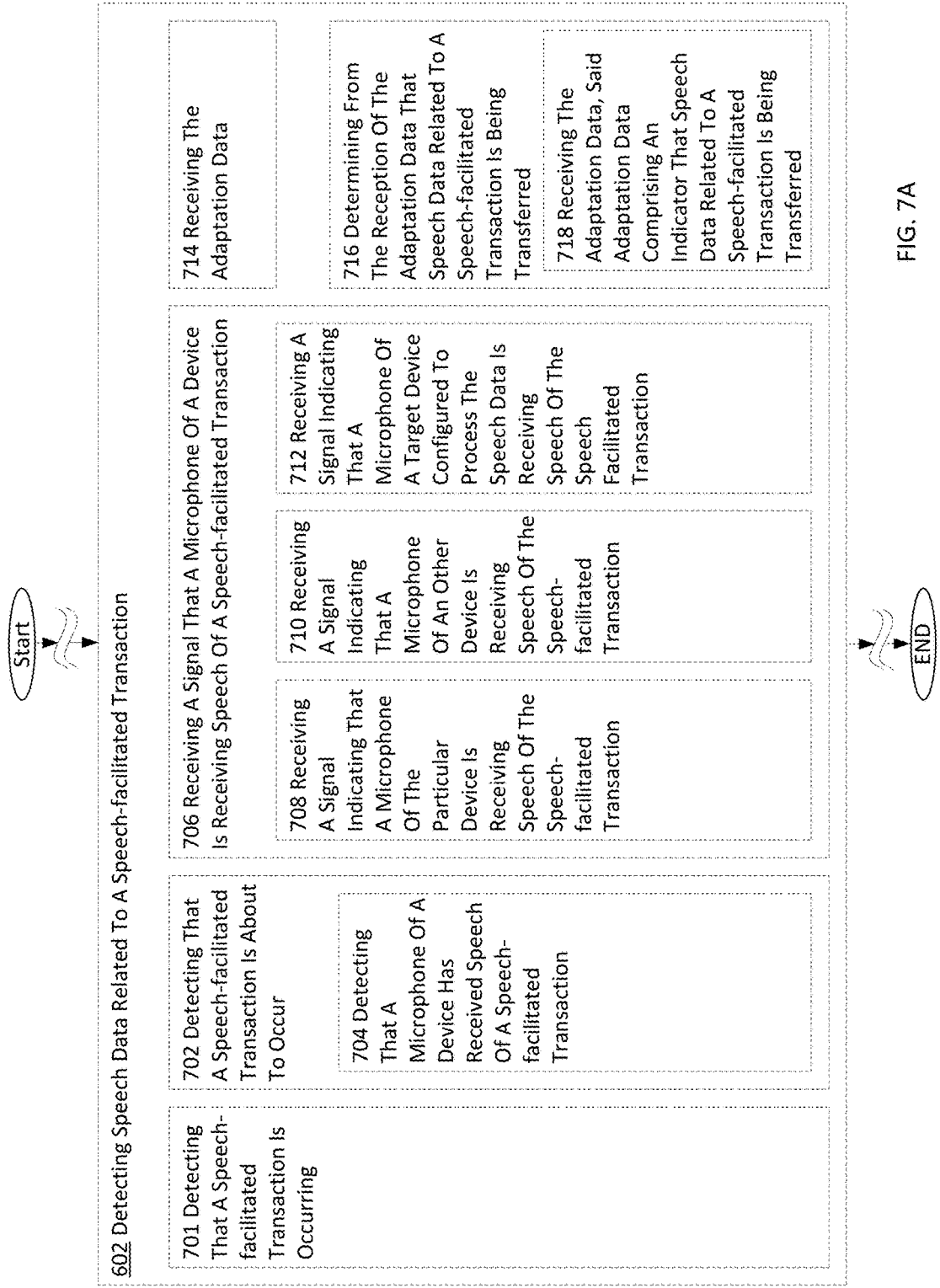
FIG. 7A is a high-level logic flowchart of a process depicting alternate implementations of a detecting speech data operation 602 of FIG. 6, according to one or more embodiments.

FIGS. 7A-7D depict various implementations of operation 602, according to embodiments. Referring now to FIG. 7A, operation 602 may include operation 701 depicting detecting that a speech-facilitated transaction is occurring. For example, FIG. 2, e.g., FIG. 2A, shows speech-facilitated transaction occurrence detecting module 201 detecting (e.g., determine the presence of, be informed of, realize, be made aware of, or otherwise learn) that a speech-facilitated transaction (e.g., using speech to perform numeric calculations using a calculator device) is occurring (e.g., is currently taking place, or is about to take place, or a step that indicates the transaction is occurring or about to take place).

Referring again to FIG. 7A, operation 602 may include operation 702 depicting detecting that a speech-facilitated transaction is about to occur. For example, FIG. 2, e.g., FIG. 2A, shows speech-facilitated transaction about to occur detecting module 202 detecting that a speech-facilitated transaction (e.g., setting up a playlist in a home theater system) is about to occur (e.g., the operation of the home theater system has pressed the "make playlist" button on a remote.")

Referring again to FIG. 7A, operation 702 may include operation 704 depicting detecting that a microphone of a device has received speech of a speech-facilitated transaction. For example, FIG. 2, e.g., FIG. 2A, shows device microphone receiving speech of a speech-facilitated transaction detecting module 204 detecting that a microphone of a device (e.g., the receiver of a cellular telephone) has received speech (e.g., the microphone sends an internal signal to the processor indicating that it is receiving, or has received, or both, speech) of a speech-facilitated transaction (e.g., activating a home security system with a particular code phrase).

Referring again to FIG. 7A, operation 602 may include operation 706 depicting receiving a signal indicating that a microphone of a device is receiving speech of a speech-facilitated transaction. For example, FIG. 2, e.g., FIG. 2A, shows indicator of device microphone receiving speech of a speech facilitated transaction signal detecting module 206 receiving a signal (e.g., receiving, over a network, from an external device) indicating that a microphone of a device (e.g., a receiver of an audio recording device, e.g., a personal recorder) is receiving speech of a speech-facilitated transaction (e.g., ordering a cheeseburger from an automated drive-thru machine).

Referring again to FIG. 7A, operation 706 may include operation 708 depicting receiving a signal indicating that a microphone of the particular device is receiving speech of the speech-facilitated transaction. For example, FIG. 2, e.g., FIG. 2A, shows indicator of particular device microphone receiving speech of a speech facilitated transaction signal detecting module 208 receiving a signal (e.g., receiving a signal directly from a cellular telephone) indicating that a microphone of the particular device (e.g., a user's smartphone) is receiving speech of the speech-facilitated transaction (e.g., a dictating a memorandum to a default operating system word processing software loaded on a desktop computer).

Referring again to FIG. 7A, operation 706 may include operation 710 depicting receiving a signal indicating that a microphone of an other device is receiving speech of the speech-facilitated transaction. For example, FIG. 2, e.g., FIG. 2A, shows indicator of other device microphone receiving speech of a speech facilitated transaction signal detecting module 210 receiving a signal (e.g., receiving a signal from a user's cellular telephone device) indicating that a microphone of an other device (e.g., a microphone of a gaming headset) is receiving speech of the speech-facilitated transaction (e.g., issuing in-game commands in an online soccer video game).

Referring again to FIG. 7A, operation 706 may include operation 712 depicting receiving a signal indicating that a microphone of a target device configured to process the speech data is receiving speech of the speech facilitated transaction. For example, FIG. 2, e.g., FIG. 2A, shows indicator of target device microphone receiving speech of a speech facilitated transaction signal detecting module 212 receiving a signal (e.g., from a smartphone, e.g., which may have its microphone turned off or disabled) indicating that a microphone of a target device (e.g., a receiving microphone of an automated teller machine device) configured to process the speech data (e.g., the automated teller machine device is capable of processing speech data) is receiving speech of the speech-facilitated transaction (e.g., withdrawing two hundred dollars from a checking account). It is noted that, in some embodiments, the received signal may indicate that the speech data being received is capable of being processed by the target device, however, in other embodiments, the signal merely indicates that a microphone of the target device is receiving speech.

Referring again to FIG. 7A, operation 602 may include operation 714 depicting receiving the adaptation data. For example, FIG. 2, e.g., FIG. 2A, shows adaptation data receiving module 214 receiving the adaptation data (e.g., instructions for adapting a speech recognition component of a target device configured to receive speech, e.g., an automated airline ticket dispenser machine).

Referring again to FIG. 7A, in embodiments in which operation 602 includes operation 714, operation 602 may further include operation 716 depicting determining from the reception of the adaptation data that speech data related to a speech-facilitated transaction is being transferred. For example, FIG. 2, e.g., FIG. 2A, shows reception of adaptation data-based speech data transferring determination module 216 determining from the reception of the adaptation data (e.g., the instructions for adapting the speech recognition component) that speech data related to a speech-facilitated transaction (e.g., printing an airline ticket) is being transferred (e.g., the system is configured such that adaptation data is sent upon the starting of a speech-facilitated transaction, so that upon receipt of the adaptation data, it is known that speech data is being transferred).

Referring again to FIG. 7A, operation 716 may include operation 718 depicting receiving the adaptation data, said adaptation data comprising an indicator that speech data related to a speech-facilitated transaction is being transferred. For example, FIG. 2, e.g., FIG. 2A, shows reception of adaptation data comprising indicator based speech data transferring determination module 218 receiving the adaptation data (e.g., data including a pronunciation dictionary and a flag indicating that speech is taking place), said adaptation data comprising an indicator (e.g., an electronic flag) that speech data related to a speech-facilitated transaction (e.g., programming a speech-enabled Digital Video Recorder) is being transferred (e.g., the particular party is speaking).

Figure 7B:
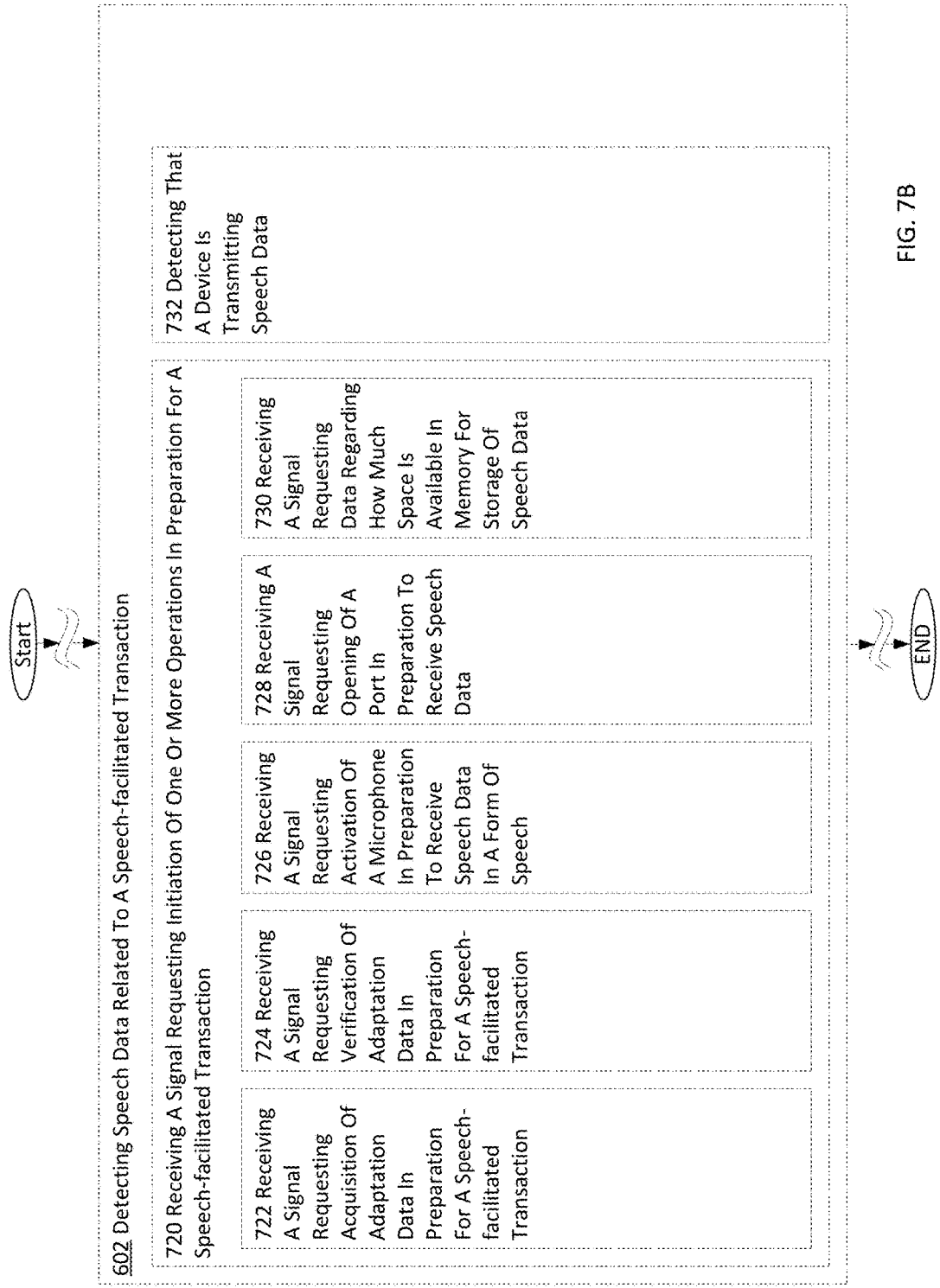
FIG. 7B is a high-level logic flowchart of a process depicting alternate implementations of a detecting speech data operation 602 of FIG. 6, according to one or more embodiments.

Referring now to FIG. 7B, operation 602 may include operation 720 depicting receiving a signal requesting initiation of one or more operations in preparation for a speech-facilitated transaction. For example, FIG. 2, e.g., FIG. 2B, shows signal requesting initiation of one or more speech-facilitated transaction operations receiving module 220 receiving a signal (e.g., either internally or externally) requesting initiation of one or more operations (e.g., one or more of acquiring adaptation data, reserving a portion of memory, executing one or more commands, running a diagnostic check, activating a component, e.g., activating a microphone, adjusting a microphone sensitivity, loading a particular language set, and the like) in preparation for a speech-facilitated transaction (e.g., giving a speech command to a motor vehicle control system).

Referring again to FIG. 7B, operation 720 may include operation 722 depicting receiving a signal requesting acquisition of adaptation data in preparation for a speech-facilitated transaction. For example, FIG. 2, e.g., FIG. 2B, shows signal requesting acquisition of adaptation data in preparation for the speech-facilitated transaction receiving module 222 receiving a signal requesting acquisition of adaptation data (e.g., a pronunciation dictionary) in preparation for a speech-facilitated transaction (e.g., an automated teller machine device transaction that may use numbers whose pronunciations are in the pronunciation dictionary).

Referring again to FIG. 7B, operation 720 may include operation 724 depicting receiving a signal requesting verification of adaptation data in preparation for a speech-facilitated transaction. For example, FIG. 2, e.g., FIG. 2B, shows signal requesting verification of adaptation data in preparation for the speech-facilitated transaction receiving module 224 receiving a signal requesting verification (e.g., a request for a determination about adaptation data, e.g., one or more of has it been received, is it viable for use in the target device, is it digitally signed and/or authenticated, and the like) of adaptation data (e.g., a stochastic state transition network) in preparation for a speech-facilitated transaction (e.g., giving a command to increase volume to a speech-enabled television, e.g., television 53)

Referring again to FIG. 7B, operation 720 may include operation 726 depicting receiving a signal requesting activation of a microphone in preparation to receive speech data in a form of speech. For example, FIG. 2, e.g., FIG. 2B, shows signal requesting microphone activation receiving module 226 receiving a signal requesting activation of a microphone in preparation to receive speech data in a form of speech (e.g., ordering a pizza with three different kinds of toppings from an automated order-taking unit).

Referring again to FIG. 7B, operation 720 may include operation 728 depicting receiving a signal requesting opening of a port in preparation to receive speech data. For example, FIG. 2, e.g., FIG. 2B, shows signal requesting opening of data port receiving module 228 receiving a signal requesting opening of a port (e.g., allowing access to an application-specific or process-specific software construct as a communications endpoint in a computer's host operating system) in preparation to receive speech data (e.g., data to be received at a particular port).

Referring again to FIG. 7B, operation 720 may include operation 730 depicting receiving a signal requesting data regarding how much space is available in memory for storage of speech data. For example, FIG. 2, e.g., FIG. 2B, shows signal requesting data regarding amount of available memory space for speech data storage receiving module 230 receiving a signal (e.g., receiving a message, e.g., a TCP/IP formatted message) requesting data regarding how much space is available in memory (e.g., memory 134) for storage of speech data (e.g., storage of an electronic representation of words spoken by the particular party).

Referring again to FIG. 7B, operation 602 may include operation 732 depicting detecting that a device is transmitting speech data. For example, FIG. 2, e.g., FIG. 2B, shows speech data transmission by device detecting module 232 detecting that a device (e.g., a cellular telephone device) is transmitting speech data (e.g., packets of data corresponding to broken-down speech).

Figure 7C:
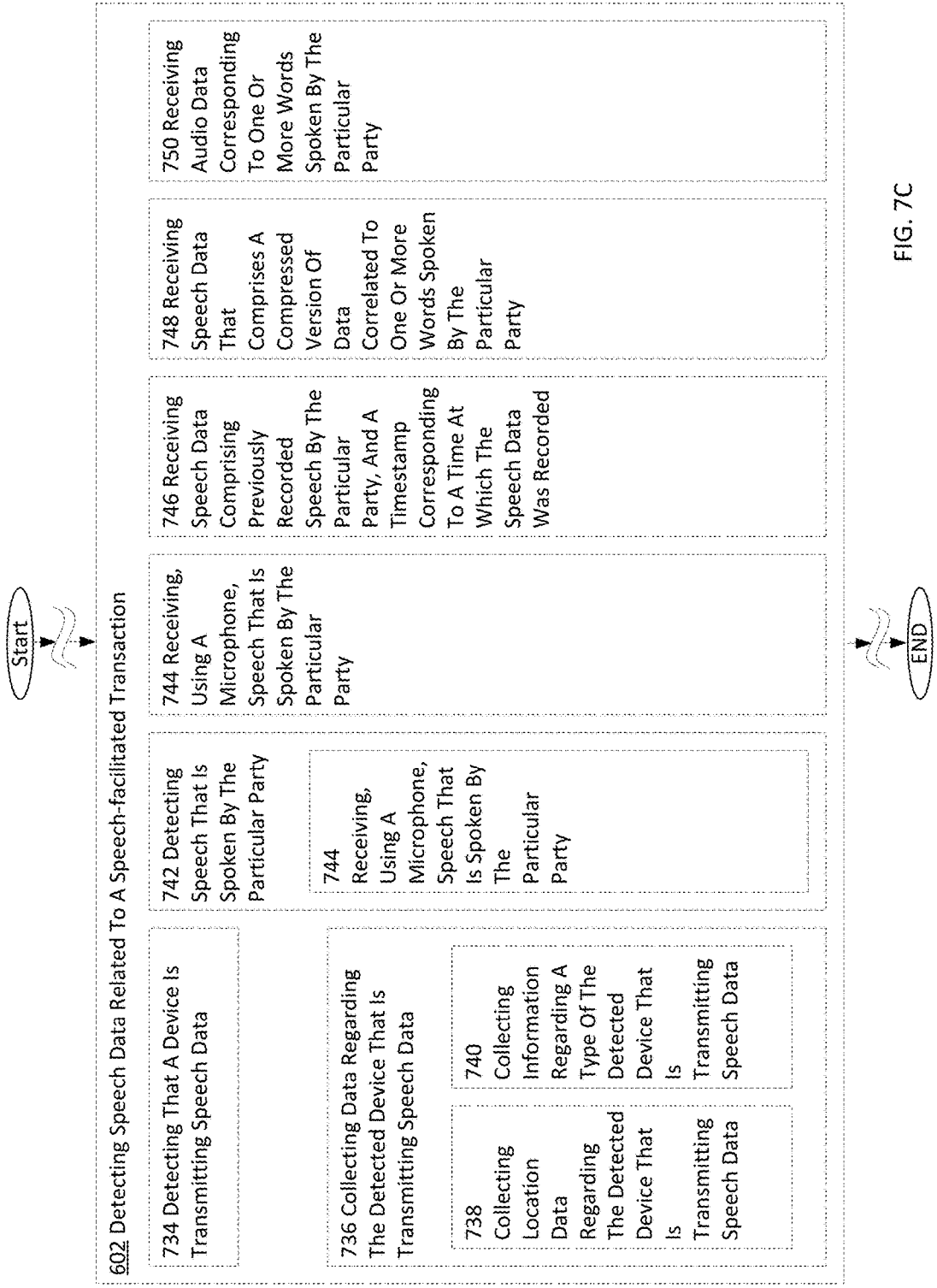
FIG. 7C is a high-level logic flowchart of a process depicting alternate implementations of a detecting speech data operation 602 of FIG. 6, according to one or more embodiments.

Referring now to FIG. 7C, operation 602 may include operation 734 depicting detecting that a device is transmitting speech data. For example, FIG. 2, e.g., FIG. 2C, shows transmission of speech data by device detecting module 234 detecting (e.g., a software monitoring application determines that another application on the same device is transmitting speech data) that a device (e.g., a word processing application of a computer) is transmitting speech data (e.g., received speech converted into a transmittable data format).

Referring again to FIG. 7C, operation 602 may include operation 736 depicting collecting data regarding the detected device that is transmitting speech data. For example, FIG. 2, e.g., FIG. 2C, shows data regarding detected device transmitting speech data collecting module 236 collecting data (e.g., information about one or more of an identity, location, ownership of, and one or more characteristics of the detected device) that is transmitting speech data (e.g., data converted from speech of the particular party ordering a sandwich at an automated drive-thru window).

Referring again to FIG. 7C, operation 736 may include operation 738 depicting collecting location data regarding the detected device that is transmitting speech data. For example, FIG. 2, e.g., FIG. 2C, shows data regarding location of detected device transmitting speech data collecting module 238 collecting location data (e.g., a position of the device, or its address on a network) regarding the detected device (e.g., a copying machine on a corporate enterprise network) that is transmitting speech data (packetized data representing a user giving commands, e.g., a user giving sizing and color palette instructions to the copier using speech).

Referring again to FIG. 7C, operation 736 may include operation 740 depicting collecting information regarding a type of the detected device that is transmitting speech data. For example, FIG. 2, e.g., FIG. 2C, shows data regarding type of detected device transmitting speech data collecting module 240 collecting information (e.g., identification information, including any kind of type information, including but not limited to manufacturer information, serial number, MAC address, other identifier, class of device, radio capacity, and the like) regarding a type of the detected device (e.g., whether the detected device is a cellular telephone, or a pair of customized eyeglasses that are configured to pick up speech of the wearer) that is transmitting speech data).

Referring again to FIG. 7C, operation 602 may include operation 742 depicting detecting speech that is spoken by the particular party. For example, FIG. 2, e.g., FIG. 2C, shows particular party spoken speech detecting module 242 detecting speech (e.g., a request to withdraw money from a speech-enabled automated teller machine device) that is spoken by the particular party (e.g., a user attempting to withdraw money).

Referring again to FIG. 7C, operation 742 may include operation 744 depicting receiving, using a microphone, speech that is spoken by the particular party. For example, FIG. 2, e.g., FIG. 2C, shows particular party spoken speech receiving using microphone module 244 receiving, using a microphone (e.g., a microphone of a cellular telephone device), speech that is spoken by the particular party (e.g., speaking the name of a destination city at an automated airline ticket dispenser).

Referring again to FIG. 7C, operation 602 may include operation 746 depicting receiving speech data comprising previously recorded speech by the particular party, and a timestamp corresponding to a time at which the speech data was recorded. For example, FIG. 2, e.g., FIG. 2C, shows speech data comprising previously recorded particular party speech and timestamp of recording speech receiving module 246 receiving speech data (e.g., an MPEG-2 Audio Layer III (e.g., "MP3") formatted data file) comprising previously recorded speech by the particular party (e.g., speech dictating a memorandum), and a timestamp (e.g., a file with the time in plaintext) corresponding to a time at which the speech data was recorded.

Referring again to FIG. 7C, operation 602 may include operation 748 depicting receiving speech data that comprises a compressed version of data correlated to one or more words spoken by the particular party. For example, FIG. 2, e.g., FIG. 2C, shows speech data comprising compressed version of data correlated to particular party spoken words receiving module 248 receiving speech data (e.g., data corresponding to speech of the particular party ordering a cheeseburger at an automated drive-thru window) that comprises a compressed version of data (e.g., Code Excited Linear Prediction "CELP" coding) correlated to one or more words (e.g., "two bacon cheeseburger combos, please") spoken by the particular party (e.g., the user ordering food).

Referring again to FIG. 7C, operation 602 may include operation 750 depicting receiving audio data corresponding to one or more words spoken by the particular party. For example, FIG. 2, e.g., FIG. 2C, shows audio data corresponding to one or more particular party spoken words receiving module 250 receiving audio data (e.g., a .wav-formatted file transmitted in packets) corresponding to one or more words spoken by the particular party (e.g., a user giving a command to a computer that may not be speech-enabled).

Referring now to FIG. 7D, operation 602 may include operation 752 depicting receiving, from a device, speech data correlated to one or more words spoken by a particular party. For example, FIG. 2, e.g., FIG. 2D, shows speech data correlated to one or more particular party spoken words receiving from a device module 252 receiving, from a device (e.g., a USB storage device that also can transmit and receive data) speech data (e.g., a text file transcript of words spoken by a user) correlated to one or more words spoken by a particular party (e.g., words setting up a recording of the Notre Dame football game on Saturday).

Referring again to FIG. 7D, operation 752 may include operation 754 depicting receiving, from the device, audio data derived from one or more words spoken by the particular party. For example, FIG. 2, e.g., FIG. 2D, shows audio data derived from one or more particular party spoken words receiving from a device module 252 receiving, from the device (e.g., receiving, from a tablet device, which in turn received from a cellular telephone device) audio data (e.g., altered audio data, e.g., audio data with identifiable speaker characteristics removed) derived from (e.g., based on, or that used as a starting point of the algorithm) one or more words spoken by the particular party (e.g., words selecting a destination from an automated airline ticket dispenser).

Referring again to FIG. 7D, operation 754 may include operation 756 depicting receiving, from the device, audio data derived from one or more words spoken by the particular party and detected by the device. For example, FIG. 2, e.g., FIG. 2D, shows audio data derived from one or more particular party spoken words detected by the device receiving from the device module 256 receiving, from the device (e.g., from an internet-enabled personal voice recorder (PVR)), audio data (e.g., noise-filtered speech data) derived from one or more words spoken by the particular party (e.g., dictation of a grocery list) and detected by the device (e.g., the PVR).

Referring again to FIG. 7D, operation 754 may include operation 758 depicting receiving, from the device, audio data derived from one or more words spoken by the particular party and recorded by the device. For example, FIG. 2, e.g., FIG. 2D, shows audio data derived from one or more particular party spoken words recorded by the device receiving from the device module 258 receiving, from the device (e.g., from a smartphone), audio data (e.g., compressed and packetized audio data) derived from one or more words spoken by the particular party (e.g., commanding a speech-enabled television to tune to a specific television show when the channel is unknown).

Figure 8A:
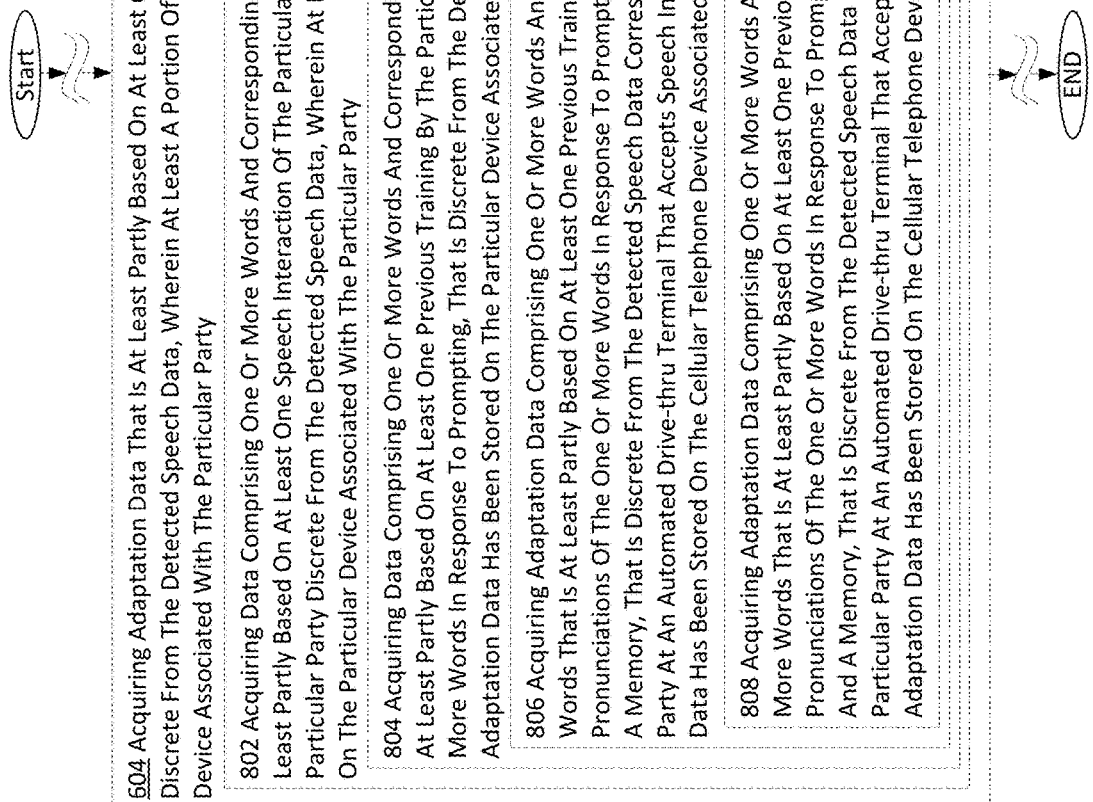
FIG. 8A is a high-level logic flowchart of a process depicting alternate implementations of an acquiring adaptation data operation 604 of FIG. 6, according to one or more embodiments.
Figure 8B:
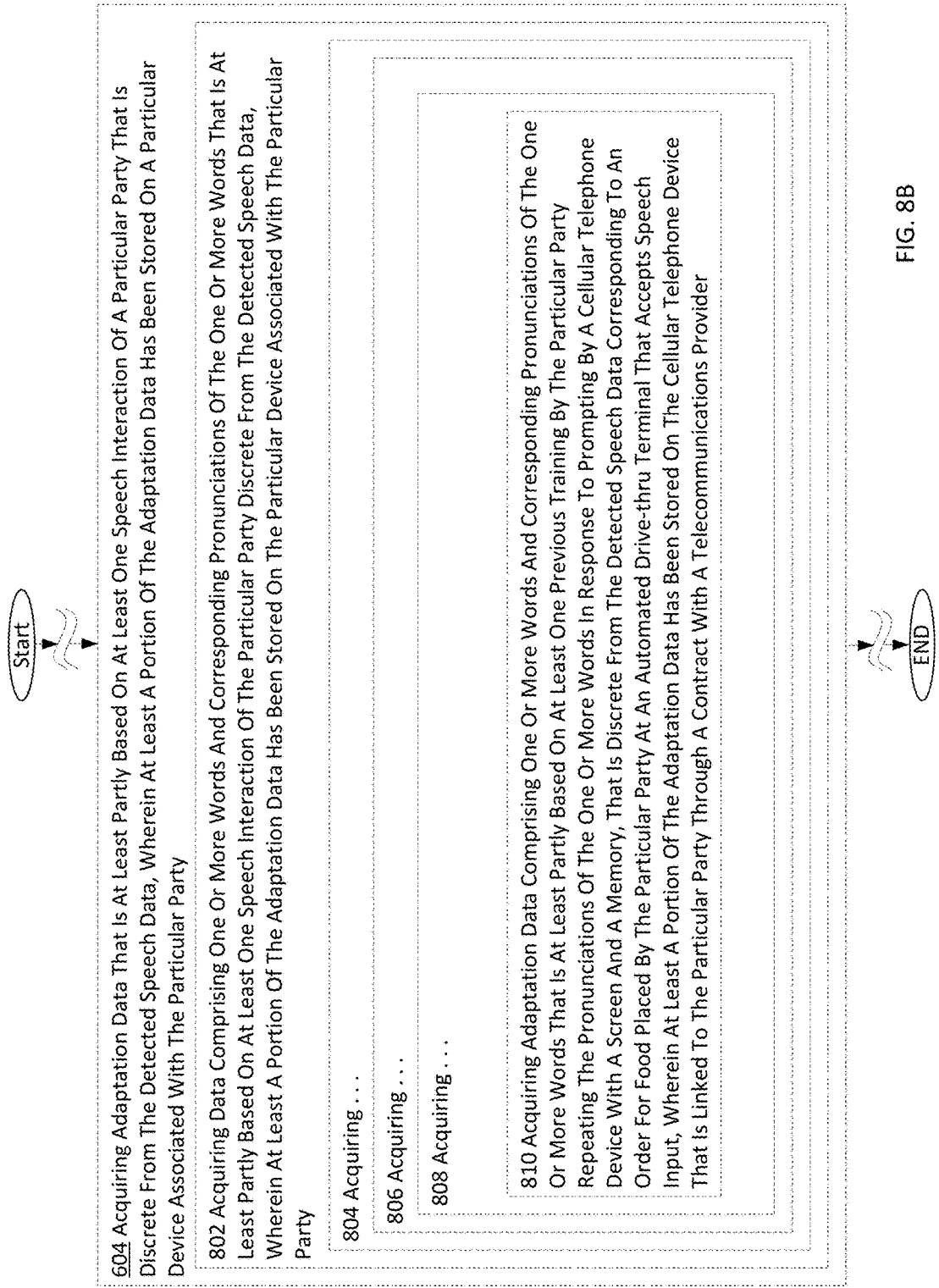
FIG. 8B is a high-level logic flowchart of a process depicting alternate implementations of an acquiring adaptation data operation 604 of FIG. 6, according to one or more embodiments.
Figure 8D:
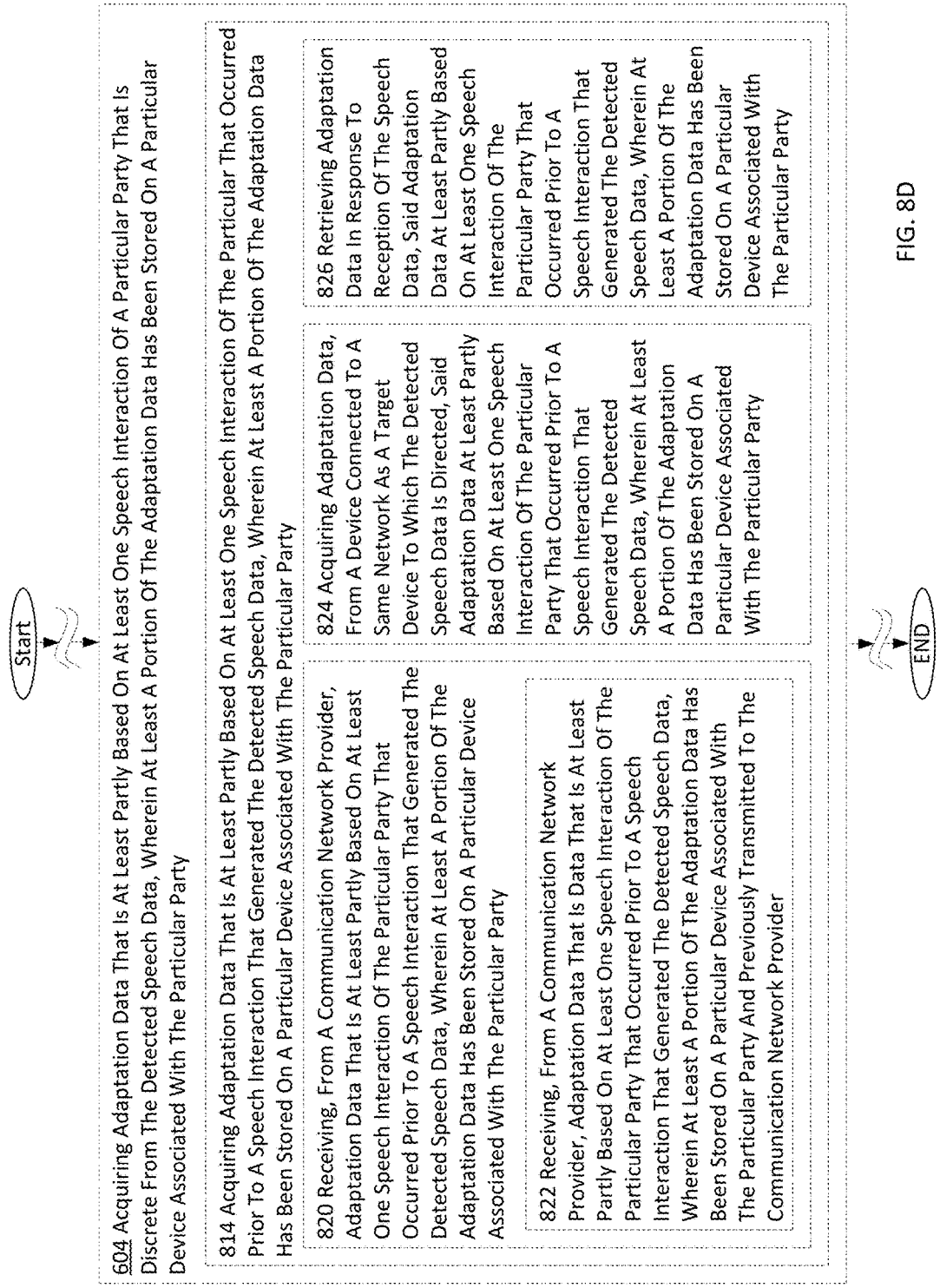
FIG. 8D is a high-level logic flowchart of a process depicting alternate implementations of an acquiring adaptation data operation 604 of FIG. 6, according to one or more embodiments.
Figure 8I:
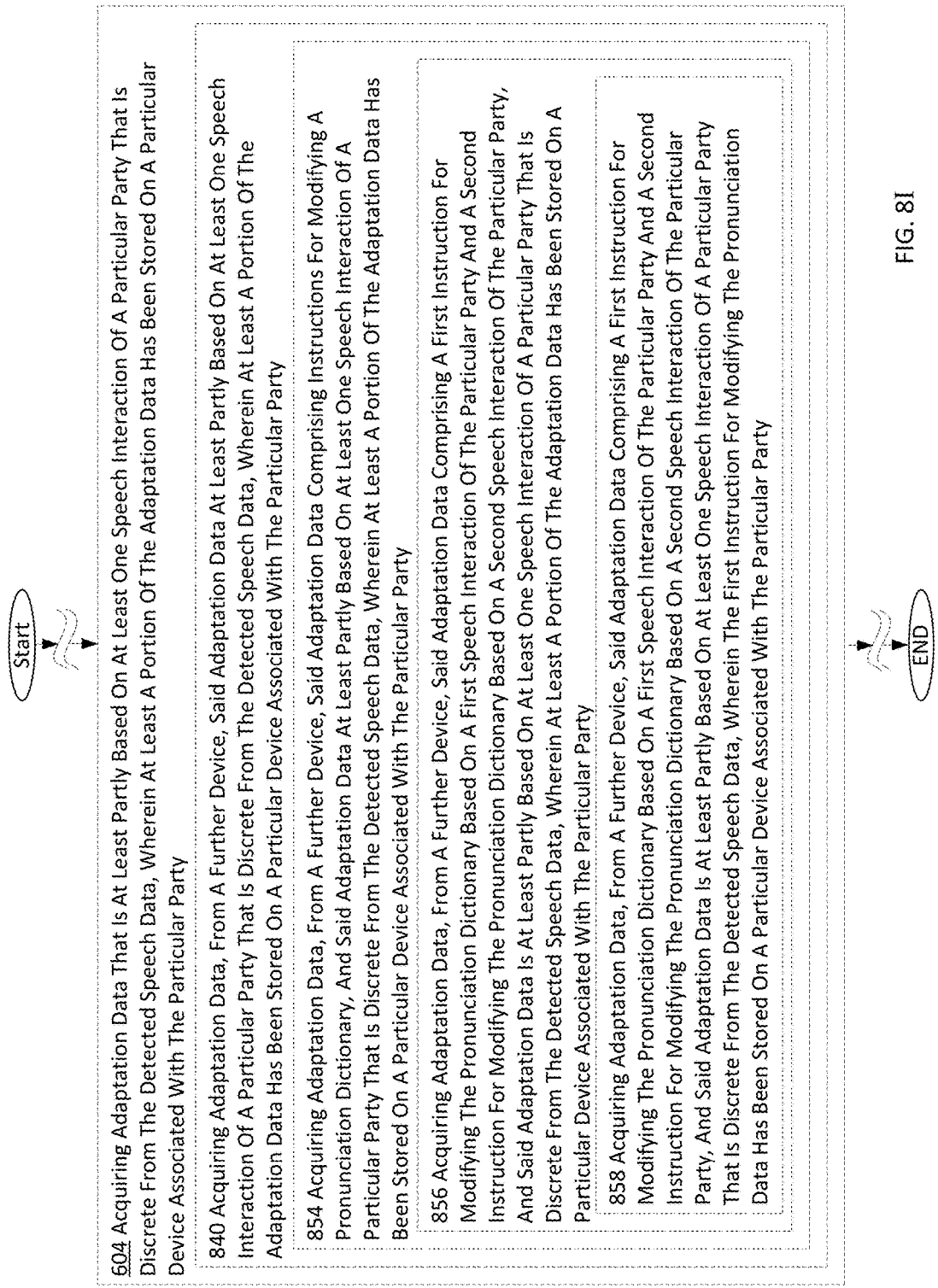
FIG. 8I is a high-level logic flowchart of a process depicting alternate implementations of an acquiring adaptation data operation 604 of FIG. 6, according to one or more embodiments.
Figure 8J:
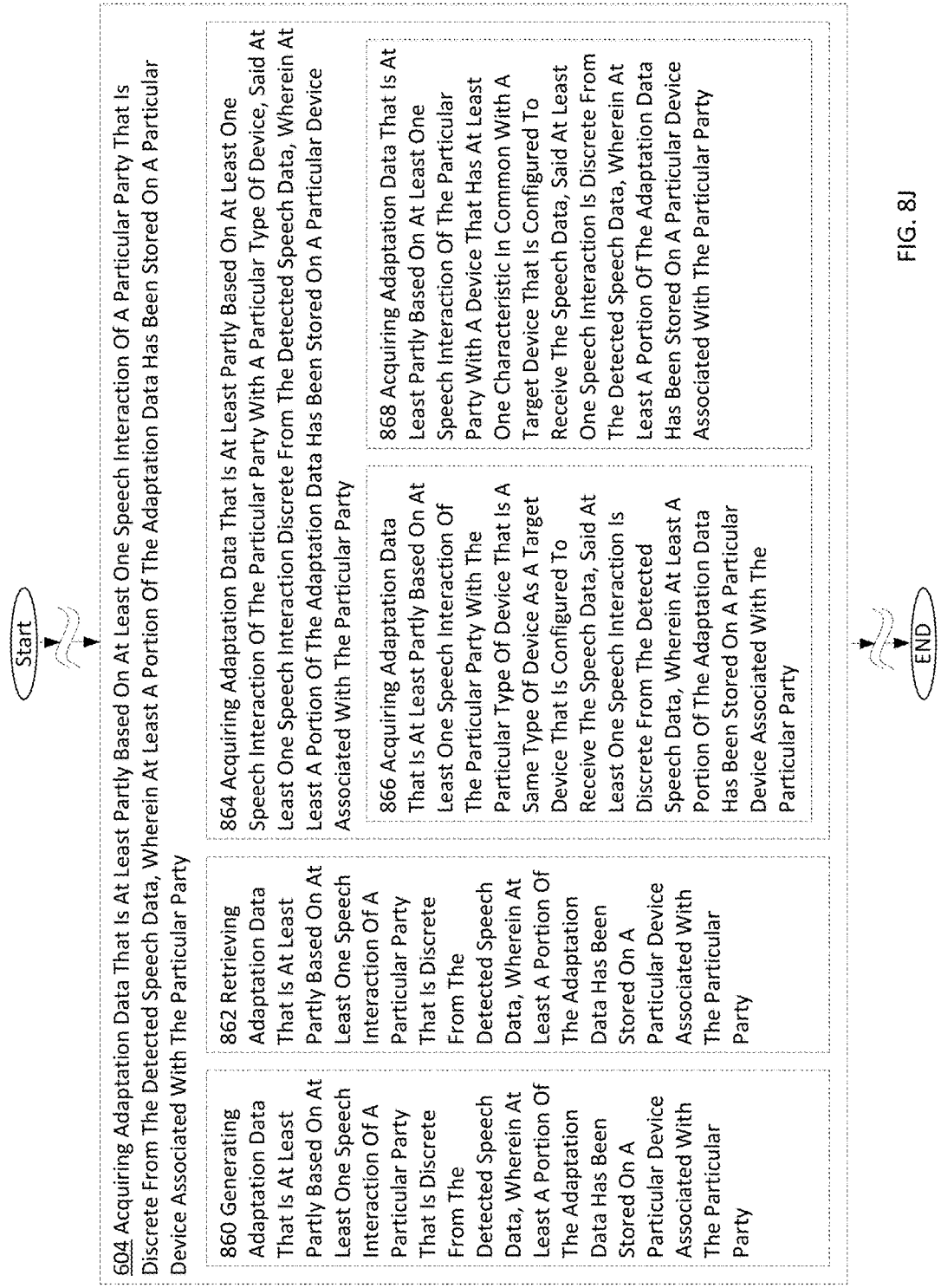
FIG. 8J is a high-level logic flowchart of a process depicting alternate implementations of an acquiring adaptation data operation 604 of FIG. 6, according to one or more embodiments.
Figure 8L:
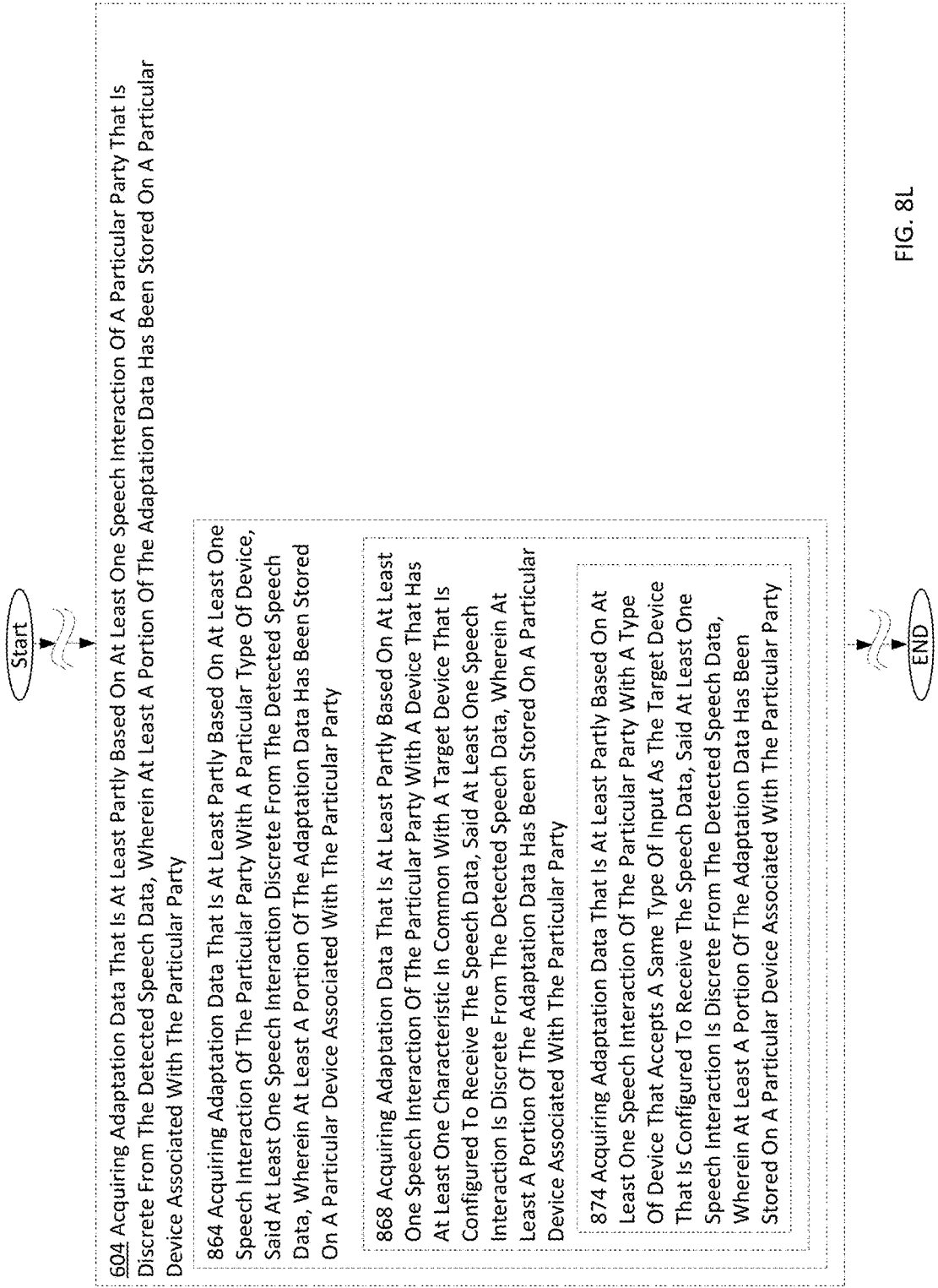
FIG. 8L is a high-level logic flowchart of a process depicting alternate implementations of an acquiring adaptation data operation 604 of FIG. 6, according to one or more embodiments.
Figure 8M:
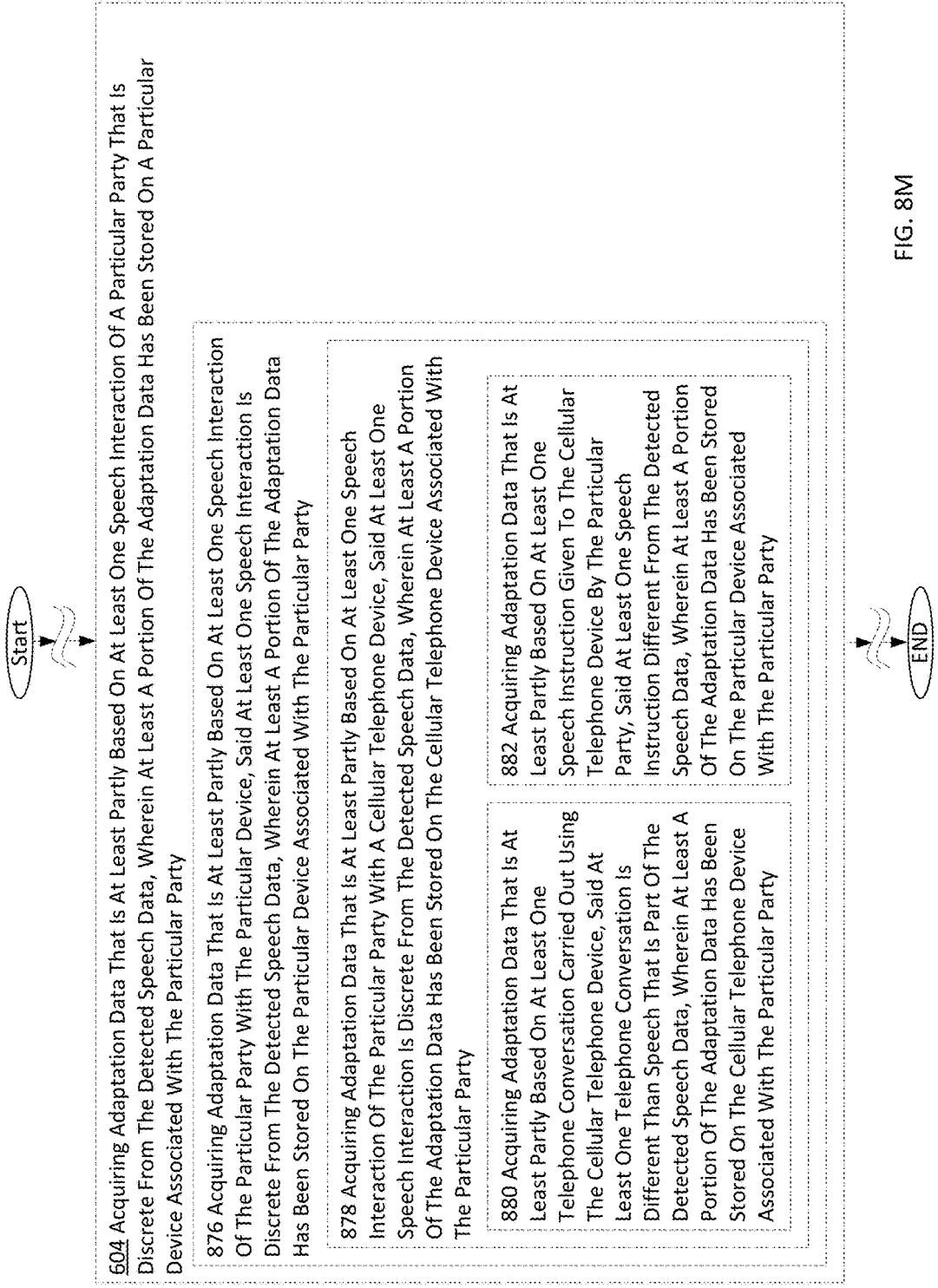
FIG. 8M is a high-level logic flowchart of a process depicting alternate implementations of an acquiring adaptation data operation 604 of FIG. 6, according to one or more embodiments.
Figure 8N:
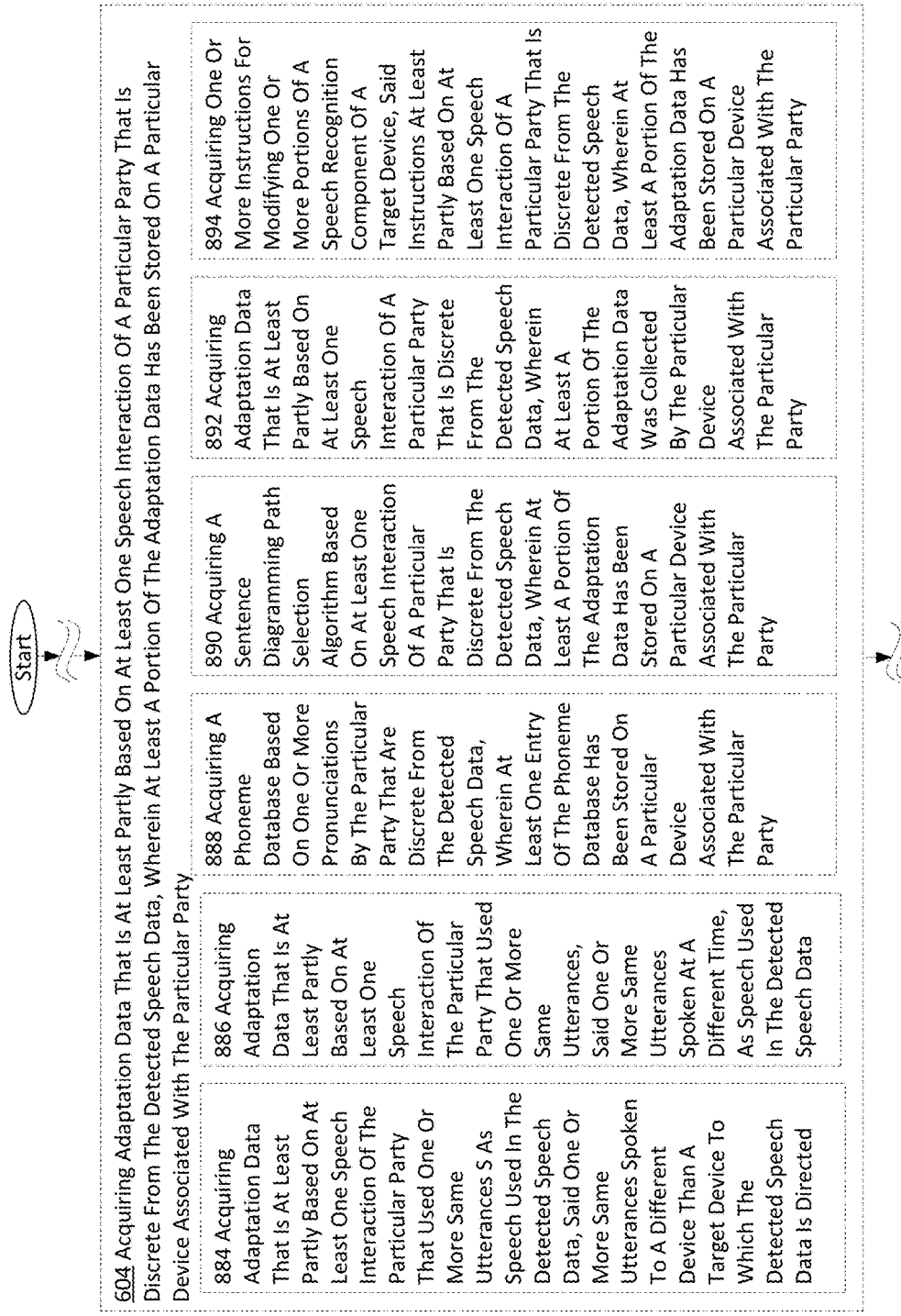
FIG. 8N is a high-level logic flowchart of a process depicting alternate implementations of an acquiring adaptation data operation 604 of FIG. 6, according to one or more embodiments.
Figure 8Q:
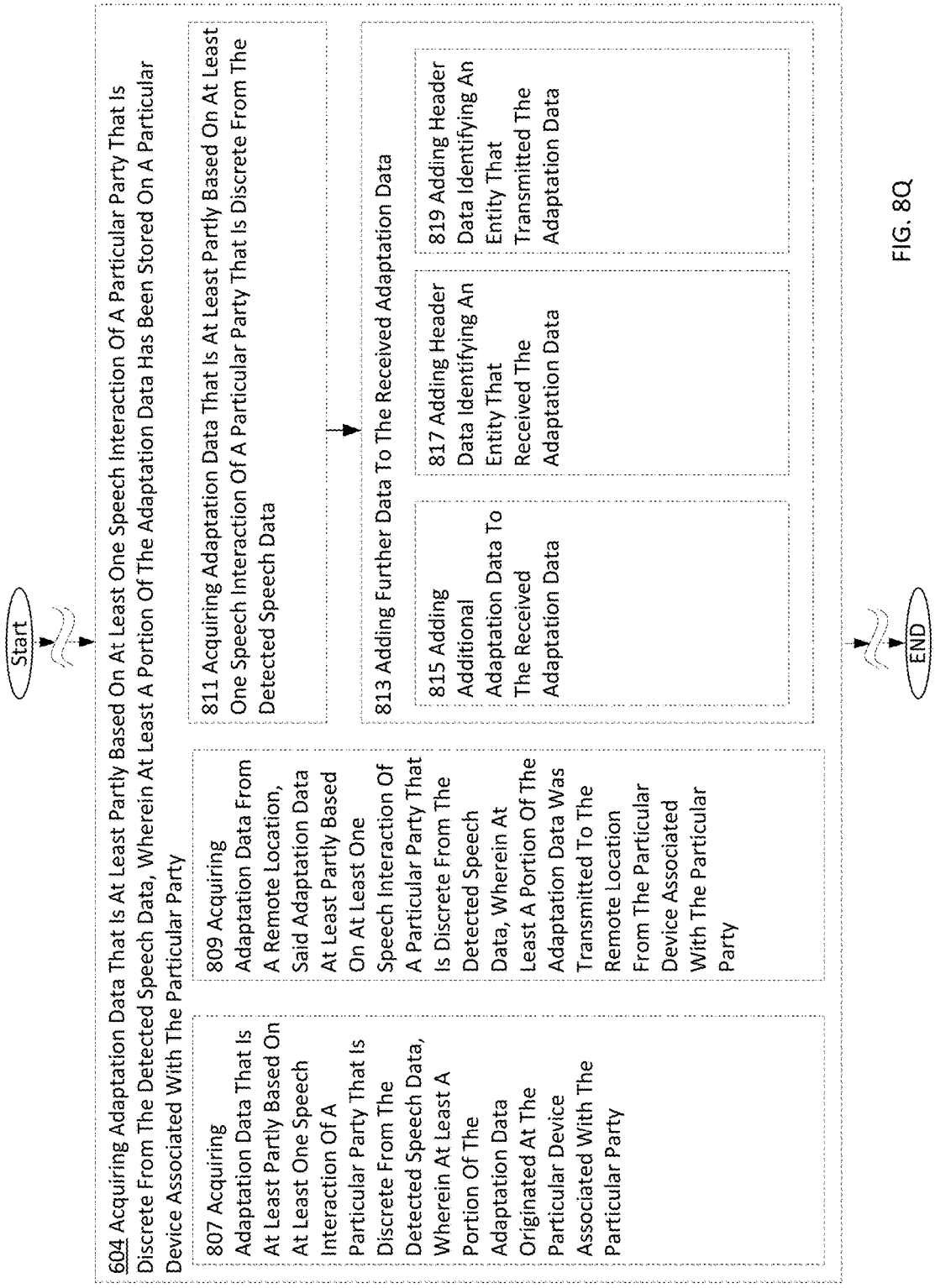
FIG. 8Q is a high-level logic flowchart of a process depicting alternate implementations of an acquiring adaptation data operation 604 of FIG. 6, according to one or more embodiments.

FIGS. 8A-8Q depict various implementations of operation 604, according to embodiments. Referring now to FIG. 8A, operation 604 may include operation 802 depicting acquiring data comprising one or more words and corresponding pronunciations of the one or more words that is at least partly based on at least one speech interaction of the particular party, said at least one speech interaction of the particular party discrete from the detected speech data, wherein at least a portion of the adaptation data has been stored on the particular device associated with the particular party. For example, FIG. 3, e.g., FIG. 3A, shows adaptation data comprising one or more words and corresponding pronunciations of the one or more words at least partly based on discrete speech interaction of particular party separate from detected speech data, and has been stored on a particular party-associated particular device acquiring module 302 acquiring data comprising one or more words (e.g., "pepperoni," "cheese," and "anchovies") and corresponding pronunciations of the one or more words that is at least partly based on one speech interaction of the particular party (e.g., using a cellular telephone device to order a pizza), said at least one speech interaction of the particular party discrete from the detected speech data (e.g., the user is placing an order at an automated drive-thru window), wherein at least a portion of the adaptation data has been stored on the particular device (e.g., the cellular telephone used to order the pizza) associated with the particular party (e.g., owned by the user).

Referring again to FIG. 8A, operation 802 may include operation 804 depicting acquiring data comprising one or more words and corresponding pronunciations of the one or more words that is at least partly based on at least one previous training by the particular party providing the pronunciations of the one or more words in response to prompting, that is discrete from the detected speech data, wherein at least a portion of the adaptation data has been stored on the particular device associated with the particular party. For example, FIG. 3, e.g., FIG. 3A, shows adaptation data comprising one or more words and corresponding pronunciations of the one or more words at least partly based on at least one previous training by the particular party separate from detected speech data, and has been stored on a particular party-associated particular device acquiring module 304 acquiring data comprising one or more words (e.g., "Boston," "Austin," and "flossed") and corresponding pronunciations of the one or more words that is at least partly based on at least one previous training by the particular party providing the pronunciations of the one or more words in response to prompting (e.g., displaying on a computer screen), that is discrete from the detected speech data (e.g., data used in a transaction of buying a train ticket from a speech-enabled automated ticket dispenser), wherein at least a portion of the adaptation data has been stored on the particular device (e.g., a USB device that can also transmit and receive, that was previously inserted into the computer during or after the user's training, and is now carried by the user) associated with the particular party (e.g., the USB device is a necklace, wristband, watch, or pair of eyeglasses that the user is wearing).

Referring again to FIG. 8A, operation 804 may include operation 806 depicting acquiring adaptation data comprising one or more words and corresponding pronunciations of the one or more words that is at least partly based on at least one previous training by the particular party repeating the pronunciations of the one or more words in response to prompting by the particular device, that is discrete from the detected speech data corresponding to an order placed by the particular party at an automated drive-thru terminal that accepts speech input, wherein at least a portion of the adaptation data has been stored on the particular device associated with the particular party. For example, FIG. 3, e.g., FIG. 3, shows adaptation data comprising one or more words and corresponding pronunciations of the one or more words at least partly based on at least one previous training by the particular party separate from detected speech data corresponding to an order placed by the particular party at an automated drive-thru terminal that accepts speech input, and has been stored on a particular party-associated particular device acquiring module 306 acquiring adaptation data comprising one or more words (e.g., "national," "first," "bank," "money," and "personal identification number") and corresponding pronunciations of the one or more words that is at least partly based on at least one previous training by the particular party repeating the pronunciations of the one or more words in response to prompting by the particular device (e.g., a custom headset that the user wears and which provides audio prompting to the user through the earphone portion of the headset), that is discrete from the detected speech data corresponding to an order placed by the particular party at an automated drive-thru terminal that accepts speech input, wherein at least a portion of the adaptation data has been stored on the particular device (e.g., the training data was briefly stored at the headset and then transferred to a location within a cloud network) associated with the particular party (e.g., used by the user at one point previously).

Referring again to FIG. 8A, operation 806 may include operation 808 depicting acquiring adaptation data comprising one or more words and corresponding pronunciations of the one or more words that is at least partly based on at least one previous training by the particular party repeating the pronunciations of the one or more words in response to prompting by a cellular telephone device with a screen and a memory, that is discrete from the detected speech data corresponding to an order for food placed by the particular party at an automated drive-thru terminal that accepts speech input, wherein at least a portion of the adaptation data has been stored on the cellular telephone device associated with the particular party. For example, FIG. 3, e.g., FIG. 3A, shows adaptation data comprising one or more words and corresponding pronunciations of the one or more words at least partly based on at least one previous training by the particular party in response to cellular telephone device prompting separate from detected speech data corresponding to an order placed by the particular party at an automated drive-thru terminal that accepts speech input, and has been stored on a particular party-associated particular device acquiring module 308 acquiring adaptation data comprising one or more words (e.g., "cheeseburger," "small," "medium," and "large") and corresponding pronunciations of the one or more words that is at least partly based on at least one previous training by the particular party repeating the pronunciations of the one or more words in response to prompting by a cellular telephone device with a screen (e.g., user interface 135) and a memory (e.g., memory 134), that is discrete from the detected speech data corresponding to an order for food placed by the particular party at an automated drive-thru terminal that accepts speech input, wherein at least a portion of the adaptation data has been stored on the cellular telephone device associated with the particular party.

Referring now to FIG. 8B, operation 808 (e.g., operations 804, 806, and 808 have been abbreviated for clarity, but are the same as in FIG. 8A) may include operation 810 depicting acquiring adaptation data comprising one or more words and corresponding pronunciations of the one or more words that is at least partly based on at least one previous training by the particular party repeating the pronunciations of the one or more words in response to prompting by a cellular telephone device with a screen and a memory, that is discrete from the detected speech data corresponding to an order for food placed by the particular party at an automated drive-thru terminal that accepts speech input, wherein at least a portion of the adaptation data has been stored on the cellular telephone device that is linked to the particular party through a contract with a telecommunications provider. For example, FIG. 3, e.g., FIG. 3A, shows adaptation data comprising one or more words and corresponding pronunciations of the one or more words at least partly based on at least one previous training by the particular party in response to cellular telephone device prompting separate from detected speech data corresponding to an order placed by the particular party at an automated drive-thru terminal that accepts speech input, and has been stored on a particular device linked to the particular party through a contract with a telecommunications provider acquiring module 310 comprising one or more words and corresponding pronunciations (e.g., "money," "yes," "no," and "please repeat that") of the one or more words that is at least partly based on at least one previous training by the particular party repeating the pronunciations of the one or more words in response to prompting by a cellular telephone device with a screen (e.g., user interface 135) and a memory (e.g., memory 134), Referring now to FIG. 8C, operation 604 may include operation 812 depicting acquiring adaptation data that is at least partly based on at least one speech interaction of the particular party that occurred that occurred at a different time and a different location than a speech interaction prior to a speech interaction that generated the detected speech data, wherein at least a portion of the adaptation data has been stored on the particular device associated with the particular party. For example, FIG. 3, e.g., FIG. 3B, shows adaptation data at least partly based on discrete speech interaction of particular party prior to speech interaction generating detected speech data, and has been stored on a particular party-associated particular device receiving module 312 acquiring adaptation data (e.g., a noise level dependent filtration algorithm) that is at least partly based on at least one speech interaction (e.g., giving speech commands to an automated teller machine device at a Jun. 20, 2011 baseball game in Washington, D.C.) of the particular party that occurred at a different time (e.g., Jun. 20, 2011) and a different location (e.g., Washington, D.C.) than a speech interaction prior to a speech interaction that generated the speech adaptation data (e.g., using an automated teller machine at a KISS concert in Philadelphia, Pa., on Nov. 4, 2011), wherein at least a portion of the adaptation data has been stored on a particular device associated with the particular party (e.g., the adaptation data, which usually resides in cloud storage, was transmitted to the user's cellular telephone device, then transmitted to the automated teller machine device).

Referring again to FIG. 8C, operation 604 may include operation 814 depicting acquiring at least a portion of adaptation data that is at least partly based on at least one speech interaction of the particular party that occurred prior to a speech interaction that generated the detected speech data, wherein at least a portion of the adaptation data has been stored on the particular device associated with the particular party. For example, FIG. 3, e.g., FIG. 3B, shows adaptation data at least partly based on discrete speech interaction of particular party occurring prior to speech interaction generating detected speech data, and has been stored on a particular party-associated particular device acquiring module 314 acquiring at least a portion of adaptation data (e.g., an emotion-based pronunciation adjustment algorithm) that is at least partly based on at least one speech interaction of the particular party (e.g., programming a speech-operated microwave oven) that occurred prior to a speech interaction that generated the detected speech data (e.g., programming a PVR to record the "30 Rock" television show), wherein at least a portion of the adaptation data has been stored on a particular device (e.g., in a hard drive on a home computer that is networked to other devices in the house) associated with the particular party (e.g., the home computer is configured to manage the adaptation data for the particular party and to transmit it to personal devices and/or to target devices).

Referring again to FIG. 8C, operation 814 may include operation 816 depicting receiving, from the particular device, adaptation data that is at least partly based on at least one speech interaction of the particular party that occurred prior to a speech interaction that generated the detected speech data, wherein at least a portion of the adaptation data has been stored on the particular device associated with the particular party. For example, FIG. 3, e.g., FIG. 3B, shows adaptation data at least partly based on discrete speech interaction of particular party occurring prior to speech interaction generating detected speech data, and has been stored on a particular party-associated particular device receiving from the particular device module 316 receiving (e.g., a cellular telephone device, e.g., an iPhone, carried by a user, receives), from the particular device (e.g., a programmable universal remote control) adaptation data (e.g., a syllable pronunciation database) that is at least partly based on at least one speech interaction of the particular party (e.g., using speech to enter in "ESPN" and "Comedy Central" as favorite networks into the cable box) that occurred prior to a speech interaction that generated the detected speech data (e.g., the user using speech to command a television to move to a particular channel, e.g., ESPN-2), wherein at least a portion of the adaptation data has been stored on a particular device associated with the particular party (e.g., at least a portion of the syllable pronunciation database) has been stored on the particular device associated with the particular party (e.g., the universal remote control, which has been programmed by the user, and that is configured to store at least a portion of adaptation data).

Referring again to FIG. 8C, operation 816 may include operation 818 depicting receiving, from a memory of the particular device, adaptation data that is at least partly based on at least one speech interaction of the particular party that occurred prior to a speech interaction that generated the detected speech data, wherein the adaptation data has been stored on the particular device associated with the particular party. For example, FIG. 3, e.g., FIG. 3B, shows adaptation data at least partly based on discrete speech interaction of particular party occurring prior to speech interaction generating detected speech data, and has been stored on a particular party-associated particular device receiving directly from the particular device memory module 318 receiving (e.g., a CPU of a tablet device, e.g., an Asus A500 internally receiving from a bus connected to the processor), from a memory of the particular device (e.g., which may be removable memory, e.g., an SD or Micro SD card) or fixed memory (e.g., internal device RAM), adaptation data (e.g., an accent-based pronunciation modification algorithm) that is at least partly based on at least one speech interaction of the particular party (e.g., the user, when driving his Honda Civic motor vehicle commanding that the windows be lowered) that occurred prior to a speech interaction that generated the detected speech data (e.g., after the user trades in a Honda Civic motor vehicle for an Acura TL motor vehicle, the user commands the Acura TL to lower the windows), wherein the adaptation data has been stored on a particular device (e.g., the tablet device, e.g., the Asus A500) associated with the particular party (e.g., is known by the vehicle as associated with a particular party).

Referring now to FIG. 8D, operation 814 may include operation 820 depicting receiving, from a communication network provider, adaptation data that is at least partly based on at least one speech interaction of the particular party that occurred prior to a speech interaction that generated the detected speech data, wherein at least a portion of the adaptation data has been stored on the particular device associated with the particular party. For example, FIG. 3, e.g., FIG. 3B, shows adaptation data at least partly based on discrete speech interaction of particular party occurring prior to speech interaction generating detected speech data, and has been stored on a particular party-associated particular device receiving from a communication network provider module 320 receiving (e.g., a cellular telephone device), from a communication provider (e.g., a provider for the cellular telephone device, e.g., AT&T), adaptation data (e.g., instructions for replacing a word frequency table with a modified word frequency table that reflects the particular party's word usage) that is at least partly based on at least one speech interaction of the particular party (e.g., a command given to the cellular phone device of "update calendar to add Mrs. Jones's birthday party on July 19th at 8 pm") that occurred prior to a speech interaction that generated the detected speech data (e.g., a command given to an automated ticket dispensing machine), wherein at least a portion of the adaptation data has been stored on a particular device (e.g., data storing the word frequency of the interactions with the cellular phone device (e.g., one usage each of the words "calendar," "July," "birthday," "party," "nineteenth" and "8 pm") is stored on the cellular telephone device before sending to the communication network provider for aggregation into the modified word frequency table and/or conversion into instructions for replacing the word frequency table with the modified word frequency table).

Referring again to FIG. 8D, operation 820 may include operation 822 depicting receiving, from a communication network provider, adaptation data that is at least partly based on at least one speech interaction of the particular party that occurred prior to a speech interaction that generated the detected speech data, wherein at least a portion of the adaptation data has been stored on the particular device associated with the particular party and previously transmitted to the communication network provider. For example, FIG. 3, e.g., FIG. 3B, shows adaptation data at least partly based on discrete speech interaction of particular party occurring prior to speech interaction generating detected speech data, and has been stored on a particular party-associated particular device and transmitted over the communication network receiving from a communication network provider module 322 receiving, from a communication network provider (e.g., AT&T), adaptation data (e.g., a phoneme pronunciation database) that is at least partly based on at least one speech interaction of the particular party (e.g., placing a food order at an automated walk-thru window (e.g., similar to a drive-thru window, except you walk or conveyor belt ride through)) that occurred prior to a speech interaction that generated the detected speech data (e.g., withdrawing money from a speech-enabled automated teller machine device), wherein at least a portion of the adaptation data (e.g., the phoneme pronunciation database) has been stored on the particular device associated with the particular party and previously transmitted to the communication network provider.

Referring again to FIG. 8D, operation 814 may include operation 824 depicting receiving adaptation data, from a device connected to a same network as a target device to which the detected speech data is directed, said adaptation data at least partly based on at least one speech interaction of the particular party that occurred prior to a speech interaction that generated the detected speech data, wherein at least a portion of the adaptation data has been stored on the particular device associated with the particular party. For example, FIG. 3, e.g., FIG. 3C, shows adaptation data at least partly based on discrete speech interaction of particular party occurring prior to speech interaction generating detected speech data, and has been stored on a particular party-associated particular device receiving from a device connected to a same network as a target device to which the detected speech data is directed module 324 receiving adaptation data (e.g., a stochastic state transition network), from a device connected to a same network (e.g., a tablet device connected to a home network via a router) as a target device (e.g., a safe in a home that responds to speech commands and is connected to the home network) to which the detected speech data is directed (e.g., it is determined, e.g., by the tablet, that the detected speech is intended for the tablet device), said adaptation data at least partly based on at least one speech interaction of the particular party (e.g., the user's previous interaction with other portions of the home security system, and the user's previous interactions with a speech- and network-enabled coffee maker) that occurred prior to a speech interaction that generated the detected speech data (e.g., the user programming the safe with the code phrase that will unlock one section of the safe), wherein at least a portion of the adaptation data has been stored on the particular device (e.g., the tablet device) associated with the particular party (e.g., owned by the user).

Referring again to FIG. 8D, operation 814 may include operation 826 depicting retrieving adaptation data in response to reception of the speech data, said adaptation data at least partly based on at least one speech interaction of the particular party that occurred prior to a speech interaction that generated the detected speech data, wherein at least a portion of the adaptation data has been stored on the particular device associated with the particular party. For example, FIG. 3, e.g., FIG. 3C, shows adaptation data at least partly based on discrete speech interaction of particular party occurring prior to speech interaction generating detected speech data, and has been stored on a particular party-associated particular device receiving in response to reception of speech data module 326 retrieving adaptation data (e.g., an office assistant device carried by employees (e.g., that might double as a security badge/access card for certain areas) receives adaptation data when it receives the speech data from the user) in response to reception of the speech data (e.g., in response to the user speaking a command to a piece of office equipment, e.g., a copier, a vending machine, or an automated security checkpoint), said adaptation data (e.g., a speech disfluency detection algorithm) at least partly based on at least one speech interaction of the particular party (e.g., training of the particular party's speech that happened at the beginning of her employment, e.g., at new employee orientation) that occurred prior to a speech interaction that generated the detected speech data (e.g., speaking a particular code phrase to an additional security lock to access a limited-access portion of a company, e.g., a document retention room where confidential, protected, or limited access, e.g., medical, records are kept), wherein at least a portion of the adaptation data (e.g., a speech disfluency detection algorithm) has been stored on the particular device (e.g., the office assistant device) associated with the particular party.

Referring now to FIG. 8E, operation 604 may include operation 828 depicting acquiring adaptation data in response to a detection of a particular condition, said adaptation data at least partly based on at least one speech interaction of the particular party that occurred prior to a speech interaction that generated the detected speech data, wherein at least a portion of the adaptation data has been stored on the particular device associated with the particular party. For example, FIG. 3, e.g., FIG. 3C, shows adaptation data at least partly based on discrete speech interaction of particular party occurring prior to speech interaction generating detected speech data, and has been stored on a particular party-associated particular device receiving in response to condition module 320 acquiring adaptation data (e.g., retrieving, from a cloud storage service, a context-based repaired utterance processing matrix) in response to a detection of a particular condition (e.g., in response to detecting a broadcasting signal being sent from a target device indicating that the target device (e.g., an automated fast food drive-thru window) is configured to receive adaptation data and use the adaptation data in speech processing), said adaptation data at least partly based on at least one speech interaction of the particular party that occurred prior to a speech interaction that generated the detected speech data (e.g., the particular party ordering a #6 combo meal at a popular fast food restaurant), wherein at least a portion of the particular data has been stored on the particular device associated with the particular party (e.g., at times when the particular party requests the adaptation data from the cloud storage service, it is temporarily stored on the particular device before being passed along to the target device).

Referring again to FIG. 8E, operation 828 may include operation 830 depicting acquiring adaptation data in response to the particular party interacting with a target device to which the speech data is directed, said adaptation data at least partly based on at least one speech interaction of the particular party that occurred prior to a speech interaction that generated the detected speech data, wherein at least a portion of the adaptation data has been stored on the particular device associated with the particular party. For example, FIG. 3, e.g., FIG. 3C, shows adaptation data at least partly based on discrete speech interaction of particular party occurring prior to speech interaction generating detected speech data, and has been stored on a particular party-associated particular device receiving in response to the particular party interacting with a target device module 330 acquiring adaptation data (e.g., a non-lexical vocable removal algorithm) in response to the particular party interacting (e.g., pushing a button on) with a target device (e.g., a speech-enabled automated teller machine device) to which the speech data is directed (e.g., the user is speaking to the speech-enabled automated teller machine device), said adaptation data at least partly based on at least one speech interaction of the particular party (e.g., one or more previous interactions with other automated teller machine devices) that occurred prior to a speech interaction that generated the detected speech data (e.g., the user commanding the automated teller machine device to dispense two hundred dollars in cash from the user's savings account), wherein at least a portion of the adaptation data has been stored on the particular device (e.g., transmit, store, and receive-enabled eyeglasses) associated with the particular party (e.g., being worn by the user).

Referring again to FIG. 8E, operation 830 may include operation 832 depicting acquiring adaptation data in response to the particular party inserting a key into a motor vehicle to which the speech data is directed, said adaptation data at least partly based on at least one speech interaction of the particular party that occurred prior to a speech interaction that generated the detected speech data, wherein at least a portion of the adaptation data has been stored on the particular device associated with the particular party. For example, FIG. 3, e.g., FIG. 3C, shows adaptation data at least partly based on discrete speech interaction of particular party occurring prior to speech interaction generating detected speech data, and has been stored on a particular party-associated particular device receiving in response to the particular party inserting a key into a motor vehicle interacting with a target device module 332 acquiring adaptation data (e.g., a set of proper noun pronunciations, e.g., names of hamburger joints) in response to the particular party inserting a key into a motor vehicle to which the speech data is directed (e.g., the speech data is a command "give me directions to Beastly Burger hamburger joint"), wherein at least a portion of the adaptation data has been stored on the particular device (e.g., the particular device could be the key itself, if the key is configured to store, transmit, and receive data, or the particular device could be the user's smartphone, e.g., the particular device does not necessarily need to be the device (e.g., the key) that triggers the acquisition of adaptation data).

Referring again to FIG. 8E, operation 830 may include operation 834 depicting acquiring adaptation data in response to the particular party executing a program on a computing device to which the speech data is directed, said adaptation data at least partly based on at least one speech interaction of the particular party that occurred prior to a speech interaction that generated the detected speech data, wherein at least a portion of the adaptation data has been stored on the particular device associated with the particular party. For example, FIG. 3, e.g., FIG. 3D, shows adaptation data at least partly based on discrete speech interaction of particular party occurring prior to speech interaction generating detected speech data, and has been stored on a particular party-associated particular device receiving in response to the particular party executing a program on a computing device module 334 acquiring adaptation data (e.g., a part-of-speech labeling algorithm) in response to the particular party executing a program on a computing device (e.g., a word processing program) to which speech data is directed (e.g., that is configured to receive dictation of documents), said adaptation data at least partly based on at least one speech interaction of the particular party (e.g., previous dictations of documents into a different word processing program on a different computer) that occurred prior to a speech interaction that generated the detected speech data (e.g., the speech data that will be generated by the user's dictation), wherein at least a portion of the adaptation data has been stored on the particular device (e.g., a USB key that is owned by the user and that stores her adaptation data along with other information) associated with the particular party (e.g., owned by the user).

Referring now to FIG. 8F, operation 828 may include operation 836 depicting acquiring adaptation data in response to a detection of the particular party at a particular location, said adaptation data at least partly based on at least one speech interaction of the particular party that occurred prior to a speech interaction that generated the detected speech data, wherein at least a portion of the adaptation data has been stored on the particular device associated with the particular party. For example, FIG. 3, e.g., FIG. 3D shows adaptation data at least partly based on discrete speech interaction of particular party occurring prior to speech interaction generating detected speech data, and has been stored on a particular party-associated particular device receiving in response to detection of the particular party at a particular location module 336 acquiring adaptation data in response to a detection of the particular party at a particular location (e.g., within two feet of a target device, e.g., an automated airline ticket dispensing counter), said adaptation data at least partly based on at least one speech interaction of the particular party that occurred prior to a speech interaction that generated the detected speech data (e.g., speaking the name of the destination of the user's airline ticket), wherein at least a portion of the adaptation data (e.g., a French language substitution algorithm) has been stored on the particular device (e.g., a smartphone with GPS sensors) associated with the particular party (e.g., carried by the user).

Referring again to FIG. 8F, operation 828 may include operation 838 depicting acquiring adaptation data in response to a detection of the particular party within a particular proximity of a target device, said adaptation data at least partly based on at least one speech interaction of the particular party that occurred prior to a speech interaction that generated the detected speech data, wherein at least a portion of the adaptation data has been stored on the particular device associated with the particular party. For example, FIG. 3, e.g., FIG. 3D, shows adaptation data at least partly based on discrete speech interaction of particular party occurring prior to speech interaction generating detected speech data, and has been stored on a particular party-associated particular device receiving in response to detection of the particular party within a particular proximity of a target device module 338 acquiring adaptation data (e.g., an utterance ignoring algorithm) in response to a detection of the particular party (e.g., the user) within a particular proximity of a target device (e.g., the particular device acquires the adaptation data from a cloud storage service when it receives a signal from the target device that the target device (e.g., an automated drink dispensing device) detected the particular party was within screen-viewing distance of the automated drive-thru window), said adaptation data at least partly based on at least one speech interaction of the particular party (e.g., the particular party dictating a memorandum to speech-enabled word processing software that is stored on a cloud) that occurred prior to a speech interaction that generated the detected speech data (e.g., ordering a cherry-and-chocolate twisted lime soda drink), wherein at least a portion of the adaptation data has been stored on the particular device (e.g., a "smart wallet" that, in addition to holding cash and credit cards, also can store, transmit, and receive adaptation data, and that acquires the adaptation data when it learns that a particular party is within proximity to a particular type of target device) associated with the particular party (e.g., carried by the particular party and configured to store, at least temporarily, the particular party's adaptation data).

Referring now to FIG. 8G, operation 604 may include operation 840 depicting acquiring adaptation data from a further device, said adaptation data at least partly based on at least one speech interaction of the particular party that is discrete from the detected speech data, wherein at least a portion of the adaptation data has been stored on the particular device associated with the particular party. For example, FIG. 3, e.g., FIG. 3E, shows adaptation data at least partly based on discrete speech interaction of particular party separate from detected speech data, and has been stored on a particular party-associated particular device acquiring from a further device module 340 acquiring adaptation data, from a further device (e.g., from a cellular telephone device), said adaptation data at least partly based on at least one speech interaction of the particular party (e.g., previous commands given to a navigation device requesting directions) that is discrete from the detected speech data (e.g., requesting directions to Big Boy Pizza), wherein at least a portion of the adaptation data has been stored on the particular device (e.g., a smart key inserted into a vehicle that can store, transmit, and receive adaptation data) associated with the particular party (e.g., the driver of a car that has both onboard navigation and a personal GPS navigation system removably mounted to the windshield).

Referring again to FIG. 8G, operation 840 may include operation 842 depicting acquiring adaptation data from a further device, said adaptation data originating at the further device and at least partly based on least one speech interaction of the particular party that is discrete from the detected speech data, wherein at least a portion of the adaptation data has been stored on the particular device associated with the particular party. For example, FIG. 3, e.g., FIG. 3E, shows adaptation data originating at further device and at least partly based on discrete speech interaction of particular party separate from detected speech data, and has been stored on a particular party-associated particular device acquiring from a further device module 342 acquiring adaptation data from a further device (e.g., an office personal device, which may be owned by the company that the user works for, and stores at least a portion, or a version of the adaptation data), said adaptation data originating at the further device (e.g., the adaptation data is stored on the further device once and then transmitted from there; e.g., the further device does not receive the adaptation data from another source on demand) and at least partly based on at least one speech interaction of the particular party that is discrete from the detected speech data (e.g., operating a piece of machinery used in that field that responds to speech commands), wherein at least a portion of the adaptation data has been stored on the particular device associated with the particular party (e.g., the adaptation data is transferred from a further device to a particular device (e.g., the user's cellular telephone, which may perform additional modifications, or may transmit it as is to the target device, e.g., the piece of machinery).

Referring again to FIG. 8G, operation 840 may include operation 844 depicting acquiring adaptation data from a further device related to the particular device, said adaptation data originating at the further device and at least partly based on least one speech interaction of the particular party that is discrete from the detected speech data, wherein at least a portion of the adaptation data has been stored on the particular device associated with the particular party. For example, FIG. 3, e.g., FIG. 3E, shows adaptation data at least partly based on discrete speech interaction of particular party separate from detected speech data, and has been stored on a particular party-associated particular device acquiring from a further device related to the particular device module 844 acquiring adaptation data from a further device (e.g., a desktop computer that stores adaptation data for a user, e.g., or for the user's entire family) related to (e.g., both the particular device and the further device have a login saved for the user) the particular device (e.g., a cellular telephone device), said adaptation data originating at the further device (e.g., the adaptation data is stored at the further device and transmitted to the particular device over a network, e.g., a Wi-Fi network) and at least partly based on at least one speech interaction of the particular party that is discrete from the detected speech data (e.g., speech-programming a convection oven, wherein the convection oven isn't connected by Wi-Fi but does have a Bluetooth connection and the cellular telephone device, as the particular device, acquires the adaptation data from the desktop computer via Wi-Fi, and relays the adaptation data to the convection oven via Bluetooth), wherein at least a portion of the adaptation data has been stored on the particular device (e.g., the adaptation data is stored on the cellular telephone device, at least temporarily, as it is received over Wi-Fi and transmitted over Bluetooth) associated with the particular party.

Referring again to FIG. 8G, operation 844 may include operation 846 depicting acquiring adaptation data from a further device associated with the particular party, said adaptation data originating at the further device and at least partly based on least one speech interaction of the particular party that is discrete from the detected speech data, wherein at least a portion of the adaptation data has been stored on the particular device associated with the particular party. For example, FIG. 3, e.g., FIG. 3E, shows adaptation data at least partly based on discrete speech interaction of particular party separate from detected speech data, and has been stored on a particular party-associated particular device acquiring from a further device associated with the particular party module 846 acquiring adaptation data from a further device associated with the particular party (e.g., a customized gaming controller that the user, e.g., the player, brings to use in various guest video game systems as well as her own), said adaptation data originating at the further device (e.g., the adaptation data is stored on the further device and derived from interactions of the player with the game system using speech) and at least partly based on at least one speech interaction of the particular party (e.g., giving voice commands in a first-person shooter game) that is discrete from the detected speech data (e.g., giving voice commands in an online soccer game), wherein at least a portion of the adaptation data has been stored on the particular device (e.g., a headset used by the player that pulls adaptation data from the particular party, and either passes the adaptation data to the target device, modifies the adaptation data, or performs some amount of processing on the speech data received through the microphone of the headset) associated with the particular party.

Referring again to FIG. 8G, operation 844 may include operation 848 depicting acquiring adaptation data from a further device in communication with the particular device, said adaptation data originating at the further device and at least partly based on least one speech interaction of the particular party that is discrete from the detected speech data, wherein at least a portion of the adaptation data has been stored on the particular device associated with the particular party. For example, FIG. 3, e.g., FIG. 3E, shows adaptation data at least partly based on discrete speech interaction of particular party separate from detected speech data, and has been stored on a particular party-associated particular device acquiring from a further device in communication with the particular device module 348 acquiring adaptation data from a further device (e.g., a tablet device, e.g., an iPad) in communication with (e.g., operating on a same network, whether through 3G or Wi-Fi communication) the particular device (e.g., a cellular device, e.g., an iPhone), said adaptation data originating at the further device (e.g., the adaptation data is stored and maintained on the iPad) and at least partly based on at least one speech interaction of the particular party (e.g., conversations that occurred more than two days ago) that is discrete from the detected speech data (e.g., speech from the user buying a train ticket from an automated train ticket dispensing device), wherein at least a portion of the adaptation data has been stored on the particular device (e.g., the iPhone receives the adaptation data from the iPad, and determines if any speech interactions have occurred in the last two days that would result in changing the adaptation data, and, if so, modifies the adaptation data, before sending the adaptation data to the target device, e.g., the automated train ticket dispensing device) associated with the particular party (e.g., the user).

Referring now to FIG. 8H, operation 844 may include operation 850 depicting acquiring adaptation data from a further device that is at least partially controlled by the particular device, said adaptation data originating at the further device and at least partly based on least one speech interaction of the particular party that is discrete from the detected speech data, wherein at least a portion of the adaptation data has been stored on the particular device associated with the particular party. For example, FIG. 3, e.g., FIG. 3E, shows adaptation data at least partly based on discrete speech interaction of particular party separate from detected speech data, and has been stored on a particular party-associated particular device acquiring from a further device at least partially controlled by the particular device module 350 acquiring adaptation data from a further device (e.g., a laptop computer plugged into a network) that is at least partially controlled (e.g., has been set up so that portable devices can access its files and execute limited commands on it) by the particular device (e.g., a tablet device, e.g., an Apple iPad), said adaptation data originating at the further device and at least partly based on at least one speech interaction of the particular party (e.g., the user programming a convection oven) that is discrete from the detected speech data (e.g., the user programming a microwave oven), wherein at least a portion of the adaptation data (e.g., an utterance ignoring algorithm) has been stored on the particular device (e.g., the Apple iPad) associated with the particular party (e.g., carried by the particular party).

Referring again to FIG. 8H, operation 840 may include operation 852 depicting acquiring adaptation data from a further device, said adaptation data received by the further device from the particular device, and said adaptation data at least partly based on least one speech interaction of the particular party that is discrete from the detected speech data, wherein at least a portion of the adaptation data has been stored on the particular device associated with the particular party. For example, FIG. 3, e.g., FIG. 3E, shows adaptation data at least partly based on discrete speech interaction of particular party separate from detected speech data, and has been stored on a particular party-associated particular device acquiring from a further device that received the adaptation data from the particular device module 352 acquiring adaptation data (e.g., an uncommon word pronunciation guide), said adaptation data received by the further device (e.g., a portable personal navigation system device) from the particular device (e.g., a user's cellular telephone), and said adaptation data at least partly based on at least one speech interaction of the particular party (e.g., the user giving commands into his cellular telephone to add contact information) that is discrete from the detected speech data (e.g., a request to lower the windows of the motor vehicle), wherein at least a portion of the adaptation data (e.g., at least one word of the uncommon word pronunciation guide) has been stored on the particular device associated with the particular party (e.g., the user).

Referring now to FIG. 8I, operation 840 may include operation 854 depicting acquiring adaptation data, from a further device, said adaptation data comprising instructions for modifying a pronunciation dictionary, and said adaptation data at least partly based on at least one speech interaction of the particular party that is discrete from the detected speech data, wherein at least a portion of the adaptation data has been stored on the particular device associated with the particular party. For example, FIG. 3, e.g., FIG. 3F shows adaptation data comprising instructions for modifying a pronunciation dictionary, said adaptation data at least partly based on discrete speech interaction of particular party separate from detected speech data, and has been stored on a particular party-associated particular device acquiring from a further device module 354 acquiring adaptation data, from a further device (e.g., a personal navigation system device), said adaptation data comprising instructions for modifying a pronunciation dictionary, and said adaptation data at least partly based on at least one speech interaction of the particular party (e.g., requesting directions to the nearest emergency room) that is discrete from the detected speech data (e.g., requesting instructions to the nearest pizza parlor), wherein at least a portion of the adaptation data has been stored on the particular device (e.g., a cellular telephone with GPS positioning enabled) associated with the particular party.

Referring again to FIG. 8I, operation 854 may include operation 856 depicting acquiring adaptation data, from a further device, said adaptation data comprising a first instruction for modifying the pronunciation dictionary based on a first speech interaction of the particular party and a second instruction for modifying the pronunciation dictionary based on a second speech interaction of the particular party, and said adaptation data is at least partly based on at least one speech interaction of the particular party that is discrete from the detected speech data, wherein at least a portion of the adaptation data has been stored on the particular device associated with the particular party. For example, FIG. 3, e.g., FIG. 3F, shows adaptation data comprising a first instruction for modifying a pronunciation dictionary based on a first particular party interaction and a second instruction for modifying a pronunciation dictionary based on a second particular party interaction, and has been stored on a particular party-associated particular device acquiring from a further device module 356 acquiring adaptation data, from a further device (e.g., a tablet device, e.g., a Samsung Galaxy Tab), said adaptation data comprising a first instruction for modifying the pronunciation dictionary (e.g., "modify a pronunciation of the word 'twenty'") based on a first speech interaction of the particular party (e.g., the user withdrawing two hundred dollars and requesting twenty dollar bills from an automated teller machine device that accepts speech input) and a second instruction for modifying the pronunciation dictionary (e.g., "modify a pronunciation of the word 'hamburger'") based on a second speech interaction of the particular party (e.g., the user placing a lunch order for a hamburger and french fries with an automated drive thru window), and said adaptation data is at least partly based on at least one speech interaction of the particular party (e.g., the user withdrawing two hundred dollars and requesting twenty dollar bills from an automated teller machine device that accepts speech input and/or the user placing a lunch order for a hamburger and French fries) that is discrete from the detected speech data (e.g., giving a speech command to an automated ticket taking device), wherein at least a portion of the adaptation data has been stored on the particular device (e.g., a cellular telephone device that originally transmitted the adaptation data to the tablet) associated with the particular party (e.g., owned by the user).

Referring again to FIG. 8I, operation 856 may include operation 858 depicting acquiring adaptation data, from a further device, said adaptation data comprising a first instruction for modifying the pronunciation dictionary based on a first speech interaction of the particular party and a second instruction for modifying the pronunciation dictionary based on a second speech interaction of the particular party, and said adaptation data is at least partly based on at least one speech interaction of the particular party that is discrete from the detected speech data, wherein the first instruction for modifying the pronunciation data has been stored on the particular device associated with the particular party. For example, FIG. 3, e.g., FIG. 3F, shows adaptation data comprising a first instruction for modifying a pronunciation dictionary based on a first particular party interaction and a second instruction for modifying a pronunciation dictionary based on a second particular party interaction, said first instruction has been stored on a particular party-associated particular device acquiring from a further device module 358 acquiring adaptation data, from a further device (e.g., a tablet device, e.g., a Samsung Galaxy Tab), said adaptation data comprising a first instruction for modifying the pronunciation dictionary (e.g., "modify a pronunciation of the word 'twenty'") based on a first speech interaction of the particular party (e.g., the user withdrawing two hundred dollars and requesting twenty dollar bills from an automated teller machine device that accepts speech input) and a second instruction for modifying the pronunciation dictionary (e.g., "modify a pronunciation of the word 'hamburger'") based on a second speech interaction of the particular party (e.g., the user placing a lunch order for a hamburger and french fries with an automated drive thru window), and said adaptation data is at least partly based on at least one speech interaction of the particular party (e.g., the user withdrawing two hundred dollars and requesting twenty dollar bills from an automated teller machine device that accepts speech input and/or the user placing a lunch order for a hamburger and French fries) that is discrete from the detected speech data (e.g., giving a speech command to an automated ticket taking device), wherein the first instruction for modifying the pronunciation data has been stored on the particular device (e.g., a cellular telephone device that originally transmitted at least that portion of the adaptation data to the tablet) associated with the particular party (e.g., associated to the user with a service contract through a communication network provider).

Referring now to FIG. 8J, operation 604 may include operation 860 depicting generating adaptation data that is at least partly based on at least one speech interaction of the particular party that is discrete from the detected speech data, wherein at least a portion of the adaptation data has been stored on the particular device associated with the particular party. For example, FIG. 3, e.g., FIG. 3G, shows adaptation data at least partly based on discrete speech interaction of particular party separate from detected speech data, and has been stored on a particular party-associated particular device generating module 360 generating (e.g., creating, modifying, adapting, calculating, developing, evolving, or constructing) adaptation data (e.g., a latent dialogue act matrix)

Referring again to FIG. 8J, operation 604 may include operation 862 depicting retrieving adaptation data that is at least partly based on at least one speech interaction of the particular party that is discrete from the detected speech data, wherein at least a portion of the adaptation data has been stored on the particular device associated with the particular party. For example, FIG. 3, e.g., FIG. 3G, shows adaptation data at least partly based on discrete speech interaction of particular party separate from detected speech data, and has been stored on a particular party-associated particular device retrieving module 362 retrieving (e.g., requesting and receiving, obtaining, gathering, getting, fetching, and/or procuring) adaptation data (e.g., speech disfluency detection algorithm) that is at least partly based on at least one speech interaction (e.g., dictating a memorandum using Dragon speech software with a headset) of the particular party that is discrete from the detected speech data (e.g., ordering an ice cream cone with chocolate sprinkles from an automated ice cream dispenser), wherein at least a portion of the adaptation data has been stored on the particular device (e.g., a modified USB key that stores adaptation data, that was plugged into the computer when the memorandum was dictated, thereby retrieving the data) and, at the time of the speech interaction with the automated ice cream dispenser, is communicating with the automated ice cream dispenser, either by being directly plugged into the automated ice cream dispenser, or by being plugged into a tablet device carried by the user, where the tablet device retrieves the adaptation data and transmits it to the automated ice cream dispenser).

Referring again to FIG. 8J, operation 604 may include operation 864 depicting acquiring adaptation data that is at least partly based on at least one speech interaction of the particular party with a particular type of device, said at least one speech interaction discrete from the detected speech data, wherein at least a portion of the adaptation data has been stored on the particular device associated with the particular party. For example, FIG. 3, e.g., FIG. 3G, shows adaptation data at least partly based on discrete speech interaction of particular party with particular type of device separate from detected speech data, and has been stored on a particular party-associated particular device acquiring module 364 acquiring (e.g., retrieving from memory) adaptation data (e.g., a word and/or syllable dependency parser) that is at least partly based on at least one speech interaction of the particular party with a particular type of device (e.g., a Sony-branded home entertainment product, e.g., a television, Blu-Ray player, home theater system, etc.), said at least one speech interaction discrete from the detected speech data (e.g., an interaction with a brand new Sony-manufactured television), wherein at least a portion of the adaptation data (e.g., the word and/or syllable dependency parser) has been stored on the particular device (e.g., a cellular telephone device with an app designed by Sony configured to filter adaptation data) associated with the particular party (e.g., owned by the particular party).

Referring again to FIG. 8J, operation 864 may include operation 866 depicting acquiring adaptation data that is at least partly based on at least one speech interaction of the particular party with the particular type of device that is a same type of device as a target device configured to receive the speech data, said at least one speech interaction discrete from the detected speech data, wherein at least a portion of the adaptation data has been stored on the particular device associated with the particular party. For example, FIG. 3, e.g., FIG. 3G, shows adaptation data at least partly based on discrete speech interaction of particular party with device of same type as target device configured to receive speech data, said discrete interaction separate from detected speech data, and has been stored on a particular party-associated particular device acquiring module 366 acquiring adaptation data (e.g., a syllable pronunciation database) that is at least partly based on at least one speech interaction of the particular party (e.g., ordering a particular type and flavor of soda from an automated drink dispensing machine, e.g., "cherry diet Coke with a twist of vanilla") with the particular type of device (e.g., automated food dispensing machines) that is a same type of device as a target device (e.g., an automated ice cream dispenser) configured to receive the speech data (e.g., the particular party ordering a "double scoop of vanilla with nuts, chocolate sprinkles, and chocolate syrup"), said at least one speech interaction discrete from the detected speech data, wherein at least a portion of the adaptation data (e.g., the syllable pronunciation database) has been stored on the particular device (e.g., a "food preference smartcard" that can store, receive, and transmit data, and that a child can carry with him or her, and that also may be configured to prevent the child from ordering food that he or she is allergic to) associated with the particular party (e.g., carried by the user, e.g., the particular party).

Referring again to FIG. 8J, operation 864 may include operation 868 depicting acquiring adaptation data that is at least partly based on at least one speech interaction of the particular party with a device that has at least one characteristic in common with a target device that is configured to receive the speech data, said at least one speech interaction is discrete from the detected speech data, wherein at least a portion of the adaptation data has been stored on the particular device associated with the particular party. For example, FIG. 3, e.g., FIG. 3G, shows adaptation data at least partly based on discrete speech interaction of particular party with device having particular characteristic separate from detected speech data, and has been stored on a particular party-associated particular device acquiring module 368 acquiring adaptation data (e.g., a syllable pronunciation database) that is at least partly based on at least one speech interaction of the particular party (e.g., inputting a playlist via speech) with a device (e.g., a media player) that has at least one characteristic in common (e.g., an ability to play music files) with a target device that is configured to receive the speech data (e.g., a speech-enabled clock radio that plays music files), said at least one speech interaction is discrete from the detected speech data, wherein at least a portion of the adaptation data (e.g., the syllable pronunciation database) has been stored on the particular device (e.g., the user's cellular telephone device) associated with the particular party.

Referring now to FIG. 8K, operation 868 depicting operation 870 depicting acquiring adaptation data that is at least partly based on at least one speech interaction of the particular party with a device that communicates on a same type of communication network as the target device that is configured to receive the speech data, said at least one speech interaction is discrete from the detected speech data, wherein at least a portion of the adaptation data has been stored on the particular device associated with the particular party. For example, FIG. 3, e.g., FIG. 3G, shows adaptation data at least partly based on discrete speech interaction of particular party with device communicating on a same communication network as target device and separate from detected speech data, and has been stored on a particular party-associated particular device acquiring module 370 acquiring adaptation data (e.g., a context-based repaired utterance processing matrix) that is at least partly based on at least one speech interaction of the particular party (e.g., a speech interaction with the user commanding an office photocopier) with a device (e.g., the office photocopier) that communicates on a same type of communication network (e.g., local area network, as opposed to 4G LTE, or Bluetooth) as the target device that is configured to receive the speech data (e.g., an office computer), said at least one speech interaction is discrete from the detected speech data (e.g., dictating a memorandum to the office computer), wherein at least a portion of the adaptation data has been stored on the particular device (e.g., an office-issued device that can transmit, store, and receive adaptation data, e.g., an advanced keycard) associated with the particular party.

Referring again to FIG. 8K, operation 868 may include operation 872 depicting acquiring adaptation data that is at least partly based on at least one speech interaction of the particular party with a device that is configured to carry out a similar function as the target device that is configured to receive the speech data, said at least one speech interaction is discrete from the detected speech data, wherein at least a portion of the adaptation data has been stored on the particular device associated with the particular party. For example, FIG. 3, e.g., FIG. 3G, shows adaptation data at least partly based on discrete speech interaction of particular party with device configured to carry out a same function as the target device and separate from detected speech data, and has been stored on a particular party-associated particular device acquiring module 372 acquiring adaptation data (e.g., a regional dialect application algorithm) that is at least partly based on at least one speech interaction of the particular party with a device (e.g., a portable navigation system) that is configured to carry out a similar function as the target device (e.g., an onboard navigation system in a motor vehicle) that is configured to receive the speech data (e.g., requesting directions on how to get home from the present location), said at least one speech interaction is discrete from the detected speech data (e.g., because the interactions are with two similar, but different devices), wherein at least a portion of the adaptation data has been stored on the particular device (e.g., a cellular telephone device).

Referring now to FIG. 8L, operation 868 may include operation 874 depicting acquiring adaptation data that is at least partly based on at least one speech interaction of the particular party with a type of device that accepts a same type of input as the target device that is configured to receive the speech data, said at least one speech interaction is discrete from the detected speech data, wherein at least a portion of the adaptation data has been stored on the particular device associated with the particular party. For example, FIG. 3, e.g., FIG. 3H, shows adaptation data at least partly based on discrete speech interaction of particular party with device configured to accept a same type of input as the target device and separate from detected speech data, and has been stored on a particular party-associated particular device acquiring module 374 acquiring adaptation data that is at least partly based on at least one speech interaction of the particular party (e.g., ordering food at an automated drive-thru window) with a type of device (e.g., an automated ordering window) that accepts a same type of input (e.g., food orders) as the target device (e.g., an automated terminal inside a restaurant that gives out more detail about a menu option in response to a speech prompt) that is configured to receive the speech data (e.g., a request to know more about the Kobe beef entrée), said at least one speech interaction is discrete from the detected speech data, wherein at least a portion of the adaptation data has been stored on the particular device (e.g., a user's tablet device) associated with the particular party (e.g., owned by the user).

Referring now to FIG. 8M, operation 604 may include operation 876 depicting acquiring adaptation data that is at least partly based on at least one speech interaction of the particular party with the particular device, said at least one speech interaction is discrete from the detected speech data, wherein at least a portion of the adaptation data has been stored on the particular device associated with the particular party. For example, FIG. 3, e.g., FIG. 3H, shows adaptation data at least partly based on discrete speech interaction of particular party with particular device separate from detected speech data, and has been stored on a particular party-associated particular device acquiring module 376 acquiring adaptation data (e.g., a list of the way that the particular party pronounces ten words) that is at least partly based on at least one speech interaction of the particular party (e.g., the user giving commands to play a particular game to a headset that also can transmit and receive adaptation data to and from a video game system) with the particular device (e.g., the headset), said at least one speech interaction is discrete from the detected speech data (e.g., giving an automated command to the video game system in a first person shooter, e.g., "arm the machine gun"), wherein at least a portion of the adaptation data has been stored on the particular device (e.g., the headset) associated with the particular party (e.g., has been set up for use with the user).

Referring again to FIG. 8M, operation 876 may include operation 878 depicting acquiring adaptation data that is at least partly based on at least one speech interaction of the particular party with a cellular telephone device, said at least one speech interaction is discrete from the detected speech data, wherein at least a portion of the adaptation data has been stored on the cellular telephone device associated with the particular party. For example, FIG. 3, e.g., FIG. 3H, shows adaptation data at least partly based on discrete speech interaction of particular party with cellular telephone device separate from detected speech data, and has been stored on a particular party-associated cellular telephone device acquiring module 378 acquiring adaptation data (e.g., instructions for replacing a word frequency table with a modified word frequency table that reflects the particular party's word usage) that is at least partly based on at least one speech interaction of the particular party (e.g., the user) with a cellular telephone device (e.g., playing a word-fill-in based game using speech, which game is designed to also generate training data), said at least one speech interaction is discrete from the detected speech data (e.g., interacting with an automated drive-thru window), wherein at least a portion of the adaptation data has been stored on the cellular telephone device associated with the particular party.

Referring again to FIG. 8M, operation 878 may include operation 880 depicting acquiring adaptation data that is at least partly based on at least one telephone conversation carried out using the cellular telephone device, said at least one telephone conversation is different than speech that is part of the detected speech data, wherein at least a portion of the adaptation data has been stored on the cellular telephone device associated with the particular party. For example, FIG. 3, e.g., FIG. 3H, shows adaptation data at least partly based on particular party telephone conversation carried out using cellular telephone device separate from detected speech data, and has been stored on a particular party-associated cellular telephone acquiring module 380 acquiring adaptation data (e.g., a phrase completion algorithm) that is at least partly based on at least one telephone conversation carried out using the cellular telephone device, said at least one telephone conversation is different than speech that is part of the detected speech data (e.g., dictating a memorandum to a speech-enabled computer that also is configured to communicate with the cellular telephone device), wherein at least a portion of the adaptation data has been stored on the cellular telephone device associated with the particular party (e.g., the particular party has a service contract with a communication network provider that sold the cellular telephone device to the user at a discount based on the service contract).

Referring again to FIG. 8M, operation 880 may include operation 882 depicting acquiring adaptation data that is at least partly based on at least one speech instruction given to the cellular telephone device by the particular party, said at least one speech instruction different from the detected speech data, wherein at least a portion of the adaptation data has been stored on the particular device associated with the particular party. For example, FIG. 3, e.g., FIG. 3H, shows adaptation data at least partly based on particular party speech command given to cellular telephone device separate from detected speech data, and has been stored on a particular party-associated cellular telephone acquiring module 382 acquiring adaptation data (e.g., a basic pronunciation adjustment algorithm) that is at least partly based on at least one speech instruction given to the cellular telephone device by the particular party (e.g., dictating a text message to be sent to Jenny and Rob), said at least one speech instruction different from the detected speech data, wherein at least a portion of the adaptation data has been stored on the particular device associated with the particular party.

Referring now to FIG. 8N, operation 604 may include operation 884 depicting acquiring adaptation data that is at least partly based on at least one speech interaction of the particular party that used one or more same utterances as speech used in the detected speech data, said one or more same utterances spoken to a different device than a target device to which the detected speech data is directed. For example, FIG. 3, e.g., FIG. 3I shows adaptation data at least partly based on discrete speech interaction of particular party separate from detected speech data and using same utterance as speech that is part of speech data, and has been stored on a particular party-associated particular device acquiring module 384 acquiring adaptation data (e.g., an emotion-based pronunciation adjustment algorithm) that is at least partly based on at least one speech interaction of the particular party (e.g., using voice commands to operate a motor vehicle control system) that used one or more same utterances (e.g., spoke one or more of the same words, e.g., "music," "play," "MP3," and "CD Number Four") spoken to a different device (e.g., the motor vehicle control system) than a target device to which the detected speech data is directed (e.g., a home media player).

Referring again to FIG. 8N, operation 604 may include operation 886 depicting acquiring adaptation data that is at least partly based on at least one speech interaction of the particular party that used one or more same utterances, said one or more same utterances spoken at a different time than speech used in the detected speech data. For example, FIG. 3, e.g., FIG. 3I, shows adaptation data at least partly based on discrete speech interaction of particular party and using same utterance as speech that is part of speech data at a different time than speech that is part of the speech data acquiring module 386 acquiring adaptation data (e.g., a sentence diagramming path selection algorithm) that is at least partly based on at least one speech interaction of the particular party (e.g., a player of a speech-controlled video game system playing a soccer game) that used one or more same utterances (e.g., "kick," "run," jump," "control player two"), said one or more same utterances spoken at a different time (e.g., while playing a different game) than speech used in the detected speech data (e.g., the player playing a new soccer game at a different time).

Referring again to FIG. 8N, operation 604 may include operation 888 depicting acquiring a phoneme database based on one or more pronunciations by the particular party that are discrete from the detected speech data, wherein at least one entry of the phoneme database has been stored on a particular device associated with the particular party. For example, FIG. 3, e.g., FIG. 3I, shows adaptation data comprising a phoneme dictionary based on one or more particular party pronunciations, such that at least one entry has been stored on a particular party-associated particular device acquiring module 388 acquiring a phoneme database based on one or more pronunciations by the particular party (e.g., pronunciations given while a driver is giving commands to a motor vehicle control system to raise the volume on the stereo, open the sunroof, lower the windows, brighten the interior lights, and stop using the overdrive mode, because the driver is going to start driving fast while listening to loud music) that are discrete from the detected speech data (e.g., the driver, having wrecked his vehicle, now is using the onboard automated help system to call for help and describe his situation), wherein at least one entry of the phoneme database has been stored on a particular device (e.g., a smart key that is used to activate the car and store the phoneme database for that particular driver, so that a different driver would use a different key and the vehicle would have a different phoneme database for the different driver) associated with the particular party (e.g., it stores adaptation data that is based at least in part on speech from the driver).

Referring again to FIG. 8N, operation 604 may include operation 890 depicting acquiring a sentence diagramming path selection algorithm based on at least one speech interaction of the particular party that is discrete from the detected speech data, wherein at least a portion of the adaptation data has been stored on a particular device associated with the particular party. For example, FIG. 3, e.g., FIG. 3I, shows adaptation data comprising a sentence diagramming path selection algorithm based on one or more particular party pronunciations, and has been stored on a particular party-associated particular device acquiring module 390 acquiring a sentence diagramming path selection algorithm based on at least one speech interaction of the particular party (e.g., programming, using speech commands, favorite channels on an old television made by a particular manufacturer, e.g., Samsung) that is discrete from the detected speech data (e.g., programming, using speech commands, favorite channels on a new flat screen plasma television made by a different manufacturer, e.g., Panasonic), wherein at least a portion of the adaptation data has been stored on a particular device (e.g., a universal remote control, e.g., manufactured by a still different manufacturer from either the old television or the new television, e.g., Logitech) associated with the particular party (e.g., the owner of the universal remote control).

Referring again to FIG. 8N, operation 604 may include operation 892 depicting acquiring adaptation data that is at least partly based on at least one speech interaction of the particular party that is discrete from the detected speech data, wherein at least a portion of the adaptation data was collected by the particular device associated with the particular party. For example, FIG. 3, e.g., FIG. 3I, shows adaptation data at least partly based on discrete speech interaction of particular party separate from detected speech data, and at least partly collected by a particular party-associated particular device acquiring module 392 acquiring adaptation data that is at least partly based on at least one speech interaction of the particular party (e.g., speech interactions with speech-controlled kitchen devices) that is discrete from the detected speech data (e.g., controlling a speech-commanded clock radio in the bedroom), wherein at least a portion of the adaptation data was collected by the particular device (e.g., a desktop computer that is networked to each of the speech-controlled kitchen devices and the speech-controlled clock radio) associated with the particular party (e.g., the user has a login on the desktop computer).

Referring again to FIG. 8N, operation 604 may include operation 894 depicting acquiring one or more instructions for modifying one or more portions of a speech recognition component of a target device, said instructions at least partly based on at least one speech interaction of the particular party that is discrete from the detected speech data, wherein at least a portion of the adaptation data has been stored on a particular device associated with the particular party. For example, FIG. 3, e.g., FIG. 3I, shows adaptation data comprising instructions for modifying one or more portions of a speech recognition component of a target device that are at least partly based on one or more particular party speech interactions, and has been stored on a particular party-associated particular device acquiring module 394 acquiring one or more instructions (e.g., modifying one or more parameters of one or more algorithms) for modifying one or more portions of a speech recognition component (e.g., a set of logic gates configured to execute one or more of the algorithms for processing speech) of a target device (e.g., an automated teller machine device), said instructions at least partly based on at least one speech interaction of the particular party that is discrete from the detected speech data (e.g., based on previous speech interactions with automated teller machine devices), wherein at least a portion of the adaptation data has been stored on a particular device associated with the particular party (e.g., a cellular telephone device owned by the user).

Referring now to FIG. 8P (there is no FIG. 8O to avoid confusing the figure with a nonexistent Figure "eighty," e.g., "80"), operation 604 may include operation 896 depicting acquiring a location of one or more instructions for modifying one or more portions of a speech recognition component of a target device, said instructions at least partly based on at least one speech interaction of the particular party that is discrete from the detected speech data, wherein at least a portion of the adaptation data has been stored on a particular device associated with the particular party. For example, FIG. 3, e.g., FIG. 3J, shows adaptation data comprising a location of instructions for modifying one or more portions of a speech recognition component of a target device that are at least partly based on one or more particular party speech interactions, and has been stored on a particular party-associated particular device acquiring module 396 acquiring a location (e.g., a location in memory, or a location of a server) of one or more instructions for modifying one or more portions of a speech recognition component (e.g., an order in which speech algorithms are applied) of a target device (e.g., a computer with speech recognition software and word processing software loaded onto it), said instructions at least partly based on at least one speech interaction of the particular party that is discrete from the detected speech data (e.g., based on at least one previous dictation of one or more documents), wherein at least a portion of the adaptation data (e.g., the location of one or more instructions for modifying one or more portions of a speech recognition component of a target device) has been stored on a particular device (e.g., a headset worn by the user) associated with the particular party (e.g., set up and associated with the user).

Referring again to FIG. 8P, operation 604 may include operation 898 depicting acquiring adaptation data that is at least partly based on at least one speech interaction of the particular party that is discrete from the detected speech data, wherein at least a portion of the adaptation data is transmitted from the particular device associated with the particular party. For example, FIG. 3, e.g., FIG. 3J, shows adaptation data at least partly based on discrete speech interaction of particular party separate from detected speech data, and transmitted from a particular party-associated particular device acquiring module 398 acquiring adaptation data (e.g., an ungrammatical utterance deletion algorithm) that is at least partly based on at least one speech interaction of the particular party (e.g., a history of the user's musical selections for automated, speech-controlled jukeboxes) that is discrete from the detected speech data (e.g., selecting a new song at the speech-commanded jukebox), wherein at least a portion of the adaptation data is transmitted from the particular device (e.g., a near-field communications device held by the user that stores adaptation data) associated with the particular party).

Referring again to FIG. 8P, operation 604 may include operation 801 depicting acquiring adaptation data that is at least partly based on at least one speech interaction of the particular party that is discrete from the detected speech data, wherein at least a portion of the adaptation data is stored on the particular device associated with the particular party. For example, FIG. 3, e.g., FIG. 3J, shows adaptation data at least partly based on discrete speech interaction of particular party separate from detected speech data, and stored on a particular party-associated particular device acquiring module 301 acquiring adaptation data (e.g., a set of proper noun pronunciations, e.g., city names) that is at least partly based on at least one speech interaction of the particular party (e.g., the particular party dictating directions into a word processor), wherein at least a portion of the adaptation data is stored on the particular device (e.g., a USB stick, e.g., the first personal device 20A) associated with the particular party (e.g., the user).

Referring again to FIG. 8P, operation 604 may include operation 803 depicting acquiring adaptation data that is at least partly based on at least one speech interaction of the particular party that is discrete from the detected speech data, wherein at least a portion of the adaptation data is temporarily stored on the particular device associated with the particular party until it is deposited at a remote server. For example, FIG. 3, e.g., FIG. 3J, shows adaptation data at least partly based on discrete speech interaction of particular party separate from detected speech data, and is temporarily stored on the particular-party associated particular device until remote server deposit acquiring module 303 acquiring (e.g., receiving from a remote server, e.g., Amazon cloud services) adaptation data (e.g., a set of proper noun pronunciations, e.g., city names) that is at least partly based on at least one speech interaction of the particular party (e.g., previous interactions with automated ticket dispensing devices using speech) that is discrete from the detected speech data (e.g., speech data that comes from a speech interaction with an automated train ticket dispensing device located at Union Station in Washington, D.C.), wherein at least a portion of the adaptation data is temporarily stored on the particular device (e.g., in one or more of the previous interactions with automated ticket dispensing devices, the particular party's pronunciation of a city is stored on the cellular telephone device associated with the particular party) until it is deposited at a remote server (e.g., the Amazon cloud services from where it was retrieved along with the rest of the adaptation data).

Referring again to FIG. 8P, operation 604 may include operation 805 depicting acquiring adaptation data that is at least partly based on at least one speech interaction of the particular party that is discrete from the detected speech data, wherein at least a portion of the adaptation data was transmitted from a first device to a second device using the particular device associated with the particular party as a conduit configured to facilitate the transmission. For example, FIG. 3, e.g., FIG. 3J, shows adaptation data at least partly based on discrete speech interaction of particular party separate from detected speech data, and was transmitted from a first device to a second device using the particular party-associated particular device as a channel configured to facilitate the transaction acquiring module 305 acquiring adaptation data (e.g., a partial pattern tree model) that is at least partly based on at least one speech interaction of the particular party (e.g., the user giving speech commands to request a re-route to a GPS navigation device) that is discrete from the detected speech data (e.g., the user giving a command to the GPS navigation device to find a cheese shop), wherein at least a portion of the adaptation data was transmitted from a first device (e.g., a GPS navigation device, e.g., GPS navigation device 41, that may be good at re-routing traffic but has no information on cheese shops) to a second device (e.g., an onboard motor vehicle control system, e.g., motor vehicle control system 42, which may be bad at re-routing traffic but has an extensive cheese shop database) using the particular device (e.g., a smart key device, e.g., smart key 26, or a cellular telephone device) associated with the particular party as a conduit (e.g., the smart key device 26 communicates with the GPS navigation device 41 and the motor vehicle control system 42) configured to facilitate (e.g., take one or more steps that aid or assist in) the transmission of the adaptation data.

Referring now to FIG. 8Q, operation 604 may include operation 807 depicting acquiring adaptation data that is at least partly based on at least one speech interaction of the particular party that is discrete from the detected speech data, wherein at least a portion of the adaptation data originated at the particular device associated with the particular party. For example, FIG. 3, e.g., FIG. 3K, shows adaptation data at least partly based on discrete speech interaction of particular party separate from detected speech data, and at least a portion of which originated at a particular party-associated particular device acquiring module 307 acquiring adaptation data (e.g., a discourse marker detecting module) that is at least partly based on at least one speech interaction of the particular party that is discrete from the detected speech data, wherein at least a portion of the adaptation data originated at the particular device (e.g., a universal remote control, e.g., personal device 22A).

Referring again to FIG. 8Q, operation 604 may include operation 809 depicting acquiring adaptation data from a remote location, said adaptation data at least partly based on at least one speech interaction of the particular party that is discrete from the detected speech data, wherein at least a portion of the adaptation data was transmitted to the remote location from the particular device associated with the particular party. For example, FIG. 3, e.g., FIG. 3K, shows adaptation data at least partly based on discrete speech interaction of particular party separate from detected speech data, and at least a portion of which was transmitted to a remote location from a particular party-associated particular device receiving from remote location module 309 acquiring adaptation data (e.g., an accent-based pronunciation modification algorithm) from a remote location (e.g., a remote server, e.g., server 110), said adaptation data at least partly based on at least one speech interaction of the particular party that is discrete from the detected speech data (e.g., previous commands given to a headset during an augmented reality gaming session where the headset is worn outside), wherein at least a portion of the adaptation data was transmitted to the remote location (e.g., the adaptation data collected from the speech interactions with the headset does not stay on the headset, but is transmitted to a remote location) from the particular device (e.g., an augmented reality headset) associated with the particular party (e.g., being worn by the user).

Referring again to FIG. 8Q, operation 604 may include operation 811 depicting receiving adaptation data that is at least partly based on at least one speech interaction of the particular party that is discrete from the detected speech data. For example, FIG. 3, e.g., FIG. 3K, shows adaptation data at least partly based on discrete speech interaction of particular party separate from detected speech data receiving module 311 receiving adaptation data (e.g., a list of the way that the particular party pronounces ten words) that is at least partly based on at least one speech interaction of the particular party that is discrete from the detected speech data (e.g., ordering a triple bacon cheeseburger from the automated drive-thru window).

Referring again to FIG. 8Q, operation 604 may include operation 813 depicting adding further data to the received adaptation data. For example, FIG. 3, e.g., FIG. 3K, shows further data adding to adaptation data module 313 adding further data (e.g., adding one or more additional words to the list of the way that the particular party pronounces ten words, e.g., the word "bacon,").

Referring again to FIG. 8Q, operation 813 may include operation 815 depicting adding additional adaptation data to the received adaptation data. For example, FIG. 3, e.g., FIG.

3K, shows additional adaptation data adding to adaptation data module 315 adding additional adaptation data (e.g., another algorithm, e.g., adding an accent-based pronunciation modification algorithm to be executed serially with or parallel to the existing acquired adaptation data) to the received adaptation data (e.g., a phrase completion algorithm).

Referring again to FIG. 8Q, operation 813 may include operation 817 depicting adding header data identifying an entity that received the adaptation data. For example, FIG. 3, e.g., FIG. 3K, shows header data identifying receiving entity adding to adaptation data module 317 adding header data identifying an entity (e.g., either specific identification, like a MAC address or IP address, specific type identification, such as "I am a cellular telephone device," e.g., personal device 22B, or general identity information, e.g., "I am not the ultimate destination of this adaptation data" that received this information) that received the adaptation data (e.g., an emotion-based pronunciation adjustment algorithm).

Referring again to FIG. 8Q, operation 813 may include operation 819 depicting adding header data identifying an entity that transmitted the adaptation data. For example, FIG. 3, e.g., FIG. 3K, shows header data identifying transmitting entity adding to adaptation data module 319 adding header data identifying an entity (e.g., specific or general, similarly to as described above, e.g., "received from a universal remote control," or, e.g., personal device 22A) that transmitted the adaptation data (e.g., a partial pattern tree model).

Figure 9A:
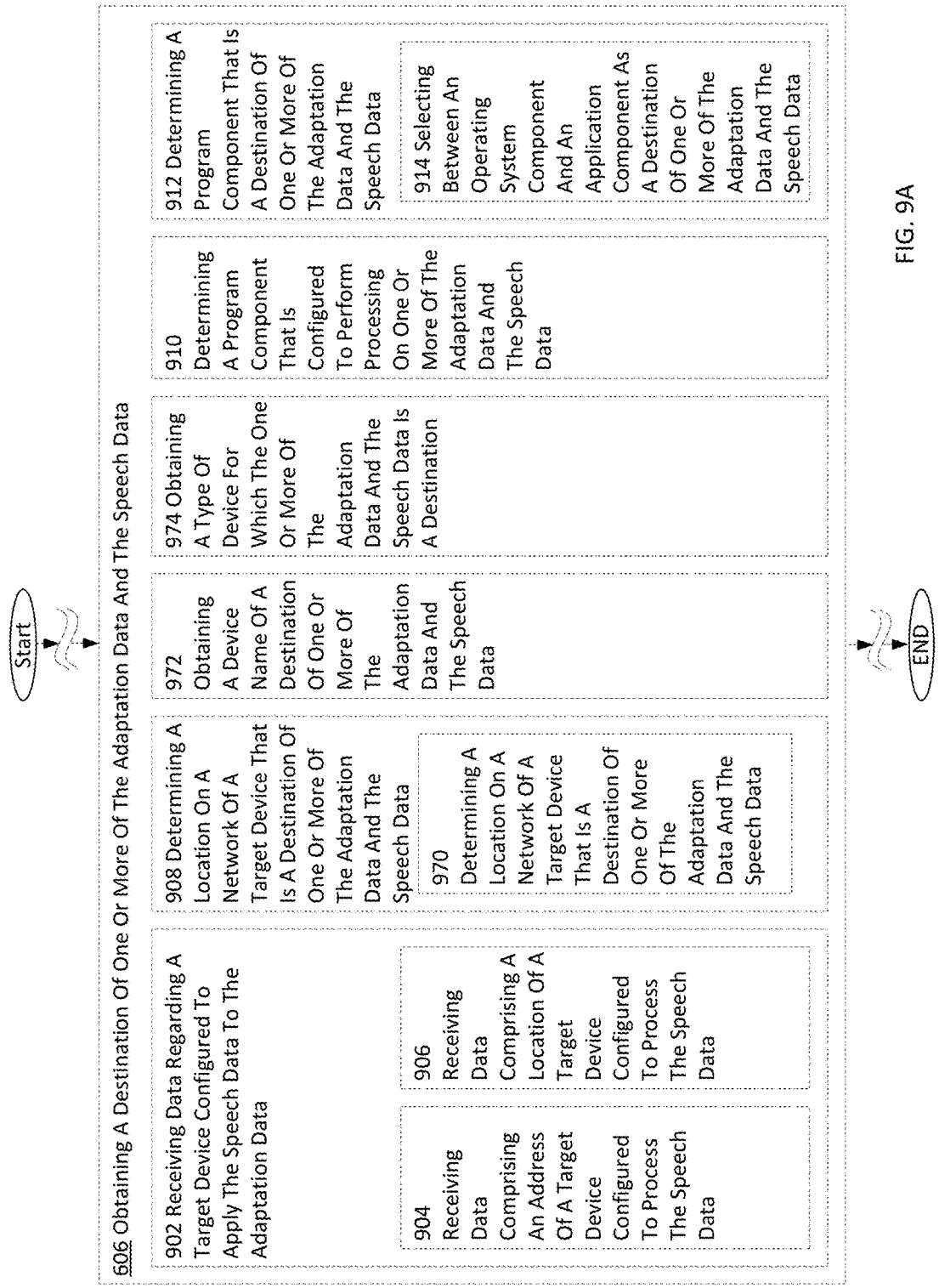
FIG. 9A is a high-level logic flowchart of a process depicting alternate implementations of an obtaining a destination operation 606 of FIG. 6, according to one or more embodiments.

FIGS. 9A-9D depict various implementations of operation 606, according to embodiments. Referring now to FIG. 9A, operation 606 may include operation 902 depicting receiving data regarding a target device configured to process the speech data. For example, FIG. 4, e.g., FIG. 4A, shows data regarding target device configured to process speech data module 402 receiving data (e.g., receiving a network name of) regarding a target device (e.g., the network computer "NA80001" that accepts speech input and resides on an accounting firm office network) configured to process the speech data (e.g., the network computer is running a word processing application configured to receive dictation of a memorandum).

Referring again to FIG. 9A, operation 902 may include operation 904 depicting receiving data comprising an address of a target device configured to process the speech data. For example, FIG. 4, e.g., FIG. 4A, shows data comprising a target device configured to process speech data address receiving module 404 receiving data comprising an address (e.g., a physical address, either relative or absolute, or a network location, e.g., a computer name, or an IP address, or a MAC identifier address, or any other piece of information that can be used to derive or identify where a target device is) of a target device (e.g., an automated teller machine device) configured to process the speech data (e.g., a request to withdraw two hundred dollars from a savings account).

Referring again to FIG. 9A, operation 902 may include operation 906 depicting receiving data comprising a location of a target device configured to process the speech data. For example, FIG. 4, e.g., FIG. 4A, shows data comprising a target device configured to process speech data location receiving module 406 receiving data comprising a location (e.g., a particular piece of architecture internal to a device, e.g., processor 152) of a target device (e.g., a particular portion of the target device, e.g., the computer, that is configured to process the speech, e.g., a portion of a chip whose logic gates have been configured to process the speech data) configured to process the speech data (e.g., dictation of a letter to the editor regarding a political topic).

Referring again to FIG. 9A, operation 606 may include operation 908 depicting determining a location of a target device that is a destination of one or more of the adaptation data and the speech data. For example, FIG. 4, e.g., FIG. 4A, shows target device location as destination of one or more of the adaptation data and the speech data determining module 408 determining a location (e.g., a location on a network, a physical location, a relative location with respect to one or more of the particular party and the particular device, a virtual location, a location on a network map, a location within a computer architecture, a location within a software architecture, and the like) of a target device (e.g., a video game system) that is a destination of one or more of the adaptation data (e.g., a sentence diagramming path selection algorithm) and the speech data (e.g., giving a speech command within a first person shooter to lob a grenade).

Referring again to FIG. 9A, operation 908 may include operation 970 depicting determining a location on a network of a target device that is a destination of one or more of the adaptation data and the speech data. For example, FIG. 4, e.g., FIG. 4A, shows target device network location as destination of one or more of the adaptation data and the speech data determining module 470 determining a location on a network (e.g., a location, either a computer name, a login name, a MAC, IP, or other address, or similar, of a group of one or more computers and associated devices that are connected by communications facilities).

Referring again to FIG. 9A, operation 606 may include operation 972 depicting obtaining a device name of a destination of one or more of the adaptation data and the speech data. For example, FIG. 4, e.g., FIG. 4A, shows device name of destination of one or more of the adaptation data and the speech data obtaining module 472 obtaining a device name (e.g., one or more of a network identification name, a computer name, a computer description, an internal identifier, a numeric sequence (e.g., a MAC or IP address) of a destination of one or more of the adaptation data (e.g., a stochastic state transition network) and the speech data (e.g., giving a speech command to create 25 copies at 11×17).

Referring again to FIG. 9A, operation 606 may include operation 974 depicting obtaining a type of device for which the one or more of the adaptation data and the speech data is a destination. For example, FIG. 4, e.g., FIG. 4A, shows type of device for which one or more of the adaptation data and the speech data is a destination obtaining module 474 obtaining a type of device (e.g., a category of device (e.g., televisions, blenders, microwave ovens, tablet PCs), a broader category of device (e.g., kitchen appliances, home theater components), a type based on a type of input they receive (e.g., devices that have a "stop" "fast-forward" and "play" button, devices that have a temperature control, devices that have a volume), or a particular manufacturer (e.g., "a Kenmore device," or "a Samsung device") for which the one or more of the adaptation data (e.g., instructions for replacing a word frequency table with a modified word frequency table that reflects the particular party's word usage) and the speech data is a destination.

Referring again to FIG. 9A, operation 606 may include operation 910 depicting determining a program component that is configured to perform processing on one or more of the adaptation data and the speech data. For example, FIG. 4, e.g., FIG. 4A, shows program component configured to perform processing on one or more of the adaptation data and the speech data determining module 410 determining a program component (e.g., a built-in component of a complex word processor) that is configured to perform processing (e.g., take one or more steps manipulating the data of) on one or more of the adaptation data (e.g., a regional dialect application algorithm) and the speech data (e.g., dictation of a letter to the editor of a newspaper).

Referring again to FIG. 9A, operation 606 may include operation 912 depicting determining a program component that is a destination of one or more of the adaptation data and the speech data. For example, FIG. 4, e.g., FIG. 4A, shows software component as destination of one or more of the adaptation data and the speech data determining module 412 determining a program component (e.g., a program that runs in the background of an operating system, receives speech data, and performs processing on the speech data) that is a destination of one or more of the adaptation data and the speech data (e.g., dictation of a novel being written in a user's spare time).

Referring again to FIG. 9A, operation 912 may include operation 914 depicting selecting between an operating system component and an application component as a destination of one or more of the adaptation data and the speech data. For example, FIG. 4, e.g., FIG. 4A, shows selection between application component and operating system component as destination of one or more of the adaptation data and the speech data selecting module 414 selecting (e.g., choosing, based on a determination of which component should perform the job) between an operating system component (e.g., an component built into the operating system, e.g., Microsoft Windows or Apple iOS, that is configured to perform processing on the speech data) and an application component (e.g., a simple word processor, e.g., Microsoft's Notepad) as a destination of one or more of the adaptation data and the speech data (e.g., dictation of a grocery shopping list).

Figure 9B:
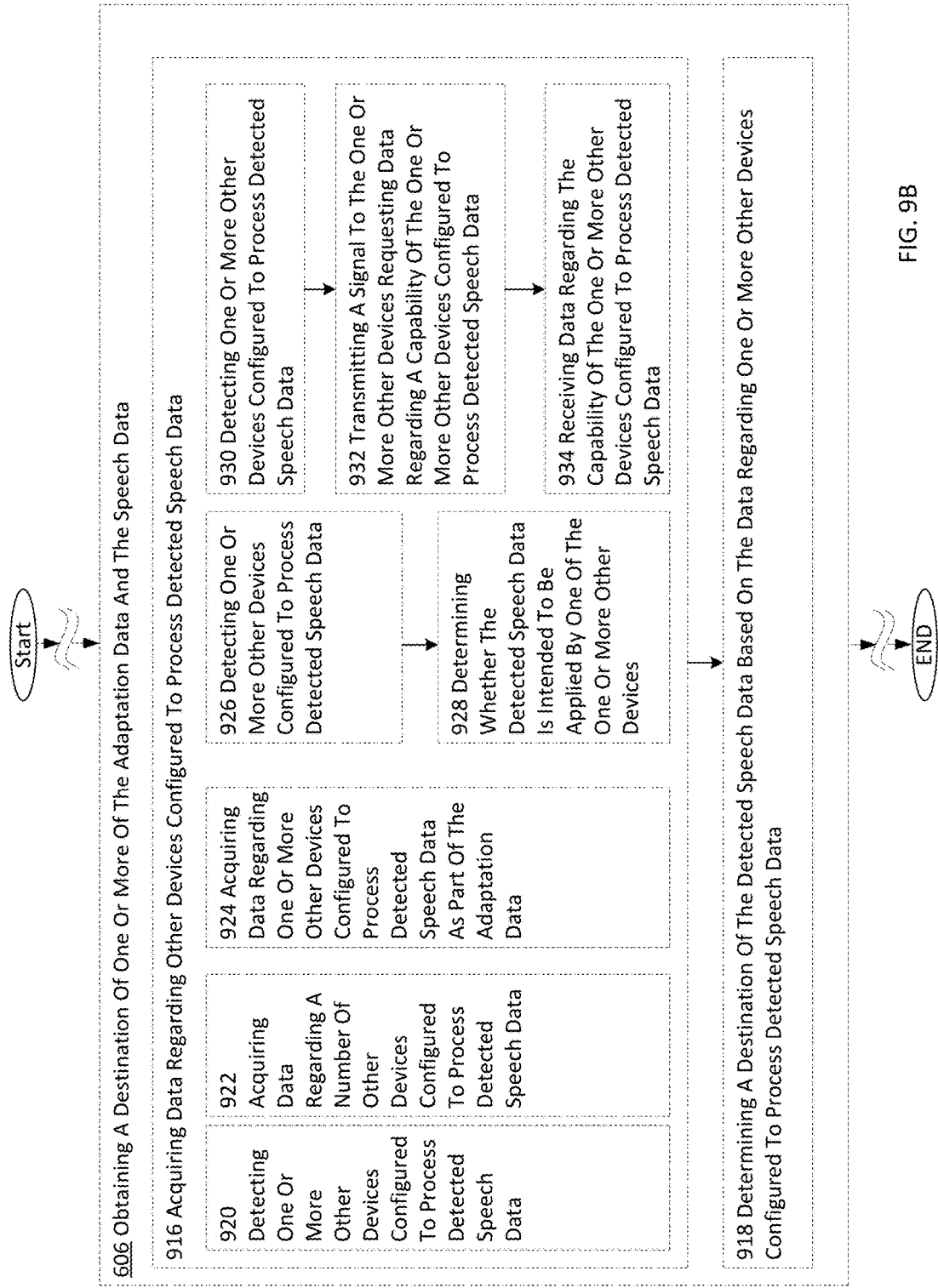
FIG. 9B is a high-level logic flowchart of a process depicting alternate implementations of an obtaining a destination operation 606 of FIG. 6, according to one or more embodiments.

Referring now to FIG. 9B, operation 606 may include operation 916 depicting acquiring data regarding one or more other devices configured to process detected speech data. For example, FIG. 4, e.g., FIG. 4B, shows data regarding at least one other device configured to process detected speech data obtaining module 416 acquiring data regarding one or more other devices (e.g., a list of other devices, e.g., GPS navigation devices, within communication range, and their capability of finding wineries) configured to (e.g., capable of) process detected speech data (e.g., converted data of a user placing a fast-food order).

Referring again to FIG. 9B, in some embodiments in which operation 606 includes operation 916, operation 606 also may include operation 918 depicting determining a destination of the detected speech data based on the data regarding one or more other devices configured to process detected speech data. For example, FIG. 4, e.g., FIG. 4B, shows destination of the detected speech data determining based on acquired data regarding at least one other device determining module 418 determining a destination of the detected speech data (e.g., determining that there is a GPS navigation system within communication range that has a good database of wineries) based on the data regarding one or more devices (e.g., GPS navigation systems and their ability to find wineries) configured to process detected speech data ("direct me to the nearest winery that has Chateau Mont Blanc Rojo")

Referring again to FIG. 9B, operation 916 may include operation 920 depicting detecting one or more other devices configured to process detected speech data. For example, FIG., 4, e.g., FIG. 4B, shows at least one or more other device configured to process detected speech data detecting module 420 detecting (e.g., receiving broadcasted signals from) one or more other devices (e.g., speech-enabled electronic devices that are part of a home theater system) configured to process speech data (e.g., "raise the volume five units").

Referring again to FIG. 9B, operation 916 may include operation 922 depicting acquiring data regarding a number of other devices configured to process detected speech data. For example, FIG. 4, e.g., FIG. 4B, shows data regarding a number of the at least one other devices configured to process detected speech data obtaining module 422 acquiring data regarding a number of other devices (e.g., three other devices) configured to process detected speech data (e.g. "set the DVD recorder to record channel 259 at 5:30 pm")

Referring again to FIG. 9B, operation 916 may include operation 924 depicting acquiring data regarding one or more other devices configured to process detected speech data as part of the adaptation data. For example, FIG. 4, e.g., FIG. 4B, shows data regarding at least one other device configured to process detected speech data acquiring from adaptation data module 424 acquiring data regarding one or more other devices (e.g., acquiring a list of other devices that was prepared by one or more devices and stored in the adaptation data) configured to process detected speech data (e.g., "decrease temperature to 72 degrees") as part of the adaptation data (e.g., a phoneme pronunciation database that has header information including list of one or more other devices).

Referring again to FIG. 9B, operation 916 may include operation 926 depicting detecting one or more other devices configured to process detected speech data. For example, FIG. 4, e.g., FIG. 4B, shows detecting at least one or more other devices configured to process detected speech data module 426 detecting (e.g., pinging various ports on a network to determine whether devices are connected to the network, or using an infrared scanner to determine how many actively processing devices are within detection range of the scanner) one or more other devices (e.g., components of a home theater system) configured to process detected speech data (e.g., "shut off the television after one hour").

Referring again to FIG. 9B, operation 916 may include operation 928 depicting determining whether the detected speech data is intended to be applied by one of the one or more other devices. For example, FIG. 4, e.g., FIG. 4B, shows determining whether detected speech data is intended to be applied by one of the one or more other devices module 428 determining whether the detected speech data (e.g., "shut off the television after one hour") is intended to be applied by one of the one or more other devices (e.g., determining whether one or more of the other devices is a television, and determining that the detected speech data is intended to be applied by a television).

Referring again to FIG. 9B, operation 916 may include operation 930 depicting detecting one or more other devices configured to process detected speech data. For example, FIG. 4, e.g., FIG. 4B, shows detecting one or more other devices configured to process detected speech data module 430 detecting (e.g., obtaining one or more pieces of data regarding) one or more other devices configured to process detected speech data (e.g., "set the personal video recorder to record the television show "Friends").

Referring again to FIG. 9B, operation 916 may include operation 932 depicting transmitting a signal to the one or more other devices requesting data regarding a capability of the one or more other devices configured to process detected speech data. For example, FIG. 4, e.g., FIG. 4B, shows signal requesting data regarding a capability of the one or more other devices transmitting module 432 transmitting a signal (e.g., communicating a request for data) to the one or more other devices (e.g., in a home theater setting, the one or more other devices may be the television, the receiver, the cable box, the CD player, the DVD player, the Blu-Ray player, the personal video recorder, the video game system, the universal remote control, seat controls for the seats, climate control for the room, lighting control for the room, and the personal computer which may control portions of the system, store media, or perform other functions) configured to process detected speech data (e.g., any or all of the devices in the home theater setting may be speech-enabled).

Referring again to FIG. 9B, operation 916 may include operation 934 depicting receiving data regarding the capability of the one or more other devices configured to process detected speech data. For example, FIG. 4, e.g., FIG. 4B, shows data regarding capability of the one or more other devices receiving module 434 receiving data regarding the capability (e.g., whether a device can receive speech, whether it can process speech, what algorithms it uses to process speech, what are words in the device's vocabulary that it understands, how does the device deal with different speech characteristics, does the device have profile information of a person stored on the device, does the device have speech profile information of a person stored on the device, does the device have a network connection, and the like) of the one or more other devices (e.g., the devices in the home theater system) configured to process detected speech data (e.g., "set the personal video recorder to record the television show 'Friends'").

Figure 9C:
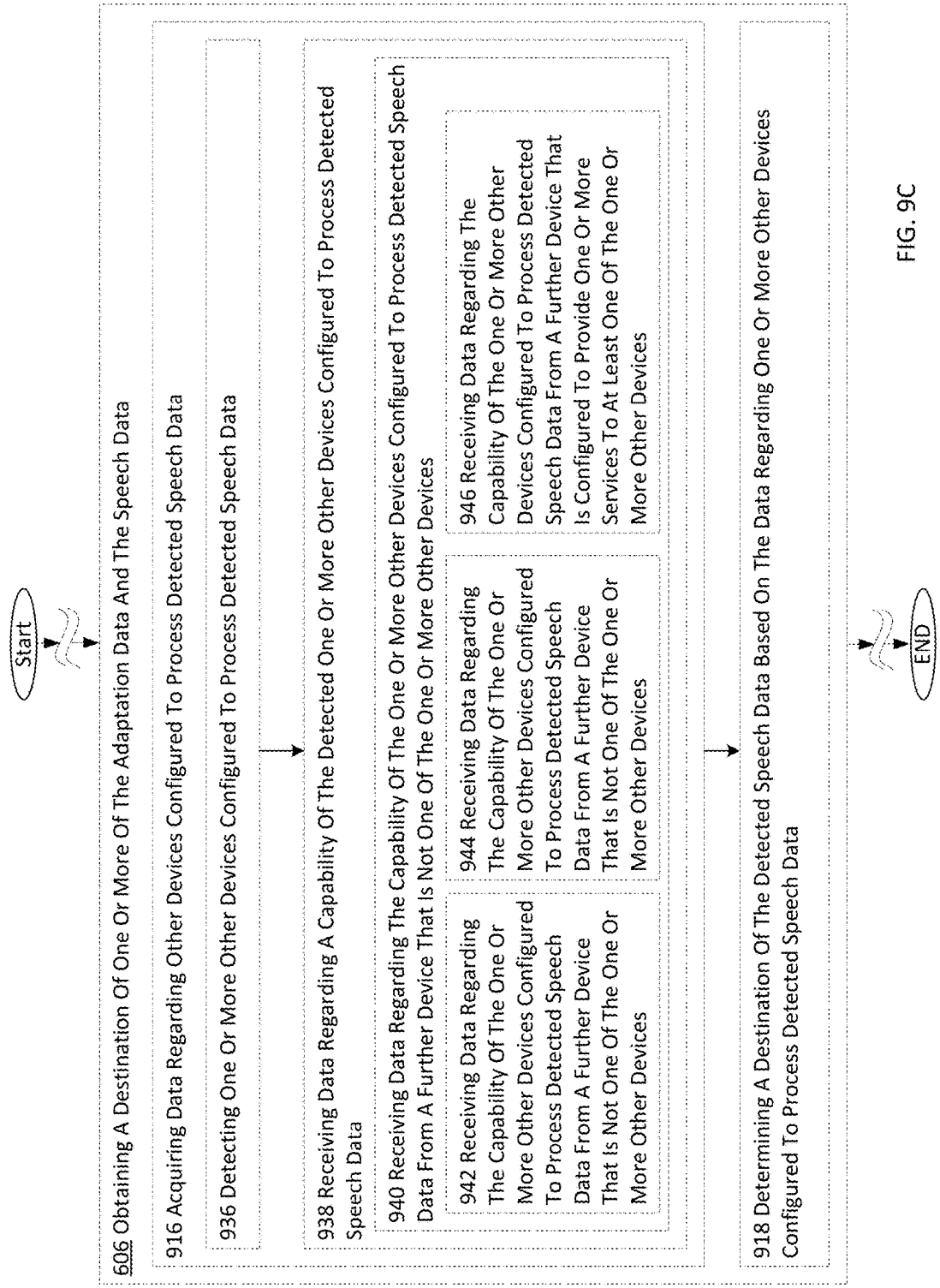
FIG. 9C is a high-level logic flowchart of a process depicting alternate implementations of an obtaining a destination operation 606 of FIG. 6, according to one or more embodiments.

Referring now to FIG. 9C, operation 916 may include operation 936 depicting detecting one or more other devices configured to process detected speech data. For example, FIG. 4, e.g., FIG. 4C, shows one or more other devices configured to process detected speech data detecting module 436 detecting (e.g., retrieving information from an enterprise network regarding machines that are configured to process the detected speech data, e.g., a secured door, a floating computer, a telephone, a copier machine, and the like) or more other devices (e.g., other devices on the network, as described above) configured to process speech data (e.g., "make 25 copies of this at 85% contrast").

Referring again to FIG. 9C, operation 916 may include operation 938 depicting receiving data regarding a capability of the detected one or more other devices configured to process detected speech data. For example, FIG. 4, e.g., FIG. 4C, shows capability of the detected one or more other devices configured to process detected speech data receiving module 438 receiving data (e.g., from the devices themselves) regarding a capability (e.g., whether a device can receive speech, whether it can process speech, what algorithms it uses to process speech, what are words in the device's vocabulary that it understands, how does the device deal with different speech characteristics, does the device have profile information of a person stored on the device, does the device have speech profile information of a person stored on the device, does the device have a network connection, whether the user has proper authority or clearance to use the device, whether the device is currently functioning, what it will cost in terms of available processor and/or storage resources to use the device to process the speech data, which device most evenly uses the resources on the network, which device is the newest, which device is the fastest, and the like) of the detected one or more devices (e.g., enterprise network machines, such as a secured door, a floating computer, a telephone, a copier machine, and the like) configured to process detected speech data (e.g., "make 25 copies of this at 85% contrast").

Referring again to FIG. 9C, operation 938 may include operation 940 depicting receiving data regarding the capability of the one or more other devices configured to process detected speech data from a further device that is not one of the one or more other devices. For example, FIG. 4, e.g., FIG. 4C, shows capability of the detected one or more other devices configured to process detected speech data receiving from a device that is not one of the one or more other devices module 440 receiving data regarding the capability (e.g., whether a device can receive speech, whether it can process speech, what algorithms it uses to process speech, what are words in the device's vocabulary that it understands, how does the device deal with different speech characteristics, does the device have profile information of a person stored on the device, does the device have speech profile information of a person stored on the device, does the device have a network connection, whether the user has proper authority or clearance to use the device, whether the device is currently functioning, what it will cost in terms of available processor and/or storage resources to use the device to process the speech data, which device most evenly uses the resources on the network, which device is the newest, which device is the fastest, and the like) of the one or more devices configured to process detected speech data (e.g., "make 25 copies of this at 85% contrast") from a further device (e.g., a network device located on an enterprise network that is specifically configured to manage resources for the network, e.g., processing speech data resources) that is not one of the one or more devices (e.g., the network device may not accept speech data, and may not be configured to process that particular command of, e.g., "make 25 copies of this at 85% contrast.")

Referring again to FIG. 9C, operation 940 may include operation 942 depicting receiving data regarding the capability of the one or more other devices configured to process detected speech data from a further device that is configured to communicate on a same network as the one or more other devices. For example, FIG. 4, e.g., FIG. 4C, shows capability of the detected one or more other devices configured to process detected speech data receiving from a device configured to communicate on a same communication network as the one or more other devices module 442 receiving data regarding the capability (e.g., whether a device can receive speech, whether it can process speech, what algorithms it uses to process speech, what are words in the device's vocabulary that it understands, how does the device deal with different speech characteristics, does the device have profile information of a person stored on the device, does the device have speech profile information of a person stored on the device, does the device have a network connection, whether the user has proper authority or clearance to use the device, whether the device is currently functioning, what it will cost in terms of available processor and/or storage resources to use the device to process the speech data, which device most evenly uses the resources on the network, which device is the newest, which device is the fastest, and the like) of the one or more other devices configured to process detected speech data from a further device that is configured to communicate on a same network (e.g., the internal corporate network on which the devices communicate, which may be a subset or a subnet of a larger network) as the one or more other devices (e.g., enterprise network machines, such as a secured door, a floating computer, a telephone, a copier machine, and the like).

Referring again to FIG. 9C, operation 940 may include operation 944 depicting receiving data regarding the capability of the one or more other devices configured to process detected speech data from a further device that is at least partially controlled by a same entity that controls at least one of the one or more other devices. For example, FIG. 4, e.g., FIG. 4C, shows capability of the detected one or more other devices configured to process detected speech data receiving from a device at least partially controlled by a same entity that controls at least one of the one or more other devices module 444 receiving data regarding the capability (e.g., whether a device can receive speech, whether it can process speech, what algorithms it uses to process speech, what are words in the device's vocabulary that it understands, how does the device deal with different speech characteristics, does the device have profile information of a person stored on the device, does the device have speech profile information of a person stored on the device, does the device have a network connection, and the like) of the one or more other devices (e.g., multiple portions of a home security system, e.g., a door lock as one device, an alarm as another device, a safe as a third device) configured to process speech data (e.g., "activate the alarm") from a further device (e.g., an always-on home management system with battery backup that manages the devices and stores data, and in some embodiments, handles some of the processing) that is at least partially controlled by a same entity (e.g., the user controls the management device as well as each of the one or more other devices) that controls at least one of the one or more other devices.

Referring again to FIG. 9C, operation 940 may include operation 946 depicting receiving data regarding the capability of the one or more other devices configured to process detected speech data from a further device that is configured to provide one or more services to at least one of the one or more other devices. For example, FIG. 4, e.g., FIG. 4C, shows capability of the detected one or more other devices configured to process detected speech data receiving from a device configured to provide one or more services to at least one of the one or more other devices module 446 receiving data regarding the capability of the one or more other devices configured to process detected speech data (e.g., giving a speech command to an automated drive-thru window) from a further device (e.g., a motor vehicle command system) that is configured to provide one or more services to at least one of the one or more other devices (e.g., a GPS navigation system, an media playing system, an emergency services calling system, that all use at least a portion of the motor vehicle command system for processing).

Figure 9D:
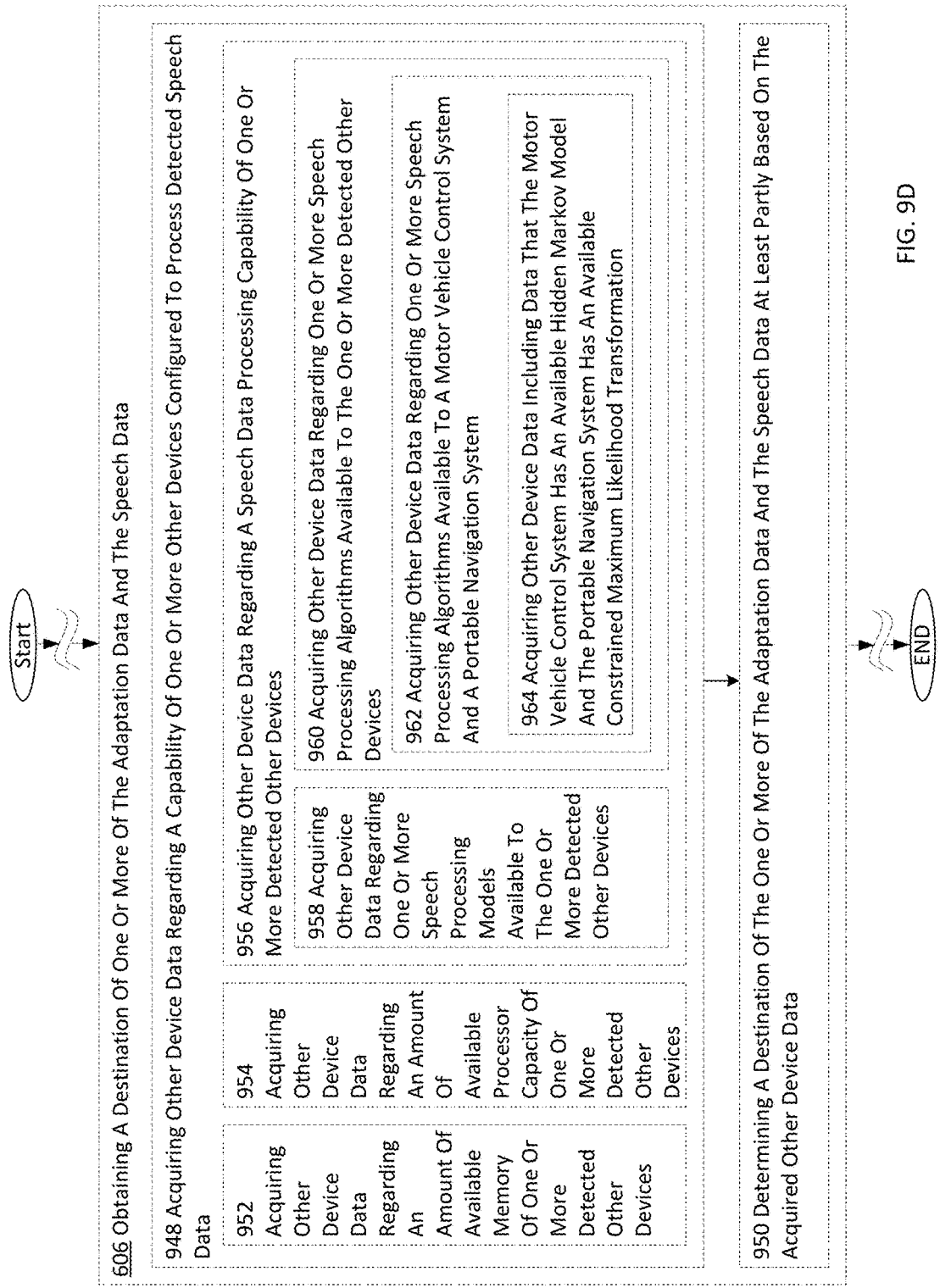
FIG. 9D is a high-level logic flowchart of a process depicting alternate implementations of an obtaining a destination operation 606 of FIG. 6, according to one or more embodiments.

Referring now to FIG. 9D, operation 606 may include operation 948 depicting acquiring other device data regarding a capability of one or more other devices configured to process detected speech data. For example, FIG. 4, e.g., FIG. 4D, shows other device data regarding a capability of one or more other devices configured to process detected speech data obtaining module 448 acquiring other device data regarding a capability of one or more other devices (e.g., information regarding algorithms, or amount of storage, or processing power, or a combination thereof) configured to process detected speech data (e.g., a command to turn off).

Referring again to FIG. 9D, operation 606 may include operation 950 depicting determining a destination of the one or more of the adaptation data and the speech data at least partly based on the acquired other device data. For example, FIG. 4, e.g., FIG. 4D, shows destination for one or more of the adaptation data and the speech data determining at least partly based on the acquired other device data module 450 determining a destination of the one or more of the adaptation data (e.g., a phrase completion algorithm) and the speech data (e.g., a command to turn off) at least partly based on the acquired other device data (e.g., data indicating which device is currently on).

Referring again to FIG. 9D, operation 948 may include operation 952 depicting acquiring other device data regarding an amount of available memory of one or more detected other devices. For example, FIG. 4, e.g., FIG. 4D, shows other device data regarding an amount of available memory for one or more detected other devices obtaining module 452 acquiring other device data regarding an amount of available memory of one or more detected other devices (e.g., a laptop computer, a netbook, a tablet computer, a smartphone, and a desktop computer).

Referring again to FIG. 9D, operation 948 may include operation 954 depicting acquiring other device data regarding an amount of available processor capacity of one or more detected other devices. For example, FIG. 4, e.g., FIG. 4D, shows other device data regarding an amount of available processor capacity for one or more detected other devices obtaining module 454 acquiring other device data regarding an amount of available processor capacity of one or more detected other devices (e.g., a laptop computer, a netbook, a tablet computer, a smartphone, and a desktop computer).

Referring again to FIG. 9D, operation 948 may include operation 956 depicting acquiring other device data regarding a speech data processing capability of one or more detected other devices. For example, FIG. 4, e.g., FIG. 4D, shows other device data regarding a speech data processing capability for one or more detected other devices obtaining module 456 acquiring other device data regarding a speech data processing capability (e.g., an algorithm, a process, a selection of algorithms to choose from, a size of the data pool to draw from, the logic used to process speech, the hardware used to receive the speech, one or more filters used, or any combination thereof) of one or more detected other devices (e.g., a GPS navigation system).

Referring again to FIG. 9D, operation 956 may include operation 958 depicting acquiring other device data regarding one or more speech processing models available to the one or more detected other devices. For example, FIG. 4, e.g., FIG. 4D, shows other device data regarding one or more available speech models for one or more detected other devices obtaining module 458 acquiring other device data regarding one or more speech processing models (e.g., a hidden Markov model) available to the one or more detected other devices (e.g., a speech-enabled blender, a speech-enabled convection oven, and a speech-enabled juicer).

Referring again to FIG. 9D, operation 956 may include operation 960 depicting acquiring other device data regarding one or more speech processing algorithms available to the one or more detected other devices. For example, FIG. 4, e.g., FIG. 4D, shows other device data regarding one or more available speech algorithms for one or more detected other devices obtaining module 460 acquiring other device data regarding one or more speech processing algorithms (e.g., an accent-based pronunciation modification algorithm and a sentence diagramming path selection algorithm) available to (e.g., either stored on or retrievable by) the one or more detected other devices (e.g., a speech-enabled video game system).

Referring again to FIG. 9D, operation 960 may include operation 962 depicting acquiring other device data regarding one or more speech processing algorithms available to a motor vehicle control system and a portable navigation system. For example, FIG. 4, e.g., FIG. 4D, shows other device data regarding one or more available speech algorithms for a motor vehicle control system and a portable navigation system obtaining module 462 acquiring other device data regarding one or more speech processing algorithms (e.g., a non-lexical vocable removal algorithm and a speech disfluency detection) available to a motor vehicle control system and a portable navigation system.

Referring again to FIG. 9D, operation 962 may include operation 964 depicting acquiring other device data including data that the motor vehicle control system has an available hidden Markov model and the portable navigation system has an available constrained maximum likelihood transformation. For example, FIG. 4, e.g., FIG. 4D, shows other device data regarding an available hidden Markov model for a motor vehicle control system and an available constrained maximum likelihood transformation for the portable navigation system obtaining module 464 acquiring other device data including data that the motor vehicle control system has an available hidden Markov model and the portable navigation system has an available constrained maximum likelihood transformation.

Figure 10A:
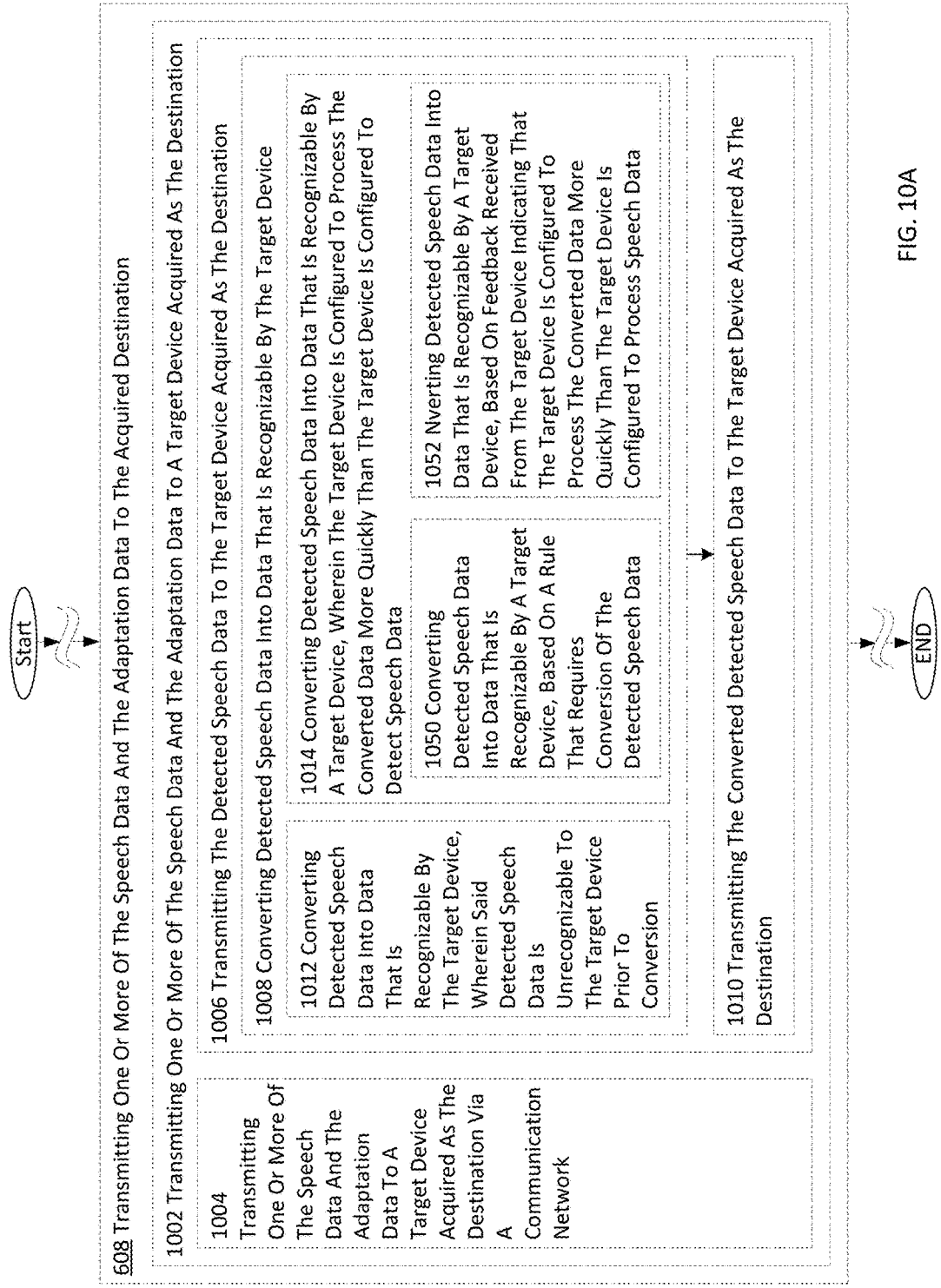
FIG. 10A is a high-level logic flowchart of a process depicting alternate implementations of a transmitting operation 608 of FIG. 6, according to one or more embodiments.

FIGS. 10A-10D depict various implementations of operation 608, according to embodiments. Referring now to FIG. 10A, operation 608 may include operation 1002 depicting transmitting one or more of the speech data and the adaptation data to a target device acquired as the destination. For example, FIG. 5, e.g., FIG. 5A, shows acquired destination of one or more of the adaptation data and the speech data transmitting to target device module 502 transmitting one or more of the speech data (e.g., a food order) and the adaptation data (e.g., a context-based repaired utterance processing matrix) to a target device (e.g., an automated drive-thru window) acquired as the destination.

Referring again to FIG. 10A, operation 1002 may include operation 1004 depicting transmitting one or more of the speech data and the adaptation data to a target device acquired as the destination, said transmitting occurring via a communication network. For example, FIG. 5, e.g., FIG. 5A, shows target device acquired via a communication network as destination of one or more of the adaptation data and the speech data transmitting to target device module 504 transmitting one or more of the speech data (e.g., "give me directions to the nearest Best Buy electronics store") and the adaptation data (e.g., a discourse marker detecting module) to a target device acquired as the destination (e.g., a motor vehicle control system, e.g., motor vehicle control system 42), said transmitting occurring via a communication network (e.g., over an internal Bluetooth network set up inside the vehicle).

Referring again to FIG. 10A, operation 1002 may include operation 1006 depicting transmitting the detected speech data to the target device acquired as the destination. For example, FIG. 5, e.g., FIG. 5A, shows detected speech data to target device acquired as destination transmitting module 506 transmitting the detected speech data (e.g., "withdraw two hundred dollars from my savings account") to the target device (e.g., in a row of speech-enabled automated teller machine devices, delivering to the third automated teller machine device from the left).

Referring again to FIG. 10A, operation 1006 may include operation 1008 depicting converting detected speech data into data that is recognizable by the target device. For example, FIG. 5, e.g., FIG. 5A, shows detected speech data converting into target device recognizable data module 508 converting detected speech data (e.g., speech of "open the web browser") into data that is recognizable by the target device (e.g., by converting received audio data as speech into byte format for transmission and processing).

Referring again to FIG. 10A, operation 1006 may include operation 1010 depicting transmitting the converted detected speech data to the target device acquired as the destination. For example, FIG. 5, e.g., FIG. 5A, shows converted detected speech data transmitting to target device acquired as destination module 510 transmitting the converted detected speech data (e.g., the converted "open the web browser" into byte format) to the target device (e.g., a speech-enabled tablet computer) acquired as the destination (e.g., as an example, a particular device has determined that of the detected devices, only the speech-enabled tablet computer has a web browser).

Referring again to FIG. 10A, operation 1008 may include operation 1012 depicting converting detected speech data into data that is recognizable by the target device, wherein said detected speech data is unrecognizable to the target device prior to conversion. For example, FIG. 5, e.g., FIG. 5A, shows detected target device incomprehensible speech data converting into target device recognizable data module 512 converting detected speech data into data that is recognizable by the target device (e.g., by decompressing or decrypting the speech data), wherein said detected speech data is unrecognizable to the target device prior to conversion (e.g., because of memory, processor, or because of security reasons, the target device is unable to decompress or decrypt the speech data).

Referring again to FIG. 10A, operation 1008 may include operation 1014 depicting converting detected speech data into data that is recognizable by a target device, wherein the target device is configured to process the converted data more quickly than the target device is configured to process speech data. For example, FIG. 5, e.g., FIG. 5A, shows detected speech data converting into data recognizable by a target device configured to process converted data more quickly than unconverted data module 514 converting detected speech data into data that is recognizable (e.g., the detected speech data is filtered using a noise level dependent filtration algorithm) by a target device (e.g., a speech-enabled media player, e.g., media player device 52), wherein the target device is configured to process the converted data (e.g., the speech data that has been filtered) more quickly than the target device is configured to process speech data (e.g., the target device, e.g., which may process everything sound it picks up, does not have to process sounds that should have been filtered out before determining that the sounds do not correspond to words).

Referring again to FIG. 10A, operation 1014 may include operation 1050 depicting converting detected speech data into data that is recognizable by a target device, based on a rule that requires conversion of the detected speech data. For example, FIG. 5, e.g., FIG. 5A, shows detected speech data converting into data recognizable by a target device configured to process converted data more quickly than unconverted data based on a requiring conversion rule module 550 converting detected speech data (e.g., data corresponding to a speech command to change the input to HDMI-1) into data that is recognizable (e.g., a part-of-speech labeling algorithm) by a target device (e.g., an audio/visual receiver, e.g., receiver device 51), based on a rule that requires conversion of the detected speech data (e.g., that always adds part-of-speech labeling to ease processing by target devices).

Referring again to FIG. 10A, operation 1014 may include operation 1052 depicting converting detected speech data into data that is recognizable by a target device, based on feedback received from the target device indicating that the target device is configured to process the converted data more quickly than the target device is configured to process speech data. For example, FIG. 5, e.g., FIG. 5A, shows detected speech data converting into data recognizable by a target device configured to process converted data more quickly than unconverted data based on target device feedback module 552 converting detected speech data (e.g., "raise the volume five notches") into data that is recognizable (e.g., by converting the speech into a data structure of sentence-diagrammed words, e.g., using a sentence diagramming path selection algorithm) by a target device (e.g., a speech-enabled television device, e.g., television device 53), based on feedback received from the target device (e.g., data indicating that the television can quickly handle the data structure of sentence-diagrammed words) indicating that the target device is configured to process the converted data (e.g., the data structure holding the sentence-diagrammed words) more quickly than the target device is configured to process speech data (e.g., the raw speech received at a microphone from the user 105).

Figure 10B:
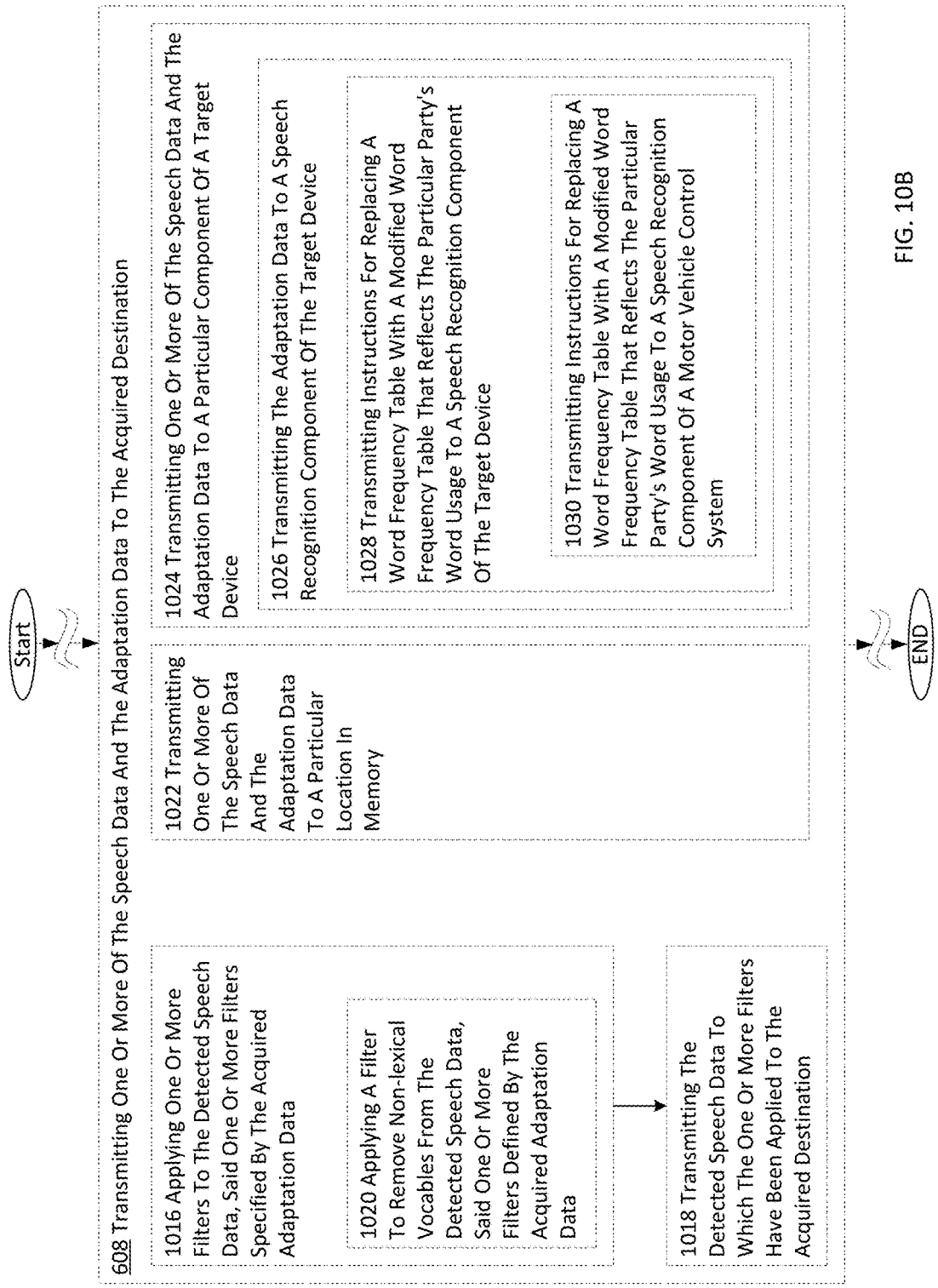
FIG. 10B is a high-level logic flowchart of a process depicting alternate implementations of a transmitting operation 608 of FIG. 6, according to one or more embodiments.

Referring now to FIG. 10B, operation 608 may include operation 1016 depicting applying one or more filters to the detected speech data, said one or more filters specified by the acquired adaptation data. For example, FIG. 5, e.g., FIG. 5B, shows one or more filters specified by the acquired adaptation data applying to detected speech data module 516 applying one or more filters (e.g., low grade sound filtration) to the detected speech data (e.g., a request to withdraw two hundred dollars from a checking account), said one or more filters specified by the acquired adaptation data (e.g., the acquired adaptation data contains the algorithm, parameters for the algorithm, or both).

Referring again to FIG. 10B, operation 608 may include operation 1018 depicting transmitting the detected speech data to which the one or more filters have been applied to the acquired destination. For example, FIG. 5, e.g., FIG. 5B, shows filter-applied detected speech data transmitting to acquired destination module 1018 transmitting the detected speech data (e.g., the request to withdraw two hundred dollars) to which the one or more filters have been applied to the acquired destination (e.g., an automated teller machine device that the user is standing directly in front of, e.g., the identity of the device is not known, but rather its position relative to the user).

Referring again to FIG. 10B, operation 1016 may include operation 1020 depicting applying a filter to remove non-lexical vocables from the detected speech data, said one or more filters defined by the acquired adaptation data. For example, FIG. 5, e.g., FIG. 5B, shows non-lexical vocable removal filter specified by the acquired adaptation data applying to detected speech data module 520 applying a filter to remove non-lexical vocables from the detected speech data, said one or more filters defined by the acquired adaptation data (e.g., the acquired adaptation data is a list of the particular party's pronunciation of common non-lexical vocables used by the particular party).

Referring now to FIG. 10B, operation 608 may include operation 1022 depicting transmitting one or more of the speech data and the adaptation data to a particular location in memory. For example, FIG. 5, e.g., FIG. 5B, shows one or more of speech data and adaptation data transmitting to particular memory location module 522 transmitting one or more of the speech data and the adaptation data (e.g., a latent dialogue act matrix) to a particular location in memory (e.g., transmitting to an address x0000FFDD, or transmitting to removable storage media)

Referring again to FIG. 10B, operation 608 may include operation 1024 depicting transmitting one or more of the speech data and the adaptation data to a particular component of a target device. For example, FIG. 5, e.g., FIG. 5B, shows one or more of speech data and adaptation data transmitting to particular target device component module 524 transmitting one or more of the speech data (e.g., dictation of a memorandum) and the adaptation data (e.g., an ungrammatical utterance deletion algorithm) to a particular component (e.g., a particular chip on a board, or a particular software module, e.g., a word processing software) of a target device (e.g., a computer).

Referring again to FIG. 10B, operation 1024 may include operation 1026 depicting transmitting the adaptation data to a speech recognition component of the target device. For example, FIG. 5, e.g., FIG. 5B, shows one or more of speech data and adaptation data transmitting to target device speech recognition component module 526 transmitting the adaptation data (e.g., an utterance ignoring algorithm) to a speech recognition component of the target device (e.g., a central processor of an automated teller machine device).

Referring again to FIG. 10B, operation 1026 may include operation 1028 depicting transmitting instructions for replacing a word frequency table with a modified word frequency table that reflects the particular party's word usage to a speech recognition component of the target device. For example, FIG. 5, e.g., FIG. 5B, shows adaptation data comprising instructions for replacing a word frequency table with a modified word frequency table reflecting particular party word usage transmitting to target device speech recognition component module 528 transmitting instructions for replacing a word frequency table with a modified word frequency table that reflects the particular party's word usage to a speech recognition component of the target device (e.g., target device 30A, e.g., an automated drive-thru window).

Referring again to FIG. 10B, operation 1028 may include operation 1030 depicting transmitting instructions for replacing a word frequency table with a modified word frequency table that reflects the particular party's word usage to a speech recognition component of a motor vehicle control system. For example, FIG. 5, e.g., FIG. 5B, shows adaptation data comprising instructions for replacing a word frequency table with a modified word frequency table reflecting particular party word usage transmitting to a motor vehicle control system speech recognition component module 530 transmitting instructions for replacing a word frequency table with a modified word frequency table that reflects the particular party's word usage to a speech recognition component of a motor vehicle control system.

Referring now to FIG. 10C, operation 608 may include operation 1032 depicting transmitting one or more of the speech data and the adaptation data to a further device, said one or more of the speech data and the adaptation data configured to be processed by a target device. For example, FIG. 5, e.g., FIG. 5B, shows one or more of speech data and adaptation data configured to be processed by a target device transmitting to further device module 532 transmitting one or more of the speech data (e.g., a command to increase the brightness to 100) and the adaptation data (e.g., a syllable pronunciation database) to a further device (e.g., a universal remote control, e.g., a personal device 22A), said one or more of the speech data (e.g., a command to increase the brightness to 100) and the adaptation data (e.g., a syllable pronunciation database) configured to be processed by a target device (e.g., an audio/visual receiver, e.g., receiver device 51).

Referring again to FIG. 10C, operation 1032 may include operation 1034 depicting transmitting one or more of the speech data and the adaptation data to a personal navigation device, said one or more of the speech data and the adaptation data configured to be processed by a motor vehicle control device. For example, FIG. 5, e.g., FIG. 5B, shows one or more of speech data and adaptation data configured to be processed by a motor vehicle control device transmitting to a personal navigation device module 534 transmitting one or more of the speech data (e.g., "give me directions to the nearest Chumley's All-You-Can-Eat Fried Cod restaurant") and the adaptation data (e.g., a set of proper noun pronunciations) to a personal navigation device (e.g., GPS navigation device 41), said one or more of the speech data (e.g., "give me directions to the nearest Chumley's All-You-Can-Eat Fried Cod restaurant") and the adaptation data (e.g., a set of proper noun pronunciations) configured to be processed by a motor vehicle control device (e.g., motor vehicle control system 42, e.g., which, in some embodiments, includes onboard navigation, and in some embodiments, includes listings of restaurants, including Chumley's).

All of the above U.S. patents, U.S. patent application publications, U.S. patent applications, foreign patents, foreign patent applications and non-patent publications referred to in this specification and/or listed in any Application Data Sheet, are incorporated herein by reference, to the extent not inconsistent herewith.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.).

It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

This application may make reference to one or more trademarks, e.g., a word, letter, symbol, or device adopted by one manufacturer or merchant and used to identify and/or distinguish his or her product from those of others. Trademark names used herein are set forth in such language that makes clear their identity, that distinguishes them from common descriptive nouns, that have fixed and definite meanings, or, in many if not all cases, are accompanied by other specific identification using terms not covered by trademark. In addition, trademark names used herein have meanings that are well-known and defined in the literature, or do not refer to products or compounds for which knowledge of one or more trade secrets is required in order to divine their meaning. All trademarks referenced in this application are the property of their respective owners, and the appearance of one or more trademarks in this application does not diminish or otherwise adversely affect the validity of the one or more trademarks. All trademarks, registered or unregistered, that appear in this application are assumed to include a proper trademark symbol, e.g., the circle R or bracketed capitalization (e.g., [trademark name]), even when such trademark symbol does not explicitly appear next to the trademark. To the extent a trademark is used in a descriptive manner to refer to a product or process, that trademark should be interpreted to represent the corresponding product or process as of the date of the filing of this patent application.

Those skilled in the art will appreciate that the foregoing specific exemplary processes and/or devices and/or technologies are representative of more general processes and/or devices and/or technologies taught elsewhere herein, such as in the claims filed herewith and/or elsewhere in the present application.

What is claimed is:

1. A method for controlling a computer processor to perform operations comprising:
    detecting speech data of a particular party at a personal device of the particular party, the speech data being related to a speech-facilitated interaction of the particular party with a target device;
    acquiring at the personal device adaptation data that is at least partly based on at least one previous speech interaction of the particular party;
    converting the speech data at the personal device into converted data based at least partly on feedback from the target device at least indicating that the target device is able to process the converted data more quickly than the speech data; and
    transmitting the adaptation data and the converted data from the personal device to the target device to facilitate speech recognition.

2. The method of claim 1, further comprising:
    receiving a signal requesting initiation of one or more operations in preparation for the speech-facilitated interaction.

3. The method of claim 1, wherein said acquiring at the personal device adaptation data that is at least partly based on at least one previous speech interaction of the particular party comprises:
    acquiring at the personal device adaptation data that is at least partly based on at least one previous speech interaction of the particular party, the adaptation data including one or more words and corresponding pronunciations of the one or more words of the particular party.

4. The method of claim 1, wherein said acquiring at the personal device adaptation data that is at least partly based on at least one previous speech interaction of the particular party comprises:
    acquiring at the personal device and from a network location adaptation data that is at least partly based on at least one previous speech interaction of the particular party.

5. The method of claim 1, further comprising:
    detecting one or more of the following particular conditions: execution of a program, detection of the particular party at a particular location, and detection of the particular party within a particular proximity of the target device.

6. The method of claim 1, wherein said acquiring at the personal device adaptation data that is at least partly based on at least one previous speech interaction of the particular party comprises:
    acquiring at the personal device and from a further device adaptation data that is at least partly based on at least one previous speech interaction of the particular party.

7. The method of claim 1, wherein said acquiring at the personal device adaptation data that is at least partly based on at least one previous speech interaction of the particular party comprises:
    acquiring at the personal device adaptation data that is at least partly based on at least one previous speech interaction of the particular party, the adaptation data including one or more instructions for modifying a pronunciation dictionary.

8. The method of claim 1, wherein said acquiring at the personal device adaptation data that is at least partly based on at least one previous speech interaction of the particular party comprises:
    acquiring at the personal device adaptation data that is at least partly based on at least one previous speech interaction of the particular party with a particular type of device.

9. The method of claim 1, wherein said acquiring at the personal device adaptation data that is at least partly based on at least one previous speech interaction of the particular party comprises:
    acquiring at the personal device, adaptation data that is at least partly based on at least one previous speech interaction of the particular party with the personal device, wherein the personal device is a cellular telephone device.

10. The method of claim 1, wherein said acquiring at the personal device adaptation data that is at least partly based on at least one previous speech interaction of the particular party comprises:
    acquiring at the personal device, adaptation data that is at least partly based on a telephone conversation carried out using the personal device, wherein the personal device is a cellular telephone device.

11. The method of claim 1, wherein said acquiring at the personal device adaptation data that is at least partly based on at least one previous speech interaction of the particular party comprises:
    acquiring at the personal device from a remote location adaptation data that is at least partly based on at least one previous speech interaction of the particular party.

12. The method of claim 1, further comprising:
    adding further data to the adaptation data.

13. The method of claim 12, wherein said adding further data to the adaptation data comprises:
    adding header data identifying an entity.

14. The method of claim 1, further comprising:
    obtaining a network address of the target device.

15. The method of claim 1, further comprising:
    detecting one or more devices configured to process the speech data.

16. A system comprising:
    circuitry configured for detecting speech data of a particular party at a personal device of the particular party, the speech data being related to a speech-facilitated interaction of the particular party with a target device;
    circuitry configured for acquiring at the personal device adaptation data that is at least partly based on at least one previous speech interaction of the particular party;
    circuitry configured for converting the speech data at the personal device into converted data based at least partly on feedback from the target device at least indicating that the target device is able to process the converted data more quickly than the speech data; and
    circuitry configured for transmitting the adaptation data and the converted data from the personal device to the target device to facilitate speech recognition.

17. The method of claim 1, further comprising:
    receiving data regarding at least one capability of one or more devices configured to process the speech data.

18. A system comprising:
    means for detecting speech data of a particular party at a personal device of the particular party, the speech data being related to a speech-facilitated interaction of the particular party with a target device;

means for acquiring at the personal device adaptation data that is at least partly based on at least one previous speech interaction of the particular party;

means for converting the speech data at the personal device into converted data based at least partly on feedback from the target device at least indicating that the target device is able to process the converted data more quickly than the speech data; and means for transmitting the adaptation data and the converted data from the personal device to the target device to facilitate speech recognition.

19. The method of claim 1, wherein the detecting speech data of a particular party at a personal device of the particular party, the speech data being related to a speech-facilitated interaction of the particular party with a target device comprises:

detecting speech data of a particular party including data of one or more words spoken by the particular party, the speech data being related to a speech-facilitated interaction of the particular party with a target device.

20. The method of claim 1, further comprising:

detecting the target device based at least partly on one or more parameters associated with the target device.

21. The method of claim 1, wherein the acquiring at the personal device adaptation data that is at least partly based on at least one previous speech interaction of the particular party comprises:

acquiring at the personal device adaptation data recorded by the personal device during one or more prior conversations of the particular party.

22. The method of claim 1, wherein the acquiring at the personal device adaptation data that is at least partly based on at least one previous speech interaction of the particular party comprises:

acquiring at the personal device adaptation data selected based at least partly on a type of the target device.

23. The method of claim 1, wherein the detecting speech data of a particular party at a personal device of the particular party, the speech data being related to a speech-facilitated interaction of the particular party with a target device comprises:

detecting speech data of a particular party at one or more of the following types of personal devices: smartphone, tablet, personal computer, laptop, keychain, key, personal digital assistant, memory stick, universal remote control, wearable, eyeglasses, wallet, credit card, watch, chain, or article of clothing.

24. The method of claim 1, wherein the detecting speech data of a particular party at a personal device of the particular party, the speech data being related to a speech-facilitated interaction of the particular party with a target device comprises:

detecting speech data of a particular party being related to a speech-facilitated interaction of the particular party with at least one of the following types of target devices: computing device, laptop, desktop, computer, server, netbook, tablet, smartphone, receiver, media player, television, automobile, system of automobile, device of automobile, GPS navigation device, ATM, ticket machine, checkout machine, microwave, oven, blender, appliance, theater system, or home device.

25. The method of claim 1, further comprising:

performing speech recognition on the speech data at the personal device to determine at least one operation requested in the speech data.

26. The method of claim 1, further comprising:

receiving a communication transmission from each of a plurality of available target devices that specifies one or more capabilities.

27. The method of claim 26, further comprising:

selecting the target device among the plurality of available target devices based at least partly on a capability of the target device being able to satisfy at least one operation.

28. The method of claim 1, further comprising:

transmitting from the personal device header information identifying the target device.

29. The method of claim 1, wherein the acquiring at the personal device adaptation data that is at least partly based on at least one previous speech interaction of the particular party comprises:

acquiring at the personal device adaptation data that is at least partly based on at least one previous speech interaction of the particular party, the adaptation data specifying one or more filters to remove one or more non-lexical vocables.

30. The method of claim 29, further comprising:

applying the one or more filters specified by the adaptation data to remove one or more non-lexical vocables.

31. The method of claim 1, wherein the speech data is unrecognizable by the target device prior to conversion of the speech data at the personal device.

32. The method of claim 1, wherein the converting the speech data at the personal device into converted data based at least partly on feedback from the target device at least indicating that the target device is able to process the converted data more quickly than the speech data comprises:

converting the speech data at the personal device into converted data with one or more sounds removed that do not correspond to words, based at least partly on feedback from the target device at least indicating that the target device is able to process the converted data more quickly than the speech data.

33. The method of claim 1, wherein the converting the speech data at the personal device into converted data based at least partly on feedback from the target device at least indicating that the target device is able to process the converted data more quickly than the speech data comprises:

converting the speech data at the personal device into converted data that includes at least some speech labeling, based at least partly on feedback from the target device at least indicating that the target device is able to process the converted data more quickly than the speech data.

34. The method of claim 1, wherein the converting the speech data at the personal device into converted data based at least partly on feedback from the target device at least indicating that the target device is able to process the converted data more quickly than the speech data comprises:

converting the speech data at the personal device into converted data of a sentence diagram data structure, based at least partly on feedback from the target device at least indicating that the target device is able to process the converted data more quickly than the speech data.

* * * * *